(12) United States Patent
Kanbayashi et al.

(10) Patent No.: US 10,171,574 B2
(45) Date of Patent: Jan. 1, 2019

(54) COMPUTER SYSTEM, PROCESSING METHOD, AND COMPUTER-READABLE RECORDING MEDIUM HAVING JOB PROCESSING PROGRAM

(71) Applicant: FUJITSU LIMITED, Kawasaki-shi, Kanagawa (JP)

(72) Inventors: Ryo Kanbayashi, Huchu (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 556 days.

(21) Appl. No.: 14/883,119

(22) Filed: Oct. 14, 2015

(65) Prior Publication Data

US 2016/0112506 A1 Apr. 21, 2016

(30) Foreign Application Priority Data

Oct. 16, 2014 (JP) .................................. 2014-211692

(51) Int. Cl.
*H04L 29/08* (2006.01)
*G06F 9/50* (2006.01)

(52) U.S. Cl.
CPC ........ *H04L 67/1031* (2013.01); *G06F 9/5066* (2013.01)

(58) Field of Classification Search
CPC .. H04L 67/1031; G06F 9/5066; G06F 9/5011; G06F 9/4881
USPC ........................................................ 709/203
See application file for complete search history.

(56) References Cited

U.S. PATENT DOCUMENTS

| 2005/0235286 | A1* | 10/2005 | Ballew | G06F 9/5038 |
| | | | | 718/100 |
| 2008/0098375 | A1* | 4/2008 | Isard | G06F 9/5066 |
| | | | | 717/149 |
| 2009/0083746 | A1 | 3/2009 | Katsumata | |
| 2010/0241881 | A1* | 9/2010 | Barsness | G06F 1/3203 |
| | | | | 713/320 |
| 2013/0152089 | A1* | 6/2013 | Shimamura | G06F 9/50 |
| | | | | 718/100 |

(Continued)

FOREIGN PATENT DOCUMENTS

| JP | 08-16410 | 1/1996 |
| JP | 2007-206986 A | 8/2007 |
| JP | 2009-75956 | 4/2009 |

(Continued)

OTHER PUBLICATIONS

Japanese Office Action dated Mar. 27, 2018 for corresponding Japanese Patent Application No. 2014-211692, with English Translation, 6 pages.

*Primary Examiner* — Thu V Nguyen
*Assistant Examiner* — Aye M Aung
(74) *Attorney, Agent, or Firm* — Fujitsu Patent Center

(57) ABSTRACT

A computer system includes: a reference point determining unit that sets node allocation reference points for the job in association with job attribute information of the job, to node coordinate spaces where the plurality of computation nodes are arranged; and a node set searching unit that searches for a computation node set that is a set of computation nodes satisfying a predetermined condition related to a remote degree that is an estimate index of a communication time from the node allocation reference point in the node coordinate space.

9 Claims, 37 Drawing Sheets

(56) References Cited

U.S. PATENT DOCUMENTS

2016/0085587 A1\* 3/2016 Dube .................... G06F 9/5011
718/104

FOREIGN PATENT DOCUMENTS

JP 2012-215933 11/2012
WO 2012/020474 A1 2/2012

\* cited by examiner

FIG. 4A

IN CASE WHERE NUMBER OF VERTICES OF CERTAIN SIDE IN TWO-DIMENSION (CROSS-SECTION) IS EVEN NUMBER, AND START POINT AND END POINT ARE BOTH ENDS OF THAT SIDE

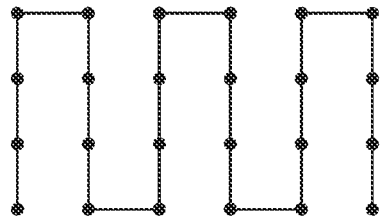

FIG. 4B

IN CASE WHERE BOTH SIDES IN TWO-DIMENSION (CROSS-SECTION) ARE ODD NUMBER, AND START POINT AND END POINT ARE BOTH ENDS OF EITHER OF DIAGONAL LINES

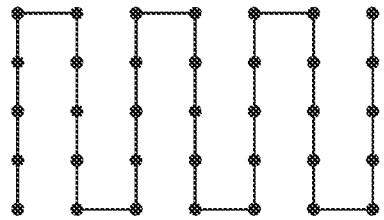

FIG. 4C

IN CASE WHERE BOTH SIDES IN TWO-DIMENSION (CROSS-SECTION) ARE ODD NUMBER, START POINT AND END POINT ARE BOTH ENDS OF ONE SIDE

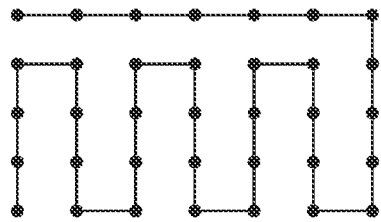

AT LEAST ONE OF SIDES OF $(k-2)$th AND $(k-1)$th DIMENSIONS
AND SIDE OF $k$th DIMENSION ARE EVEN NUMBER

BOTH SIDES OF $(k-2)$th AND $(k-1)$th DIMENSIONS ARE ODD NUMBER
AND SIDE OF $k$th DIMENSION IS EVEN NUMBER

ALL OF THREE SIDES OF $(k-2)$th, $(k-1)$th,
AND $k$th DIMENSIONS ARE ODD NUMBER

FIG. 11
FOR EXAMPLE, IN CASE OF THREE-DIMENSION,
POINTS OF EIGHT "CORNERS" OF CUBE ARE DIVIDED
INTO POINTS OF FOUR "CORNERS" IN EACH OF TWO RECTANGLES
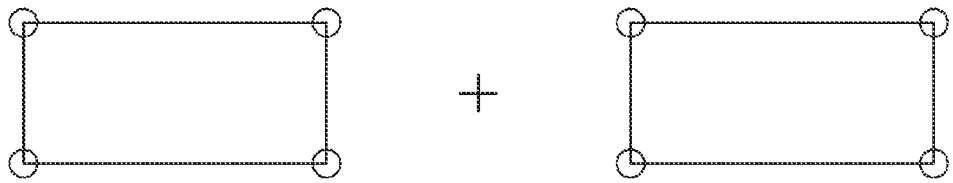
BY REPLACING FOUR LATTICE POINTS OF EACH SET WITH THREE OR TWO LATTICE POINTS,
TOTAL NUMBER OF POINTS IS REDUCED WHILE MAINTAINING UNIFORMITY
OF POINT ARRANGEMENT TO SOME DEGREE
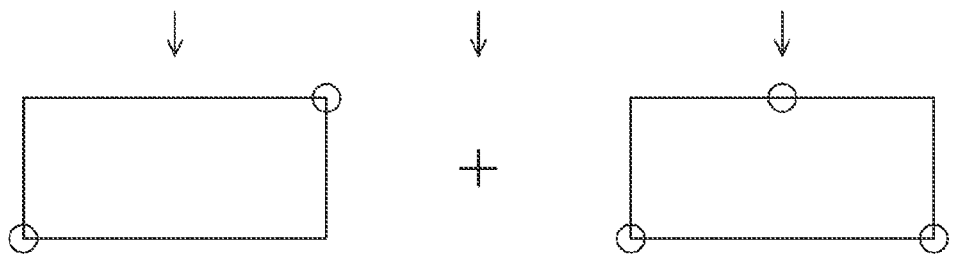

FIG. 12

| JOB ID |
|---|
| USER ID |
| JOB ATTRIBUTE VALUE |
| SIZE OF FIRST DIMENSION |
| SIZE OF SECOND DIMENSION |
| ⋮ |
| SIZE OF $N^{th}$ DIMENSION |

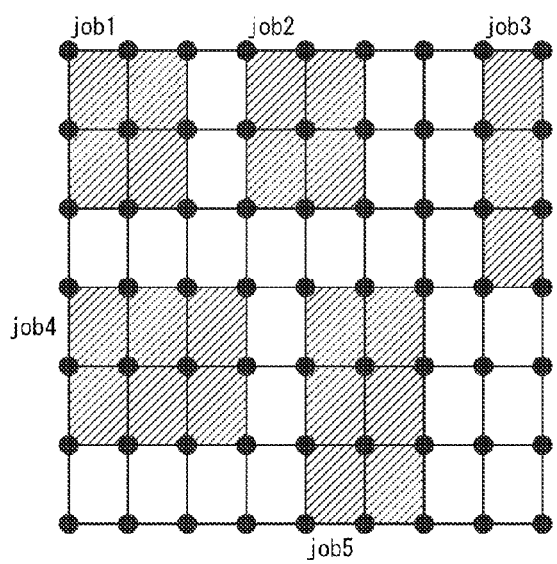

FIG. 14B

HASH TABLE OF RUNNING JOBS
RELATED TO DIMENSION OF
VERTICAL COORDINATES

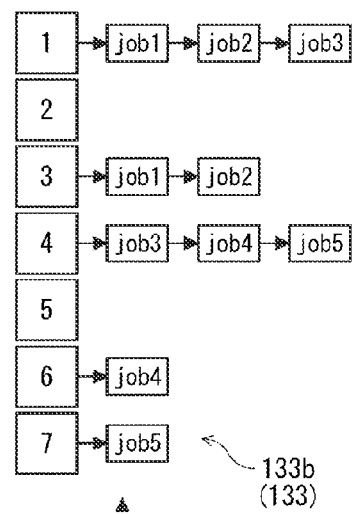

HASH TABLE OF RUNNING JOBS RELATED
TO DIMENSION OF HORIZONTAL COORDINATES

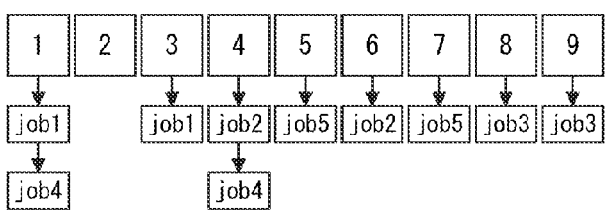

133a
(133)

POINTER FOR JOB MANAGEMENT
STRUCTURE IS REGISTERED
IN HASH TABLE FOR EACH DIMENSION,
WHEN JOB STARTS TO RUN,
WITH USING MINIMUM VALUE
AND MAXIMUM VALUE OF COORDINATES
IN DIMENSION CORRESPONDING
TO NODE REGION OCCUPIED
BY RUNNING JOB AS KEY.
COLLISION OF HASH VALUES IS
PROCESSED BY "HASH BUCKET METHOD"
(STRUCTURES CORRESPONDING TO
SAME KEY ARE LINKED WITH POINTER).

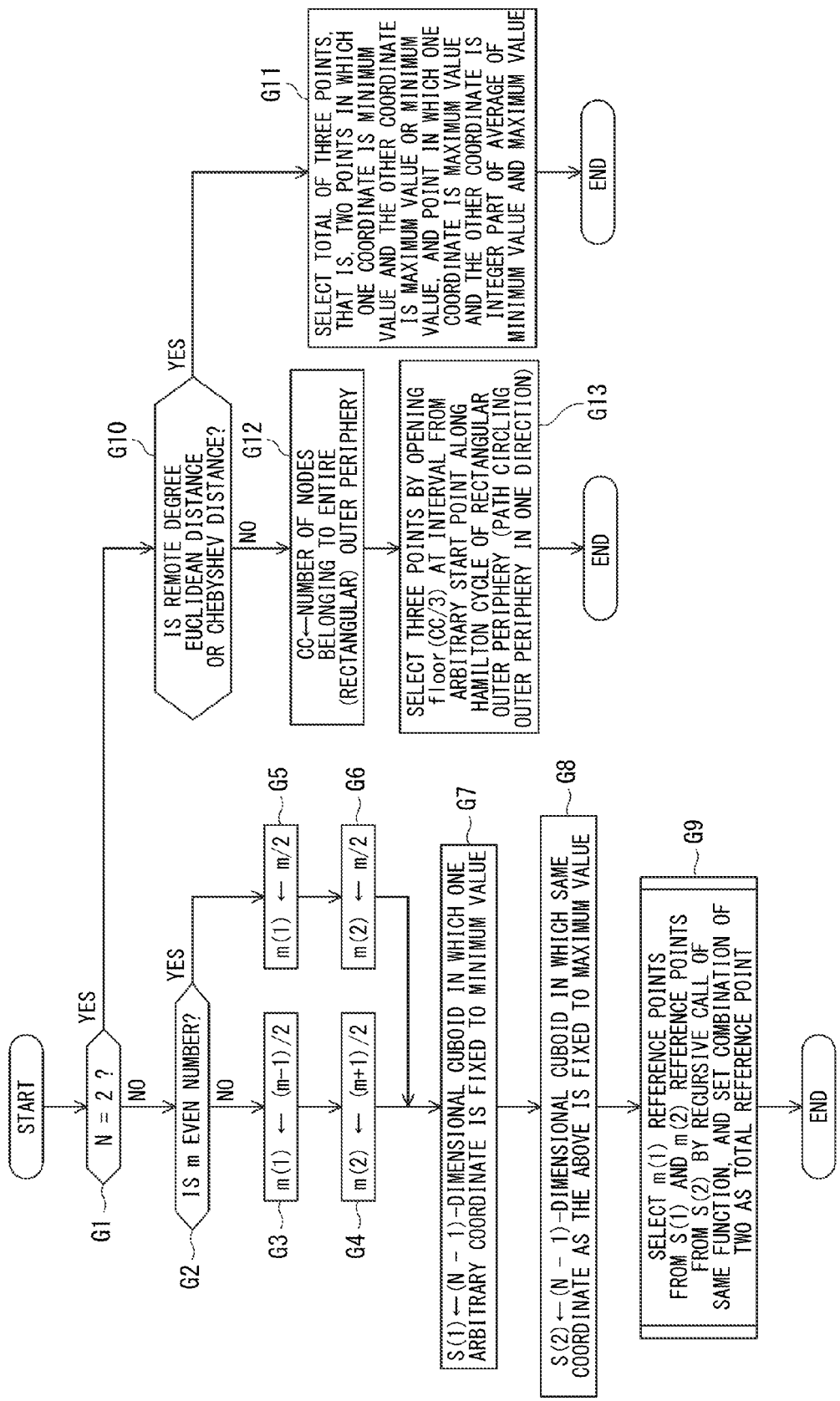

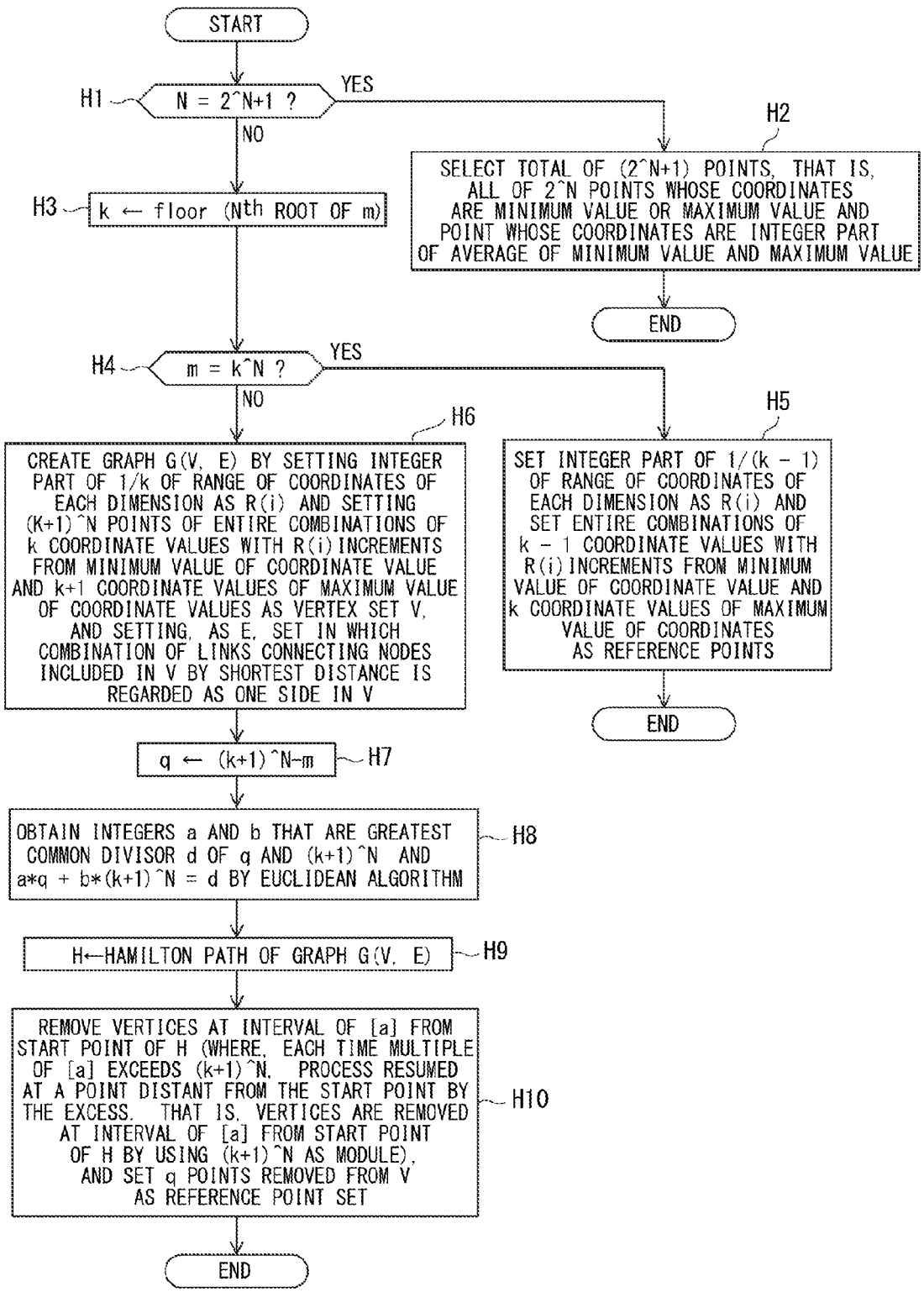

FIG. 37A
FIG. 37B
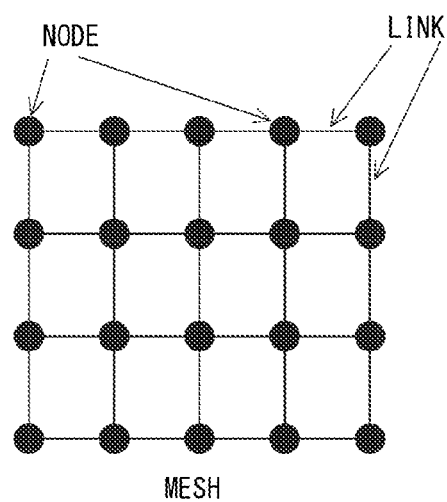
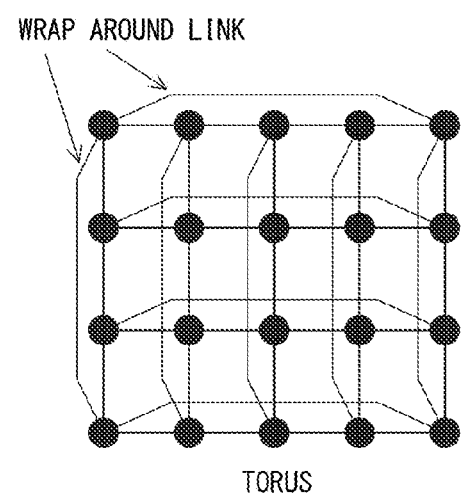

COMPUTER SYSTEM, PROCESSING METHOD, AND COMPUTER-READABLE RECORDING MEDIUM HAVING JOB PROCESSING PROGRAM

CROSS-REFERENCE TO RELATED APPLICATION

This application is based upon and claims the benefit of priority of the prior Japanese Patent application No. 2014-211692, filed on Oct. 16, 2014, the entire contents of which are incorporated herein by reference.

FIELD

The embodiments discussed herein are directed to a computer system, a processing method, and a job processing program.

BACKGROUND

A common large-scale parallel computer system uses a communication network being virtually divided in a plurality of parts so as not to hardly interfere with one another.

One of the reasons is to prevent performance of each job from being degraded by communication interference between jobs when single job performs a parallel processing by using a plurality of processors and a plurality of jobs runs on a system. Therefore, each job runs within a region where communication traffic does not interfere with other parts.

In addition, as another reason, communication of a job set containing multiple jobs having a common attribute (for example, a user ID or a charge code, execution priority, or the like) unpreferably interferes with communication of another job set having a different attribute. Furthermore, due to the reason for system management, jobs common in attribute are preferably disposed in the processor physically near to each other (for example, at the same rack or the same installation location).

In the following, in the parallel computer system, a set of processors being job arrangement unit is referred to as a node.

In a network of a large-scale parallel computer system, there are many cases that "nearness" on the network is presented by a plurality of independent parameters. For example, in a network having a hierarchical connection structure such as a fat tree, "nearness to the connection of the $N^{th}$ layer" may be considered as a parameter representing an independent "nearness" when N is different. In the case of the fat tree, the number of stages connecting the switches of the $N^{th}$ stage from each node corresponds to "nearness to the connection of the $N^{th}$ layer".

In addition, in the mesh or torus that is the representative network topology (of various dimensions) in the network of the large-scale parallel computer system, the network address itself is allocated as the lattice point on the N-dimensional space (points whose coordinates are all integer). Coordinates of different dimensions are naturally independent parameters.

As the network of the parallel computer system in which such an address is allocated as the lattice point on the N-dimensional space, there are other examples such as three-dimensional crossbar.

The relationship between "a plurality of independent parameters representing nearness" and a comprehensive "nearness" is different according to the network topology. Generally, in the network having the hierarchical connection structure, the nearness when viewed from the parameter of the upper layer (in the case of the fat tree, more switches of the upper layer are common as much as possible (thus, the number of hops in the upper layer is 0)) greatly contributes to the comprehensive "nearness". However, in the mesh or the torus, the contributions of the nearness at the coordinates of a certain dimension and the comprehensive nearness are the same extent.

Here, a difference between the mesh and the torus in the network topology will be described.

FIGS. 37A and 37B are diagrams illustrating network topologies. FIG. 37A illustrates a mesh and FIG. 37B illustrates a torus.

In the two network topologies, a method of assigning coordinates of nodes is common and only the existence condition of communication links directly connecting two nodes is different.

In the torus, as illustrated in FIG. 37B, in addition to a certain communication link in the mesh, there is a wrap-around link that connects nodes whose coordinates of other dimension coordinates are the same in a certain dimension whose coordinates are at a minimum value and a maximum value. There is also a system in which the wrap around link is present in a specific dimension and is not present in other dimension. Hereinafter, if there is any dimension where the wrap around link is present, the entire network is referred to a torus, but processing of the dimension where the wrap around link is not present is pursuant to the case of the mesh.

Also, in the following, the case where the network topology of the system is the (N-dimensional) mesh or torus is represented by using the network address, that is, the N-dimensional coordinates.

It is assumed that the coordinates of the node of the system are expressed as N integer pairs $\{\{x(1), x(N)\}|1 \leq I \leq N$ and $L(i) \leq x(i) \leq M(i)\}$ by giving 2N integers $L(1), \ldots, L(N)$, $M(1), \ldots, M(N)$ $L(i)<M(i)$ for all integers i $(1 \leq i \leq N))$.

In this case, the number of node coordinates within the system is $\Pi(M(i)-L(i)+1)$ (product of $(M(i)-L(i)+1)$ for all i)

When the network topology (N-dimension) of the system is the mesh, the condition that the link directly connecting two nodes exists is that when the coordinates of each node are set as $(x(1), x(2), x(N)), (y(1), y(2), \ldots, y(N))$, only the element corresponding to i of one of sets $\{|x(i)-y(i)||1 \leq i \leq N\}$ of absolute values of a difference of coordinates is 1 and the others are 0.

On the other hand, when the network topology (N-dimension) of the system is the torus, the condition that the link directly connecting two nodes exists is that when the coordinates of each node are set as $(x(1), x(2), \ldots, x(N)), (y(1), y(2), \ldots, y(N))$, only the element corresponding to i of one of sets $\{|x(i)-y(i)||1 \leq i \leq N\}$ of absolute values of a difference of coordinates is 1 or $(M(i)-L(i))$, and the others are 0. Here, the part "$(M(i)-L(i))$" is the above-described wrap around link.

When a plurality of jobs of different attributes is allocated to a divided region on a network, it is necessary to consider a variety of information or conditions. Specifically, the conditions related to the number of attributes necessary to distinguish from one another, the number of nodes required as a whole by a set of jobs of each attribute, and nearness or farness need to be classified in consideration. That is, there is a need to place jobs for each attribute on the network.

At this time, the key is a method of dividing a space provided with a set of a plurality of independent parameters related to nearness and farness.

Here, in a case where there is no advance information related to the number of necessary nodes, which is required by the job of each attribute, the division of the nodes in the system into regions having the connectivity of substantially the same size is considered as appropriate. In addition, in order to prevent each region from having different shapes, it is preferable that the nearness and the farness from the reference point in a certain region are not greatly different for each region.

When advance information related to the number of necessary nodes, which is required by the job of each attribute, is provided, the ratio of the number of nodes to be distributed to the job of each attribute represents the distribution ratio by the set of "fractions having a common denominator" approximated with a required accuracy. Therefore, the initial value is set by dividing all the nodes into connected regions having the same size as one another as many as the denominators and allocating the respective numerators to job attributes.

However, the number necessary to distinguish from one another (or common denominators of a fraction representing the appropriate distribution ratio) is variously different according to the system requirement specification independent from the system configuration or the network topology. Therefore, it is not easy, even though the network topology is limited to the N-dimensional torus and the N-dimensional mesh in the large-scale system, to set the connection region appropriate to the system configuration or the network topology according to the number of attributes necessary to distinguish from one another, such that the distance from the reference point of each region is not greatly different.

For example, in a five-dimensional mesh or torus, a method of arranging the reference points of 20 different attribute values to be large in distance between the reference points as much as possible and a method of arranging the reference points of 50 attribute values or 100 attribute values to be large in distance between the reference points as much as possible are quite different and, in each case, it cannot be said to be clear.

Furthermore, a process includes, as inputting a job, allocating a region having a size and an arrangement shape required by the input job and, as ending the job, cancelling the allocation. By repeating the process, the fragmentation is suppressed as much as possible, and the procedure of arranging the job of the same attribute value to be close is unclear even though the allocation range is completely fixed in advance.

In particular, when the system scale is large, it is impossible to adopt a processing procedure in which the number of nodes in the system is proportional to a search time. Even when the search range is limited to the vicinity of the reference point, in particular, in a case where the number of reference points is relatively small, it is also impossible to adopt a processing procedure proportional to the number of nodes in the system.

Therefore, in the past, when the jobs are allocated to the regions on the network, for example, the jobs are sequentially allocated to the empty regions. Therefore, it is impossible to place the jobs together to each attribute.

SUMMARY

According to an aspect of the embodiments, a computer system, which has a plurality of computation nodes and performs an arithmetic processing with respect to a job, includes: a reference point determining unit that sets node allocation reference points for the job in association with job attribute information of the job, to node coordinate spaces where the plurality of computation nodes are arranged; and a node set searching unit that searches for a computation node set that is a set of computation nodes satisfying a predetermined condition related to a remote degree that is an estimate index of a communication time from the node allocation reference point in the node coordinate space.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A, 4B, and 4C are diagrams illustrating types of two-dimensional cross-sections of the Hamilton path;

FIG. 11 is a diagram describing a method of returning an arrangement of a reference point to a case where a dimension N or the number m of attributes is smaller;

FIG. 12 is a diagram illustrating a job management structure in a parallel computer system as an example of the embodiment;

FIGS. 14A, 14B, and 14C are diagrams describing Hash information in a parallel computer system as an example of the embodiment;

FIG. 24 is a flowchart describing a reference point allocation processing by a reference point determining unit of a parallel computer system of a first embodiment;

FIG. 25 is a flowchart describing a reference point allocation processing by a reference point determining unit of a parallel computer system of a first embodiment;

FIGS. 37A and 37B are diagrams illustrating network topologies.

DESCRIPTION OF EMBODIMENT(S)

Figure 1:
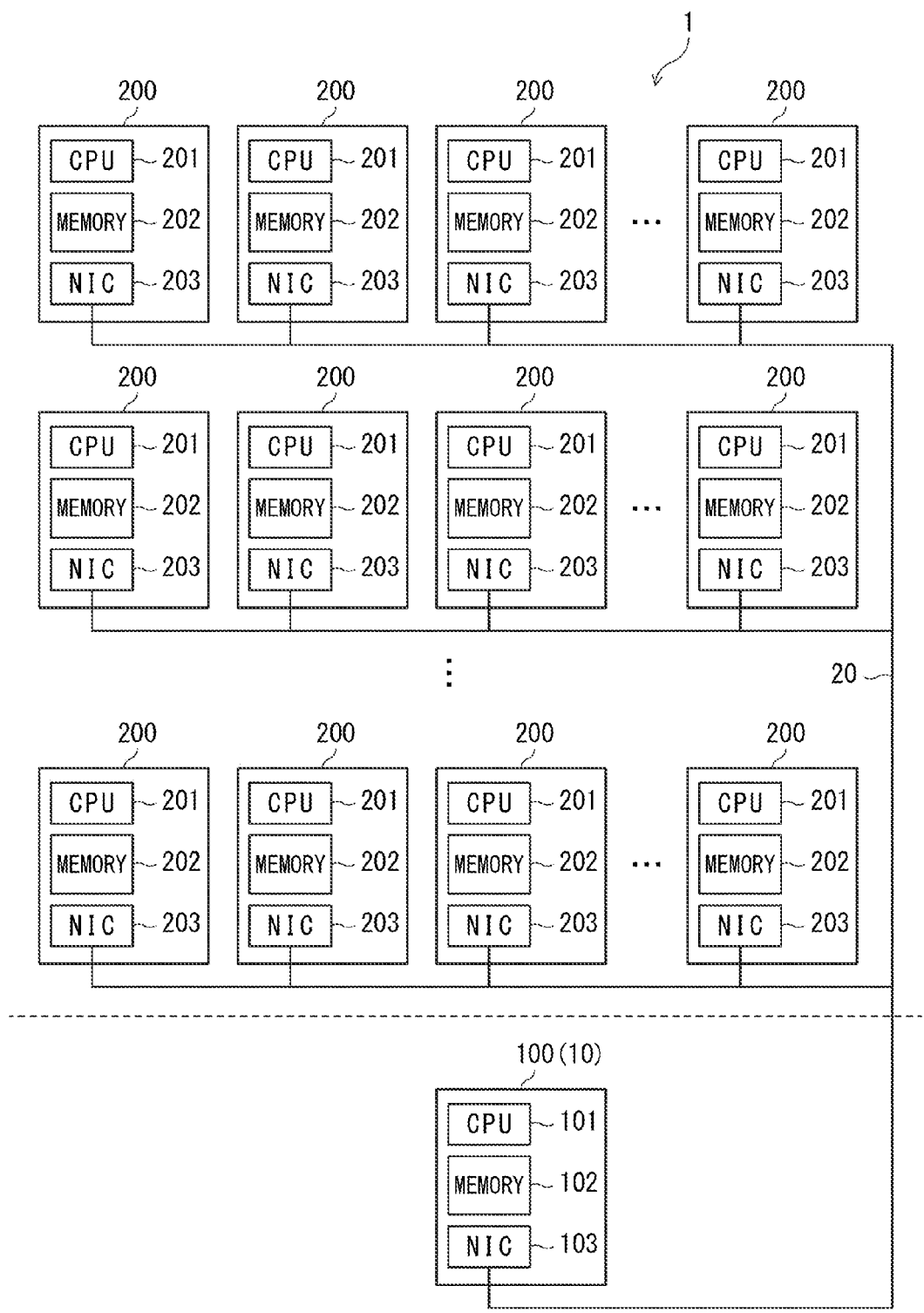
FIG. 1 is a diagram illustrating a configuration of a parallel computer system as an example of an embodiment.

Hereinafter, a computer system, a processing method, and a job processing program according to embodiments will be described with reference to the drawings. However, the following embodiments are merely exemplary. Unless otherwise specified in the following embodiments, the following embodiments are not intended to exclude various modifications or technical applications. That is, the present embodiments can be carried out in various forms (combinations of embodiments and modifications) without departing from the scope of the present embodiments. The drawings are not intended to include only components illustrated in the drawings, but may include other functions.

[I] Configuration

FIG. 1 is a diagram illustrating a configuration of a parallel computer system 1 as an example of an embodiment.

As illustrated in FIG. 1, the parallel computer system 1 includes a plurality of computation nodes 200 communicably connected to one another through a network 20 to thereby constitute an interconnection network. In addition, a job scheduler node 100 is connected to the network 20.

The network 20 is a communication line, for example, a local area network (LAN) or an optical communication line.

The computation nodes 200 are information processing devices and have the same configuration as one another. As illustrated in FIG. 1, each of the computation nodes 200 includes a central processing unit (CPU) 201, a memory 202, and a network interface card (NIC) 203.

The NIC 203 is a network adapter that connects the computation node 200 to the network 20, and realizes the exchange of data between other computation node 200 or the job scheduler node 100, other information processing device (not illustrated), and the like through the network 20. The NIC 203 is, for example, a LAN interface.

The memory 202 is a storage device that includes a read only memory (ROM) and a random access memory (RAM). A software program related to various arithmetic operations or data for the program is written in the ROM of the memory 202. The software program on the memory 202 is loaded and executed on the CPU 201. In addition, the RAM of the memory 202 is used as a primary storage memory or a working memory.

The CPU 201 is a processor that performs various controls or arithmetic operations. The CPU 201 realizes various functions by executing an operating system (OS) or a program stored in the memory 202 or the like. That is, the CPU 201 performs arithmetic processing on data received through the NIC 203 and the network 20. In addition, in a case where it is necessary to transmit data of the arithmetic processing result or the like to other computation node 200, the CPU 201 outputs the data through the NIC 203 and the network 20.

In the parallel computer system 1, each of the computation nodes 200 corresponds to a node that is arrangement unit of job. Hereinafter, the computation node 200 may be simply referred to as a node.

The job scheduler node 100 determines a job to be executed by the computation node 200. That is, the job scheduler node 100 performs a job allocation to the computation node 200.

The job scheduler node 100 is an information processing device and includes a CPU 101, a memory 102, and an NIC 103.

The NIC 103 is a network adapter that connects the job scheduler node 100 to the network 20, and realizes the exchange of data between the computation node 200 or other information processing device (not illustrated), and the like through the network 20. The NIC 103 is, for example, a LAN interface.

The memory 102 is a storage device that includes a ROM and a RAM. A software program related to a job scheduling or data for the program is written in the ROM of the memory 102. The software program on the memory 102 is loaded and executed on the CPU 101. In addition, the RAM of the memory 102 is used as a primary storage memory or a working memory.

The CPU 101 is a processor that performs various controls or arithmetic operations. The CPU 101 realizes various functions by executing an OS or a program stored in the memory 102.

That is, the CPU 101 functions as a job scheduler 10 (see FIG. 2) by executing a program (job processing program). The program (job processing program) for realizing the function as the job scheduler 10 is provided in a form to be recorded in a computer-readable recording medium, such as a flexible disk, a CD (CD-ROM, CD-R, CD-RW, etc.), a DVD (DVD-ROM, DVD-RAM, DVD-R, DVD+R, DVD-RW, DVD+RW, HD DVD, etc.), a Blu-ray disk, a magnetic disk, an optical disk, a magneto-optical disk, or the like. Then, a computer reads the program from the recording medium and transmits the program to an internal storage device or an external storage device so as to be stored therein for the use. Alternatively, the program may be configured to be recorded in a storage device (recording medium) such as a magnetic disk, an optical disc, or a magneto-optical disk and provided from the storage device for the computer through a communication path.

When realizing the function as the job scheduler 10, the program stored in the internal storage device (RAM or ROM of the memory 102 in the present embodiment) is executed by a microprocessor (CPU 101 in the present embodiment) of the computer. At this time, the program that is stored on the recording medium may be read and executed by the computer.

Figure 2:
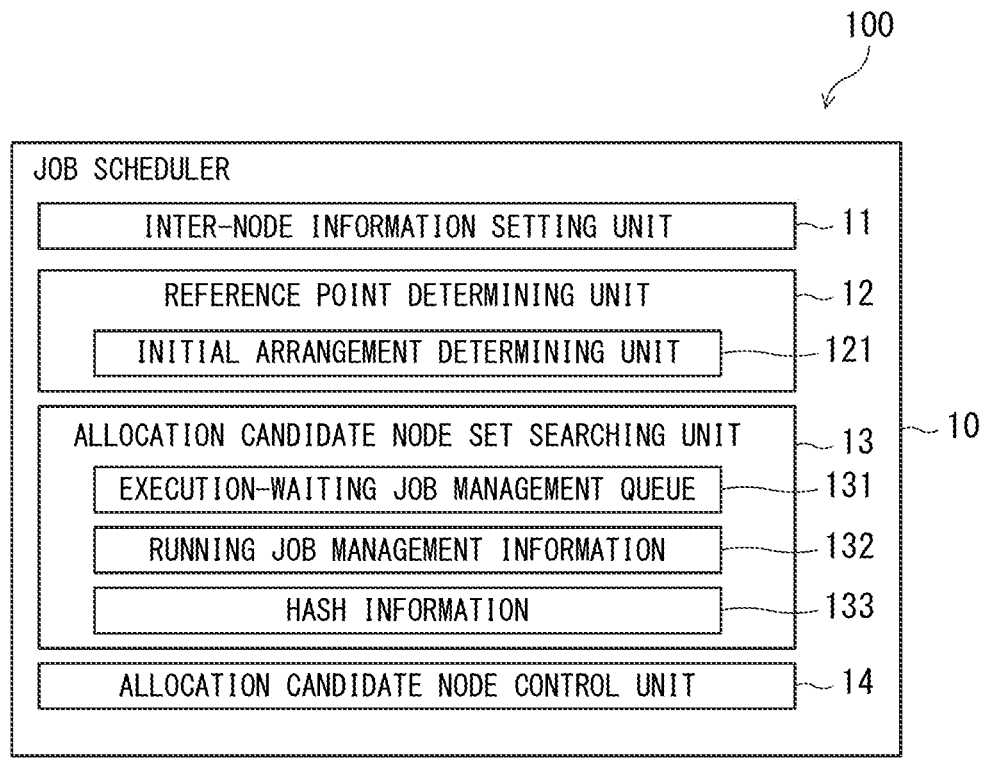
FIG. 2 is a diagram illustrating a functional configuration of a job scheduler of a parallel computer system as an example of an embodiment.

FIG. 2 is a diagram illustrating a functional configuration of the job scheduler 10 of the parallel computer system 1 as an example of an embodiment.

As illustrated in FIG. 2, the job scheduler 10 has functions as an inter-node information setting unit 11, a reference point determining unit 12, an allocation candidate node set searching unit 13, and an allocation candidate node control unit 14.

The inter-node information setting unit 11 determines "nearness" or "farness" of two different node coordinates (for example, E and F) in the parallel computer system 1.

The inter-node information setting unit 11 determines a "farness function" or a remote degree function" with respect to two node coordinates.

As the remote degree function, for example, a "distance function" between two node coordinates, such as a Manhattan distance or an Euclidean distance can be used in an N-dimensional torus or an N-dimensional mesh. Specific examples will be described below.

Conditions such as a triangle inequality in the distance function is not necessarily required for the execution of the parallel computer system 1. Hence, hereinafter, the term "remote degree function" is used instead of the "distance function".

The substantial meaning of the remote degree function is an "estimate index of a communication time". The remote degree function may be, for example, the number of relay points, the number of hops, a measured value of the most recent communication time, or the like, and these examples may not satisfy the triangle inequality.

A function obtained by combining the "remote degree function" with a monotonically decreasing function of one variable (for example, reciprocal) is referred to as a "nearness function" or a "proximity function". Even when either of the "remote degree function" and the "proximity function" is used, the same processing can be performed even though the direction of the inequality is just reverse, but the "remote degree function" is mainly used in the following description.

The remote degree function may be selectively used with respect to a single system. For example, when a distribution ratio within the system is changed, the remote degree function may be changed by time or reference point.

A distribution ratio of the number of nodes at a certain time is adjusted to be the "same remote degree" by multiplying the "remote degree function" by a different constant according to each reference point. This is the same meaning as the adjustment performed by taking a different remote degree according to each reference point with respect to the common "remote degree function".

The shape of the region (more generally, node coordinates of a certain topology) may be calculated in combination with different weight according to a relationship $S(1)$ of a set of coordinates in a case where node coordinates are represented with a combination of coordinates of a simpler topology. The relationship $S(1)$ is represented by $S(1)=S(2)\times S(3)$ or $S(1)\subset S(2)\times S(3)$).

For example, a normal Manhattan distance is the sum of absolute values of coordinate difference between two points, but may be the sum of values obtained by multiplying each dimension by different coefficients.

As such, the inter-node information setting unit 11 expresses each node position (node coordinates), which is included in the network topology constituting the parallel computer system 1, as a remote degree function between two node coordinates.

The reference point determining unit 12 sets a node allocation reference point corresponding to job attribute information (job attribute value) of each job with respect to each inputted job.

The reference point determining unit 12 associates a set $c(i)$ of specific node coordinates, which becomes the "node allocation reference point", with each $a(i)$ of m different job attribute values $\{a(i)|1\leq i\leq m\}$.

The allocation candidate node set searching unit 13 is operated by receiving a value of the remote degree function or the proximity function of the node allocation reference point corresponding to each attribute value.

The reference point determining unit 12 has a function of adjusting the reference point according to a situation of a job having each attribute value or a system operation situation. That is, since the coordinates of the reference point are not necessarily fixed with respect to time, the coordinate of the reference point are expressed as $c(i, t)$ when the time is clearly specified, but such a time variable is omitted when one particular time point is discussed.

The reference point determining unit 12 has a function as an initial arrangement determining unit 121 as described below.

The initial arrangement determining unit 121 determines a set of reference points corresponding to each attribute value at a reference time (hereinafter, "time 0").

The initial arrangement determining unit 121 sets at least one reference point with respect to each job attribute value. That is, $c(i)$ is not an empty set.

The reference point corresponding to each job attribute value may be plural. For example, two reference points may be set, the Euclidean distance between two coordinates may be set as the "remote degree function", and a search range of the allocation candidate node set searching unit 13 to be described below may be limited to "a region having an elliptical cross-section in each plane" by using the condition "the sum of "remote degree functions to each reference point is a particular value or less". In addition, the search range may be limited to "a remote degree function from a certain reference point is a predetermined value or more and a remote degree function from other reference point is the predetermined value or less".

When the coordinates at a certain network topology T(1) is one-to-one correspondence to a combination of coordinates at two different network topologies T(2) and T(3), it is returned to a processing of an initial arrangement setting mechanism in the case of simpler topologies T(2) and T(3) by expressing an initial arrangement at T(1) as a combination of initial arrangements of the coordinates of T(2) and the coordinates of T(3).

When the set of coordinates at T(1) is S(1) and the sets of coordinates at T(2) and T(3) are S(2) and S(3), S(1)=S(2)× S(3) or S(1)⊂S(2)×S(3).

Here, S(2)×S(3) represents "direct product (vector)" of S(2) and S(3) in terms of a set theory.

For example, Fat Tree or the like is also handled as above by dividing a hierarchy of switches (not illustrated) constituting the network 20. In the case of an indirect network using switches, the case of being connected to the same switch is regarded as an equal distance. As the "remote degree function", for example, the case of a regular connection configuration such as Fat Tree or the like can use "the number of switches passing during communication". In a case where the connection between the switches is irregular, a pattern of load concentration to each switch is not always limited. Therefore, there is an increasing need to use a measured value or the like between actual communication times as the "remote degree function".

The reference point determining unit 12 specifically determines a setting procedure of one initial arrangement of m reference points (where m is an arbitrary integer) through division for m with respect to an N-dimensional mesh and an N-dimensional torus.

In the following, a symbol "^" represents exponentiation and a symbol "*" represents multiplication. As the common practice of mathematics, a symbol "+" with respect to the number represents addition and a symbol "||" with respect to the number represents an absolute value. However, "||" with respect to the set represents the number of elements. In addition, "[ ]" with respect to the real number, not necessarily the integer, represents the largest integer that does not exceed that number. This is a so-called Gaussian symbol. Furthermore, for example, in a case where "[x]" is expressed as a function, the symbol [x] represents "floor(x)".

Based on the arrangement of the case of the writing in the form of k^N with respect to m that is a positive integer greater than 1, m reference points are finally selected by regularly adding or removing the point so that the interval between the reference points is as far as possible (the remote degree function between two reference points is increased). In particular, the removing method uses the following method.

The reference point determining unit 12 selects m reference points by removing (k^N−m) points at regular intervals according to the Hamilton path or the Hamilton cycle in a graph (in the sense of a graph theory) in which the arrangement of the reference points of the case of writing k^N is "vertices" and a set of links between two reference points is "side"

In general, a case where there is the Hamilton path with respect to the N-dimensional mesh and there is the Hamilton cycle with respect to the N-dimensional torus is used.

Figure 3:
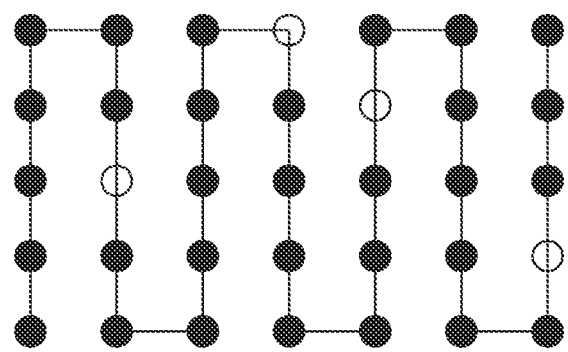
FIG. 3 is a diagram illustrating a Hamilton path.

FIG. 3 is a diagram illustrating the Hamilton path. By removing the vertices of the graph from the set of reference points at regular intervals along the Hamilton path, the number of reference points is adjusted in a case where the number of attributes is not the power of a positive integer or a case where the writing in the form of a multiple of a smaller number is impossible (remainder through division is output).

FIGS. 4A, 4B, and 4C are diagrams illustrating types of two-dimensional cross-sections of the Hamilton path. FIG. 4A illustrates a case where the number of vertices of a certain side in two-dimension (cross-section) is even number and a start point and an end point are both ends of that side. FIG. 4B illustrates a case where both sides in two-dimension (cross-section) are odd number and a start point and an end point are both ends of either of diagonal lines. FIG. 4C illustrates a case where both sides in two-dimension (cross-section) are odd number and a start point and an end point are both ends of one side.

Figure 5A:
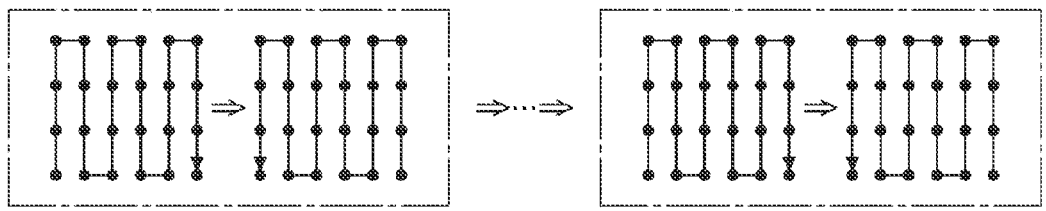
FIGS. 5A, 5B, and 5C are diagrams describing a method of generating a k-dimensional Hamilton path.
Figure 5B:
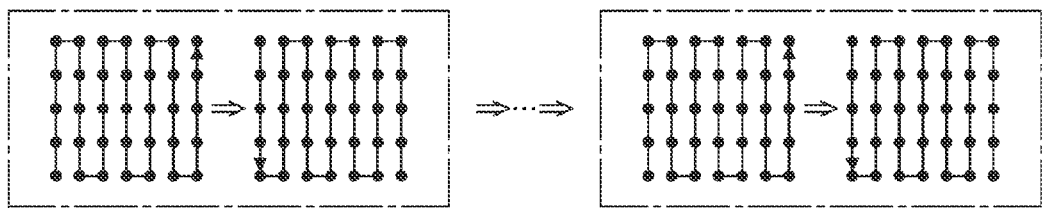
Figure 5C:
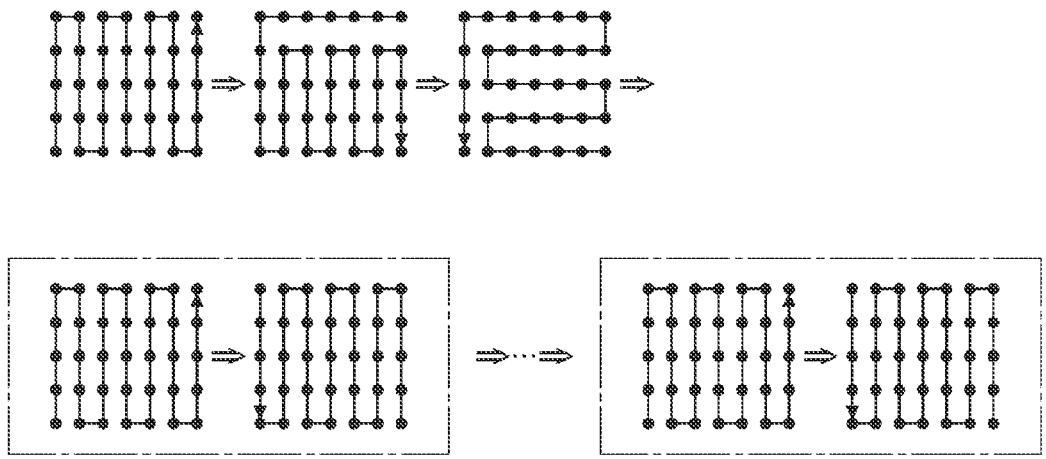

In addition, FIGS. 5A, 5B, and 5C are diagrams describing a method of generating a k-dimensional Hamilton path. In FIG. 5A, at least one of sides of (k−2)th and (k−1)th dimensions and a side of kth dimension are even number. In FIG. 5B, both sides of (k−2)th and (k−1)th dimensions are odd number and a side of kth dimension is even number. In addition, in FIG. 5C, all of three sides of (k−2)th, (k−1)th, and kth dimensions are odd number.

As illustrated in FIGS. 5A, 5B, and 5C, the k-dimensional Hamilton path is finally obtained when the (k−2)-dimensional Hamilton path is sequentially connected in a direction of a kth coordinate axis whenever completing the passing through a two-dimensional cross-section constituting a (k−2)th coordinate axis and a (k−1)th coordinate axis once.

In particular, in a Hamilton path (also the Hamilton cycle) of an s-dimensional unit cube, the case of corresponding to an s-bit gray code is available. In other cases, as illustrated in FIGS. 4A to 4C and FIGS. 5A to 5C, lower-dimensional Hamilton paths are sequentially connected. Therefore, one of the start point and the end point is a minimum value and the other is a maximum value at one coordinate axis. All the other coordinate values take the same Hamilton path. Hence, in the case of the torus, the Hamilton cycle is taken by finally using a wraparound link of a coordinate axis having different values at the start point and the end point.

As other methods, with respect to the arrangement of the case of 2^N where points at which all coordinates of each dimension are maximum or minimum (hereinafter, referred to as "corner" points) if m<2^N, two of four corners are selected in the "cross-section" having a set of two dimensions, or a procedure of arranging three points as far as possible on a rectangle being a cross-section can be combined with one of (Method 1) and (Method 2) described below.

(Method 1) It is sequentially returned to a processing of a case where N is smaller by dividing the "corner" points into two parts, that is, "a point whose a certain single coordinate value is maximum" and "a point whose a certain single coordinate value is minimum".

(Method 2) It is sequentially returned to a processing of a case where N is smaller by representing an N-dimensional cuboid as a "direct product" of an (N−2)-dimensional cuboid and a two-dimensional cuboid.

Also, in general, a coordinate range of each dimension is divided by factorizing m or m+1 by using the fact that one of n and n+1 (where n is a positive integer greater than 2) is not a prime number, and it is possible to sequentially return to a case where N is smaller.

A case where the network 20 is configured by a plurality of partial networks becomes one of the following cases by the magnitude relationship between the number of the attribute values and the number of the partial networks.

When the number of the attribute values is larger, it is returned to the arrangement of the reference point in each partial network by allocating the reference point to the partial networks. On the other hand, when the number of the partial networks is larger, the plurality of networks is arranged to as many groups as the number of the attribute values, and a common reference point is allocated to each group.

Even when either is larger, the arrangement of the reference points is equalized by including a case where one of "the number of the attribute values" and "the number of the partial networks" is not a multiple of the other (case where the remainder of the integer division is not 0).

When a job having a job attribute value a(i) is input, the allocation candidate node set searching unit 13 searches for a node set (allocation candidate node set) satisfying a condition designated as B and a predetermined condition related to a "remote degree" from a "node allocation reference point" when a set of nodes requiring the allocation needs a condition defined as a set B={b(1), b(2), . . . , b(k)} of k number parameters (where k is a positive integer).

For example, when inputting a job to be executed in a region having a partial network that is a k-dimensional mesh or torus (where k is an integer equal to or less than N) in a system where the network topology is an N-dimensional mesh or an N-dimensional torus, the shape of the k-dimensional cuboid is designated by "a size of each dimension".

The allocation candidate node set searching unit 13 maintains the jobs of the same attribute to be close to the reference point as much as possible by sequentially performing an empty region search from a region close to the reference point.

The allocation candidate node set searching unit 13 performs the empty region search so as to be adjacent to the job close to the reference point. Therefore, a fragmentation of the empty region is suppressed as much as possible, and an increase in a computation amount of a large-scale system is suppressed so that a computation amount of a search processing is proportional to the number of jobs running within the system, instead of the number of all nodes within the system.

Figure 6:
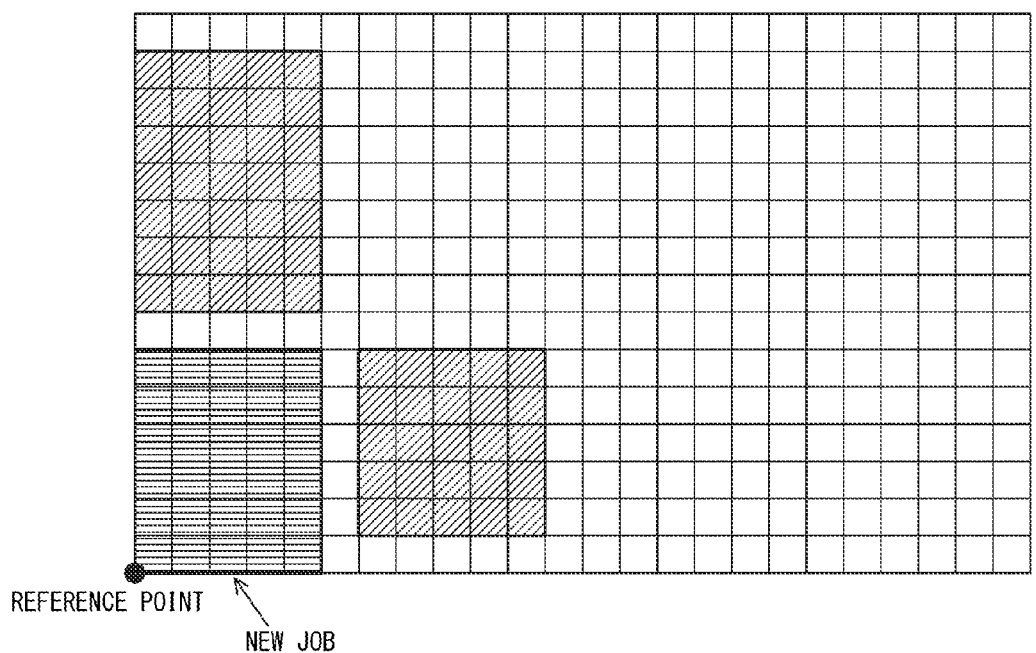
FIG. 6 is a diagram illustrating a job allocating method by an allocation candidate node set searching unit of a parallel computer system as an example of an embodiment.
Figure 7:
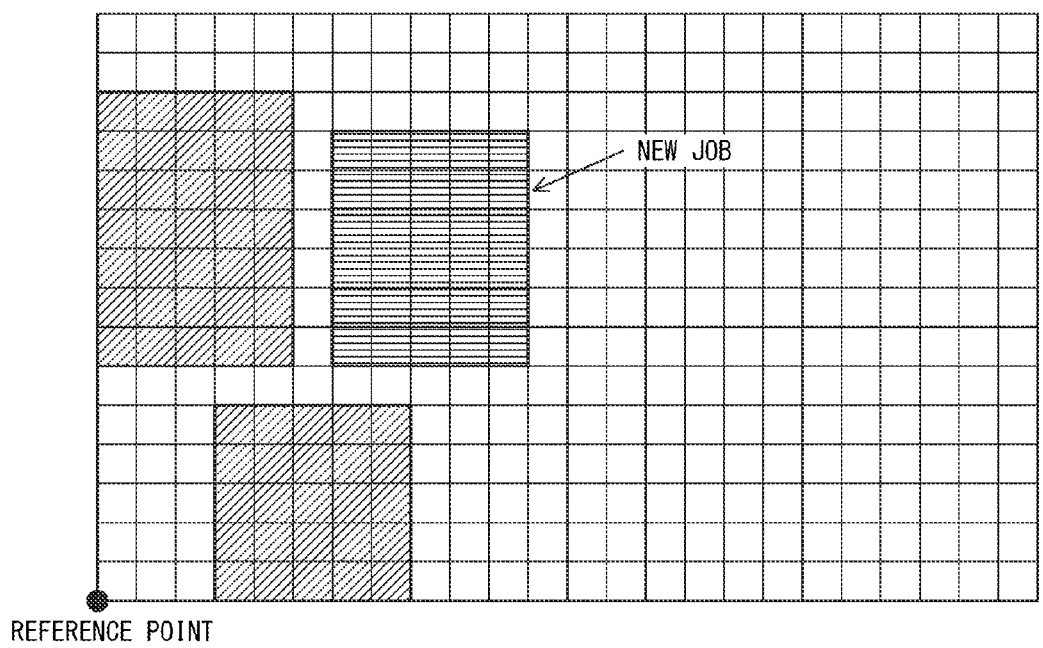
FIG. 7 is a diagram illustrating a job allocating method by an allocation candidate node set searching unit of a parallel computer system as an example of an embodiment.
Figure 8:
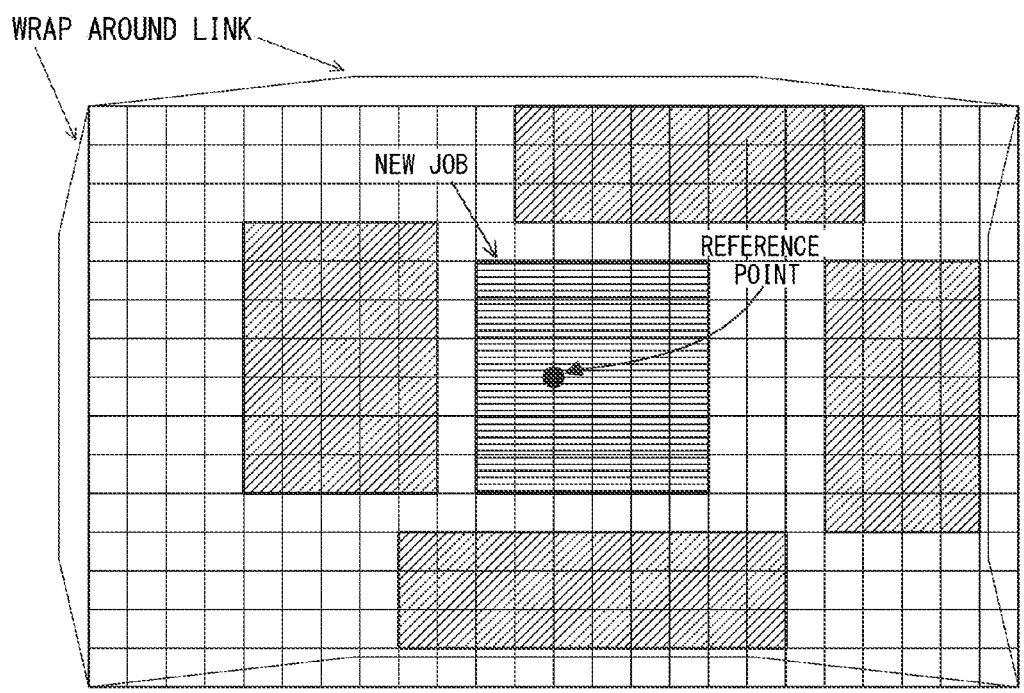
FIG. 8 is a diagram illustrating a job allocating method by an allocation candidate node set searching unit of a parallel computer system as an example of an embodiment.
Figure 9:
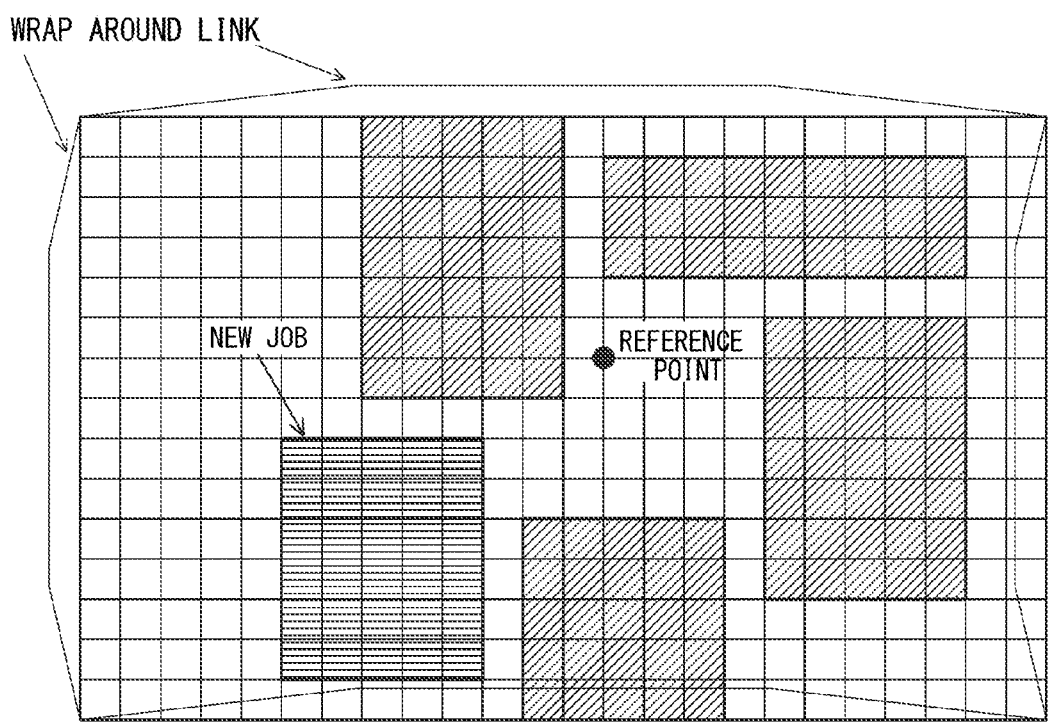
FIG. 9 is a diagram illustrating a job allocating method by an allocation candidate node set searching unit of a parallel computer system as an example of an embodiment.

FIGS. 6 to 9 are diagrams illustrating job allocating methods by the allocation candidate node set searching unit 13 of the parallel computer system 1 as examples of embodiments, respectively. FIGS. 6 and 7 are diagrams illustrating examples in which the network topology is a mesh, and FIGS. 8 and 9 are diagrams illustrating examples in which the network topology is a torus. In these drawings, the diagonally hatched rectangles represent the running jobs, and the horizontally hatched rectangles represent newly allocated jobs.

The job scheduler node 100 executes a job on the computation node 200 allocated by the allocation candidate node set searching unit 13. The method of executing the job on the computation node 200 is known and a description thereof is omitted.

As illustrated in FIGS. 6 and 8, in a case where there is an empty region having a shape designated for a new job in a direction in which the remote degree of the reference point when viewed from the running job is small, the allocation candidate node control unit 14 allocates a new job to that region.

In addition, as illustrated in FIGS. 7 and 9, in a case where there is no empty region having a shape designated for a new job in a direction in which the remote degree of the reference point when viewed from the running job is small, the allocation candidate node control unit 14 allocates a new job to a place that is adjacent to the job running in an empty region where the remote degree from the reference when viewed from the running job is large.

The allocation candidate node control unit 14 limits a node set that can be allocated to a job of each attribute value. The limitation of the allocation candidate node by value is performed when necessary but may be omitted. This limitation is provided to a simultaneous inequality related to the coordinates of the node. The inequality used herein includes the case of the equality.

[II] Embodiment

A job scheduling method in the parallel computer system 1 having the above-described configuration as the example of the embodiment will be described in detail.

In general, the processing procedure of the embodiment can be considered as applying a special example of one or a combination of the following processing procedures (P) and (Q) according to the magnitude of m.

Figure 10:
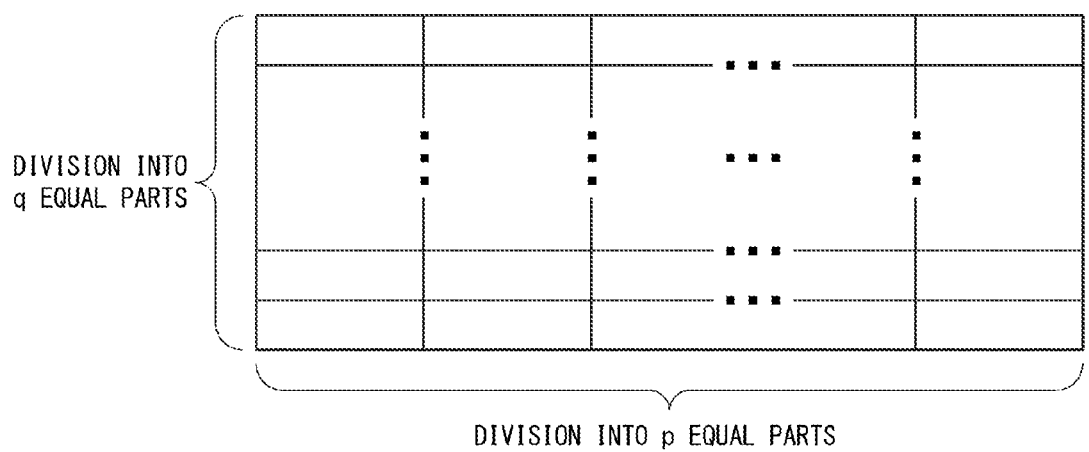
FIG. 10 is a diagram describing a method of returning an arrangement of a reference point to a case where a dimension N or the number m of attributes is smaller.

FIGS. 10 and 11 are diagrams describing methods of returning an arrangement of a reference point to a case where a dimension N or the number m of attributes is smaller, respectively.

FIG. 10 illustrates an example that returns to the case of a smaller dimension by decomposing a set of reference point coordinates through a direct product of two sets of coordinate groups.

That is, when the coordinates are divided into two sets and the coordinates of the dimension of each set are divided into p equal parts and q equal parts, the entire region is divided into p*q equal parts and the number of lattice points becomes (p+1)*(q+1) for (p+1) and (q+1) in each dimension.

FIG. 11 illustrates an example that returns to a case of a smaller dimension by dividing a set of reference point coordinates into figures in which one dimension of two sets is small and returns to a case where the number of attributes is smaller by removing points from each figure.

For example, in the case of a three-dimension, points of eight "corners" constituting a cube are divided into points of four "corners" in each of two rectangles. For example, the points having the same coordinate value in a height direction are divided together.

Then, by replacing four lattice points of each set with three or two lattice points, a total number of points are reduced while maintaining uniformity of the point arrangement to some degree.

The processing procedure (P) is based on the principle of FIG. 10 (FIG. 10 is illustrated as N=s=2).

The processing procedure (Q) is based on the principle of FIG. 11 (FIG. 11 is illustrated as N=2).

For example, the case 5-3 of a first embodiment to be described below (the case of $(k^N < m < (k+1)^N)$) corresponds to the case that sets s=N, A(1)=A(2)= . . . A(N)=k+1, and $r=(k+1)^N-m$, and removes r points along a Hamilton path in the processing procedure (P).

The case 5-1 of the first embodiment (the case of $m=2^N+1$) corresponds to the case that sets r=−1, s=N, and A(1)=A(2)= . . . A(N)=2.

The case 4 of the first embodiment corresponds to the recursive application of the processing procedure (Q).

The case 5 of a second embodiment corresponds to the case that sets N=s=2, r=0 when m is not a prime number, and r=1 when m is a prime number in the processing procedure (P).

[Processing Procedure (P)]

The processing procedure (P) includes the following processing.

(1) Note that, with respect to an arbitrary integer s from 2 to N, a certain integer r and s integers $A(1), \ldots, A(s)$ equal to or greater than 2 are taken and expressed as follows. This is because when r sequentially increases from 0, m+r is always the number having s or more prime factors.

$$m+r=A(1)*A(2)* \ldots *A(s)$$

When m is sufficiently large, there is also a case that makes the number having s or more prime factors by sequentially decreasing r from 0.

That is, r may be a negative number (2) The set of coordinate axes is divided into s groups G(f) (1≤f≤s).

$$G(1)=\{i(1), \ldots\}, G(2)=\{i(e), \ldots\},\\ G(s)=\{\ldots, i(N)\} \ (1 \le e \le N)$$

(3) With respect to all G(f) (1≤f≤s), subsets U(f) (1≤f≤s) each including A(f) elements (1≤f≤s) are selected from subsets T(f) (1≤f≤s) corresponding to the set of these coordinate axes.

(4) If r is a positive number, r points are removed from a direct product set $U(1) \times \ldots \times U(s)$ having $m+r=A(1)*A(2)* \ldots *A(s)$ elements, and if r is a negative number, |r|=−r points are added thereto.

[Processing Procedure (Q)]

The processing procedure (Q) includes the following processing.

(1) A coordinate axis g is fixed, a set of corresponding coordinates is set as V(g), a set including a set of coordinates corresponding to coordinate axes other than g is set as W(g), and a set X of all coordinates and a direct product set V(g)×W(g) one-to-one correspond to each other.

That is, it is regarded as X=V(g)×W(g).

(2) Z(g, 1)×W(g) and Z(g, 2)×W(g) one-to-one correspond to two subsets where there are no common parts of X by taking two subsets Z(g, 1) and Z(g, 2) of V(g) where there are no two common parts. That is, it is regarded as Z(g, 1)×W(g)⊂X and Z(g,2)×W(g)⊂X.

(3) m is expressed as m=m(1)+m(2) that is the sum of two positive integers, and m(1) reference points are determined from Z(g, 1)×W(g) and m(2) reference points are determined from Z(g, 2)×W(g). Then, a sum set thereof is set as the entire reference points.

In addition, the method of determining the m(1) reference points from Z(g, 1)×W(g) and the m(2) reference points from Z(g, 2)×W(g) may use two methods as follows.

(Method 1) The processing procedure (P) is applied.

(Method 2) The processing procedure (Q) itself is recursively applied by reducing the dimension by setting |Z(g, 1)|=|Z(g, 2)|=1, that is, by reducing the number of coordinate axes by 1.

A plurality of embodiments described below use distance functions (including the following three types of the distance functions (a) to (c)) between two processor coordinates E and F or functions obtained by normalizing the distance functions by weight coefficients of each dimension as each remote degree between coordinates of the two processors, whose coordinates are $E=(e(1), \ldots, e(N))$ and $F=(f(1), \ldots, f(N))$. Hereinafter, there is no explicit description in the generalization.

(a) The Euclidean distance is obtained by the square root of the sum of the square of a difference between coordinates of each dimension and is expressed as the following formula.

$$\operatorname{sqrt}((e(1)-f(1))^2+(e(2)-f(2))^2+ \ldots +(e(N)-f(N))^2)$$

In addition, when the generalization is performed by the weighting, it is expressed as the following formula.

$$\operatorname{sqrt}(c(1)*(e(1)-f(1))^2+c(2)*(e(2)-f(2))^2+ \ldots +(c(N)*e(N)-f(N))^2))$$

(b) The Manhattan distance is obtained by the sum of absolute values of a difference between coordinates of each dimension and is expressed as the following formula.

$$|e(1)-f(1)|+|e(2)-f(2)|+ \ldots +|e(N)-f(N)|$$

In addition, when the generalization is performed by the weighting, it is expressed as the following formula.

$$d(1)*|e(1)-f(1)|+d(2)*|e(2)-f(2)|+ \ldots +d(N)*|e(N)-f(N)|))$$

(c) The Chebyshev distance is obtained by the maximum value of absolute values of a difference between coordinates of each dimension and is expressed as the following formula.

$$\max(|e(1)-f(1)|,|e(2)-f(2)|, \ldots, |e(N)-f(N)|)$$

The following description is included and max is a function that represents a maximum value among a plurality of parameters.

In addition, when the generalization is performed by the weighting, it is expressed as the following formula.

$$\max(d(1)*|e(1)-f(1)|,d(2)*|e(2)-f(2)|, \ldots, d(N)*|e(N)-f(N)|))$$

In addition, a set of possible values of one attribute of a job is expressed as A.

In the following, |A|=m>1.

This means a case where the number of possible values of an attribute is m. In general, $A=\{a(1), a(2), \ldots, a(m)\}$, but simply, $A=\{1, 2, \ldots, m\}$ for simplicity. Even in this case, there is no difference in the substantial contents of the processing.

In a case where the network topology is a torus, the term of a difference |e(i)−f(i)| of coordinates of $i^{th}$ dimension at each of the above formulas is replaced by min((M(i)−L(i)+1−|e(i)−f(i)|), |e(i)−f(i)|) as a maximum value M(i) and a minimum value L(i) of the $i^{th}$ coordinates at a distance that does not ignore wrap around link. The following description is included and min is a function that represents a minimum value among a plurality of parameters.

However, in the following embodiment, there are also a case where the network topology is a torus and a case that uses a distance as a mesh that ignores wrap around link.

(A) First Embodiment

In the first embodiment, it is assumed that the network topology is an N-dimensional mesh or an N-dimensional torus.

In the first embodiment, one of the Manhattan distance, the Chebyshev distance, and the Euclidean distance is used as the remote degree function.

However, even the case of the torus ignores the existence of the wrap around link in the definition of these distances.

In the first embodiment, the reference point determining unit 12 changes a set of reference points while dividing the cases into the following cases (1) to (8) according to the following conditions related to the value of m. The case 5 is processed by sequentially returning to cases where m or N is smaller.

(1) Case 1: $m=2^N$
(2) Case 2: $m=2^q$ and $N/2 \leq q < N$
(3) Case 3: $m < 2^{(N/2)}$
(4) Case 4: $2^{(N/2)} m < 2^N$ and m is not the power of 2.
(5) Case 5: $m > 2^N$
(6) Case 5-1: $m=2^N+1$
(7) Case 5-2: $m=k^N$ with respect to an integer (k>2)
(8) Case 5-3: other than the above
(1) Case 1: $m=2^N$ The coordinates of the processor are expressed as $\{\{x(1), \ldots, x(N)\} | 1 \leq i \leq N$ and $L(i) \leq x(i) \leq M(i)|$ as 2N integers $L(1), \ldots, L(N), M(1), \ldots, M(N)$ ($L(i) < M(i)$ for all integers i ($1 \leq i \leq N$)).

First, the set C of all reference points is defined as follows.

$$C = \{(x(1), \ldots, x(N)) | x(i) = L(i) \text{ or } x(i) = M(i) \text{ for all } i (1 \leq i \leq N)\}$$

The elements of C and the elements of A one-to-one correspond to each other as follows.

First, a set G of $2^N$ points constituting "vertices of an N-dimensional unit cube" is defined as follows.

$$G = \{(y(1), \ldots, y(N)) | y(i) = 0 \text{ or } y(i) = 1 \text{ for all } i (1 \leq i \leq N)\}$$

Next, the elements of C and the elements of G one-to-one correspond to each other as follows.

$$(x(1), \ldots, x(N)) \leftrightarrow (y(1), \ldots, y(N))$$

If $x(i) = L(i)$ at C, $y(i) = 0$ at G, and if $x(i) = M(i)$ at C, $y(i) = 1$ at G.

Here, the coordinates of the elements of G is "arrangement of N 0s or is in a specific order". Therefore, when the coordinates are regarded as the binary representation of an integer, the elements of G one-to-one correspond to $K = \{0, 1, 2, \ldots, 2^N - 1\}$ that is "a set of integers from 0 to $2^N - 1$". Furthermore, when 1 is added to each element k of K, all become the elements of A, and when 1 is subtracted from the elements of A, all become the elements of K. Therefore, K and A one-to-one correspond to each other.

The elements of C and the elements of A one-to-one correspond to each other by combining the correspondences till now. The $i^{th}$ coordinates of the reference point corresponding to the element a of A (attribute value of a job) is calculated by using the binary representation of a−1 as follows. Here, a symbol "<<" represents a left shift operation of a bit, a symbol "*" represents "multiplication", and a symbol "&" represents a bitwise and operation.

$$A \to C$$

$$a | \to L(i) + ((a-1) \& (1 << (i-1))) * (M(i) - L(i))$$

Since the above processing of the case of $m=2^N$ is also used as a subroutine of the processing of the case of $m \neq 2^N$, a symbol related to a method of determining $2^n$ points is generally defined by the above procedure with respect to a set of coordinates of a processor of an n-dimensional mesh or torus (where n is no limited to N).

$LB = \{L(1), L(n)\}$: a set of minimum values of coordinates of each dimension of the processor coordinates $MB = \{M(1), M(n)\}$: a set of maximum values of coordinates of each dimension of the processor coordinates (where $L(i) < M(i)$) for all $i (1 \leq i \leq n)$)

$$XX(LB, MB, n) = \{\{x(1), \ldots, x(n)\} | 1 \leq i \leq n \text{ and } L(i) \leq x(i) \leq M(i)|$$

$$CC(LB, MB, n) = \{(x(1), \ldots, x(n))\} x(i) = L(i) \text{ or } x(i) = M(i) \text{ for all } i (1 \leq i \leq n)\}$$

$$GG(n) = \{(y(1), \ldots, y(n)) | y(i) = 0 \text{ or } y(i) = 1 \text{ for all } i (1 \leq i \leq n)\}$$

The correspondence to the symbol in the above-described case of $m = 2^N$ is $C = CC(LB, MB, N)$, $G = GG(N)$.

(2) Case 2: $m = 2^q$ and $N/2 \leq q < N$

If $m = 2^q$ and $N - q = s$, s is an integer equal to or greater than 1, $2^N/m = (2^N/2^q) = 2^s$, and $s < q$.

The elements of the set of all N-dimensional coordinates are expressed as a combination of the elements of the set of q-dimensional coordinates and the elements of the set of s-dimensional coordinates.

$$XX(LB, MB, N) = \{\{x(1), \ldots, x(N)\} | 1 \leq i \leq n \text{ and } L(i) \leq x(i) \leq M(i)\}$$

$$YYY(LB, MB, N, q) = \{\{x(1), \ldots, x(q)\} | 1 \leq i \leq q \text{ and } L(i) \leq x(i) \leq M(i)\}$$

$$ZZZ(LB, MB, N, q) = \{\{x(q+1), \ldots, x(N)\} | q+1 \leq i \leq N \text{ and } L(i) \leq x(i) \leq M(i)\}$$

That is, the set XX of the N-dimensional coordinates is regarded as a direct product of the set YYY of the q-dimensional coordinates and the set ZZZ of the s-dimensional coordinates.

$x \in XX(LB, MB, N)$ and a pair (y, z) of $y \in YYY(LB, MB, N, q)$ and $z \in ZZZ(LB, MB, N, q)$ one-to-one correspond to each other as follows.

$$XX(LB, MB, N) \to YYY(LB, MB, N, q) \times ZZZ(LB, MB, N, q) \times | \to (y, z)$$

A set of a minimum value and a maximum value of each dimension is divided as follows.

$$LB = LBY \cup LBZ$$

$$MB = MBY \cup MBZ$$

However, LBY, LBZ, MBY, and MBZ are defined as follows.

$LBY = \{L(1), L(q)\}$
$MBY = \{M(1), M(q)\}$
$LBZ = \{L(q+1), \ldots, L(N)\}$
$MBZ = \{M(q+1), \ldots, M(N)\}$ The case of $s < q$ is as follows.

$$\{(L(1), L(q+1)), (L(2), L(q+2)), \ldots, (L(s), L(q+s))\}$$

$$\{(M(1), M(q+1)), (M(2), M(q+2)), \ldots, (M(s), M(q+s))\}$$

The number of necessary reference points is $m = |A| = 2^q = 2^N/2^s$. Therefore, the number of combinations becomes $1/2^s$ by setting only the vertices on the diagonal line of one of two coordinate axes as coordinates with respect to s "sets of two coordinate axes", and m reference points are exactly obtained.

That is, the following two conditions are combined to define a subset H(q, s) having $2^q$ elements of the unit cube G(N) and set a point corresponding to H(q, s) as the reference point.

$$P(q,s): y(i) = 0 \text{ and } y(i+q) = 0 \text{ or } y(i) = 1 \text{ and } y(i+q) = 1 \text{ for an integer } i (1 \leq i \leq s)$$

$$Q(q,s): y(j) = 0 \text{ or } y(j) = 1 \text{ for an integer } j (s+1 \leq j \leq q)$$

When a set of points satisfying these two conditions is H(q, s), $$|H(q,s)| = 2^N/2^s = 2^{(N-s)} = 2^q = m$$

$$H(q,s) = \{(y(1), \ldots, y(N)) | P(q,s) \text{ and } Q(q,s)\}$$

In the case of s=q, there is no meaning in the condition of Q(q, s). Thus, when only P(q, q) is designated, $$|H(q,q)|=m$$

$$H(q,q)=\{(y(1), \ldots, y(N))|P(q,q)\}$$

The points of each corner of the unit cube correspond to the points of the corners of the mesh or the torus by using the above-described method.

The $i^{th}$ coordinates of the reference point corresponding to both cases are expressed as the following three case analysis formulas.

$$L(i)(1 \leq i \leq s)$$

$$L(i)+((a-1)\&(1<<(i-1)))*(M(i)-L(i))(s+1 \leq i \leq q \text{ or } q+s+1 \leq i \leq N)$$

$$M(i)(q+1 \leq i \leq q+s)$$

(3) Case 3: $m < 2^{\wedge}(N/2)$

When m=2, "points whose coordinates of all dimensions are 0" and "points whose coordinates of all dimensions are 1" are selected in the N-dimensional unit cube. (There is also N>2 from the condition)

Next, m>2.

m is written as $m=(2^{\wedge}u)*t$.

$$s=N-u$$

The elements of the set of all N-dimensional coordinates are expressed as a combination of the elements of the set of u-dimensional coordinates and the elements of the set of s-dimensional coordinates.

$$XX(LB,MB,N)=\{\{x(1), \ldots, x(N)\}|1 \leq i \leq n \text{ and } L(i) \leq x(i) \leq M(i)\}$$

$$YYY(LB,MB,N,u)=\{\{x(1), \ldots, x(u)\}|1 \leq i \leq u \text{ and } L(i) \leq x(i) \leq M(i)\}$$

$$ZZZ(LB,MB,N,u)=\{\{x(u+1), \ldots, x(N)\}|u+1 \leq i \leq N \text{ and } L(i) \leq x(i) \leq M(i)\}$$

In a case where u is 0, since N=s and $2^{\wedge}u=1$, ZZZ coincides with XX and YYY may not be considered.

When u>0, $2^{\wedge}u$ coordinates can be defined from YYY(LB, MB, N, u) on the condition of x(i)=L(i) or x(i)=M(i).

The number of pairs of (y, z) combined by taking $2^{\wedge}u$ pairs of coordinates from YYY(LB, MB, N, u) and taking t pairs of coordinates from ZZZ(LB, MB, N, u) is exactly $(2^{\wedge}u)*t=m$. The reference point is determined by taking vertices of a u-dimensional unit cube from YYY(LB, MB, N, u) and combining t pairs of coordinates of ZZZ(LB, MB, N, u).

In the following, a method of extracting t pairs of coordinates from ZZZ(LB, MB, N, u) is described.

An s-bit gray code (alternating binary code) changes by only 1 bit between adjacent codes by definition. Thus, a "Hamilton cycle" (having points of corners as vertices) (loop passing through each vertex only once) of an s-dimensional unit cube is obtained by sequentially arranging s-bit adjacent gray codes in association with an $i^{th}$ bit and $i^{th}$-dimensional coordinates of an s-dimensional unit cube.

The values of the adjacent gray codes can be generated by repeated calculations of an exclusive OR and a bit shift. That is, the value in a step before 1 step is set as x, and the value may be generated by an exclusive OR of (x>>1) and x. However, the Gray (k) is an s-bit integer. Thus, in a case where the operation is used with an integer greater than s bits, digits over s-bits are masked and erased.

t points on the Hamilton cycle obtained as above are defined as follows. A quotient obtained by dividing $2^{\wedge}s$ by t is set as v. As an initial value 0, a value of a k-th step defined by taking an exclusive OR of the value (x>>1) of the previous step and x is generally set as Gray (k). Then, the coordinates of ZZZ(LB, MB, N, u)={{x(u+1), ..., x(N)}|u+1≤i≤N and L(i)≤x(i)≤M(i)} corresponding to t values of {0=Gray(0), Gray(v), Gray(2v), Gray((t-2)v), Gray((t-1)v)} are selected.

With respect to the element a of A, when the remainder obtained by dividing a-1 by $2^{\wedge}u$ is set as rem(a-1, $2^{\wedge}u$) and a remainder obtained by dividing a-1 by t is set as rem(a-1, t), the corresponding reference point is obtained as follows.

$$L(i)+((\text{rem}(a-1,2^{\wedge}u))\&(1<<(i-1)))*(M(i)-L(i))(1 \leq i \leq u)$$

$$L(i)+((\text{Gray}(\text{rem}(a-1,t)*v))\&(1<<(i-1)))*(M(i)-L(i)) (u+1 \leq i \leq N)$$

(4) Case 4: $2^{\wedge}(N/2)$ m<$2^{\wedge}N$ and m is not the power of 2.

In the case of N=2, m=3 from the condition. In order to make farness selected by two points equal to each other as much as possible, in a case where four sides of the rectangle are regarded as one connection curve and this is divided into 3 equal parts, three coordinates of the closest divided node are selected and these are set as reference points.

For example, the node coordinates of each vertex of the rectangle are set as (L(1), L(2)), (L(1), M(2)), (M(1), L(2)), (M(1), M(2)).

The processing is divided by the type of the remote degree (farness) to be used.

(4-1) Case 4-1: Case of using Manhattan distance as farness $$N=2$$

When M(1)−L(1)=D(1), M(2)−L(2)=D(2), one of nodes on the side of the rectangle is arbitrarily determined, and one-dimensional coordinates circling the rectangle once in one direction are determined by taking a value from 1 to 2*(D(1)+D(2)−1).

When a quotient obtained by dividing CC=2*(D(1)+D(2))−1 by 3 is set as q and a remainder is set as r, CC=3q+r. One-dimensional coordinates of the reference point by q is set as 1, q+1, and 2q+1. q<(D(1)+D(2)−1) and (D(1)+D(2)−1)<2q Therefore, when one-dimensional coordinates of L(1) and L(2) are set to 1, the two-dimensional coordinates of the reference point are defined as follows.

In the case of q D(1), {(L(1), L(2)), (L(1)+q, L(2)), (M(1)−(2*q−(D(1)+D(2)−1)), M(2))}

In the case of q>D(1), {(L(1), L(2)), (M(1), L(2)+q−D(1)), (M(1)−(2*q−(D(1)+D(2)−1)), M(2))}

(4-2) Case 4-2: Case of using Chebyshev distance and Euclidean distance as farness $$N=2$$

As M(1)−L(1)=D(1), M(2)−L(2)=D(2), with respect to two sides (parallel accordingly) faced to have a length of the not-smaller one of D(1) and D(2) (max((D(1), D(2))), a point closest to point of both ends of one side and the center point of the other side is taken.

For example, when D(2) D(1), three points of {(L(1), L(2)), (M(1), L(2)), ([(L(1)+M(1))/2], M(2))} are set as reference points.

Next, N>2. It sequentially returns to a setting method of a case where the dimension of a cuboid is below 1. According to the condition in the farness to be used, the case of two-dimension finally returned is divided as above, but the procedure returned to the case of dimension under 1 is not dependent on the farness. However, the case is divided into an even number and an odd number as follows.

When m is an even number, m is divided as follows.

$$m = m/2 + m/2$$

$2^{((N-1)/2)}$ m/2<$2^{(N-1)}$ and m/2 is not the power of 2. (since m is not the power of 2). In this case, m/2 reference points are determined with respect to each of two cuboids of two (N−1)-dimensions where the value of one coordinate axis is fixed to a minimum value or a maximum value, and the sum set thereof is taken to determine m reference points.

When m is an odd number, m is divided as follows, while noting m>1 from the condition.

$$m = (m-1)/2 + (m+1)/2$$

The following both are established. One of (m−1)/2 and (m+1)/2 may be the power of 2. However, in a case where one of (m−1)/2 and (m+1)/2 is the power of 2, the method of determining the reference point is already described above (see the case 2 above).

$$2^{((N-1)/2)} \le (m-1)/2 < 2^{(N-1)}$$

$$2^{((N-1)/2)} \le (m+1)/2 < 2^{(N-1)}$$

Therefore, even in this case, with respect to each of two cuboids of two (N−1)-dimensions where the value of one coordinate axis is fixed to a minimum value or a maximum value, (m−1)/2 reference points are determined in one cuboid, (m+1)/2 reference points are determined in the other cuboid, and the sum set thereof is taken to determine m reference points.

(5) Case 5: m>$2^N$

With respect to the arrangement of the reference points in the above-described cases 1 to 4, the reference points are determined in the form of addition even in the parts (inside) other than the "boundary point" of the N-dimensional cuboid corresponding to the set of all node coordinates.

(6) Case 5-1: m=$2^N$+1

With respect to the set of reference points in the case of m=$2^N$, those obtained by adding next points are set to a set of reference points.

$$([(L(1)+M(1))/2],[(L(2)+M(2))/2], \ldots ,[(L(N)+M(N))/2])$$

(7) Case 5-2: m=$k^N$ with respect to an integer (k>2)

A subset CC(i) of a value of coordinates of $i^{th}$-dimension is defined as follows.

$$|CC(i)|=k$$

$$R(i)=(M(i)-L(i))/(k-1)$$

$$CC(i)=\{L(i),[L(i)+((M(i)-L(i))/(k-1))],[L(i)+2*((M(i)-L(i))/(k-1))], \ldots ,M(i)\}$$

The set of reference points is defined as follows.

$$C=\{(c(1),c(2), \ldots ,c(N))|c(i) \in CC(i) \text{ for all integers } i(1 \le i \le N)\}$$

(8) Case 5-3: other than the above

An integer that becomes $k^N$<m<$(k+1)^N$ is set as k (that is, k=[$m^{(1/N)}$]).

$$(k+1)^N - m = q$$

$$k > 1, k+1 > 2$$

When m=$(k+1)^N$, a set of $k^N$ reference points in the case 5-2 is set as B.

The points where q reference points are removed from B as described below are set to a set of reference points.

The "graph" G(V, E) in the meaning of the graph theory is determined by defining the set of vertices and the set of sides.

Set of vertices V={$(k+1)^N$ points belonging to B}

The set E of sides is determined as a set of virtual links by taking only points belonging to a partial network connecting only the points of B from the link of the original network and regarding a plurality of links between the adjacent points of B as one virtual link. In other words, with respect to a sequence of the following arbitrary points (or a sequence of corresponding nodes) where only coordinates of a certain dimension are changed), it is considered that there is one virtual link between point 1 of B and point 2 of B, and a set of that virtual link is set as E.

Point 1 of B, point 1 other than B, point 2 other than B, . . . , point n other than B, point 2 of B Since G(V, E) is a graph of an N-dimension mesh or an N-dimension torus, there is a Hamilton path (path passing through all vertices only once). A vertex having one Hamilton path and sequentially passing from a start point is set as v(1), . . . , v($(k+1)^N$).

A greatest common divisor d of q and $(k+1)^N$ and integers a and b that are a*q+b*$(k+1)^N$=d are obtained by an Euclidean algorithm.

A point set having q elements within the Hamilton path is taken at an interval of |a|. Here, "%%" represents a remainder of a division.

$$\{v(|a|\%\%(k+1)^N), v(2*|a|\%\%(k+1)^N), \ldots , v(q*|a|)\%\%(k+1)^N\}$$

A set obtained by removing this set from B is set as a set C of reference points.

With respect to each job, the allocation candidate node set searching unit 13 searches for a region having a shape designated not to include nodes being used by other jobs from the side where a remote degree from a reference point corresponding to a certain specific attribute value is small. One of the Manhattan distance, the Chebyshev distance, and the Euclidean distance is used as the remote degree.

The allocation candidate node set searching unit 13 uses an execution-waiting job management queue 131, a running job management information 132, and a hash information 133.

The execution-waiting job management queue 131 is a queue of an execution-waiting job management structure 131a and provides an input of each search processing.

FIG. 12 is a diagram illustrating the job management structure 131a in the parallel computer system 1 as an example of an embodiment.

The execution-waiting job management structure 131a is information related to the execution-waiting job. As illustrated in FIG. 12, the execution-waiting job management structure 131a is configured by associating a user ID, a job attribute value, and a size of each dimension with respect to a job identification (ID) specifying a job.

In the example illustrated in FIG. 12, the job management structure 131a is shown as a table. In the following, the job management structure 131a may be referred to as a job management control table 131a.

The user ID is information specifying a user of the job and the job attribute value represents a job attribute. The size of each dimension is a size of each dimension (first to $N^{th}$ dimension) of a node region necessary for execution.

The running job management information 132 is information related to the running job and includes a minimum value and a maximum value of each dimension of node coordinates used by each running job.

Figure 13:
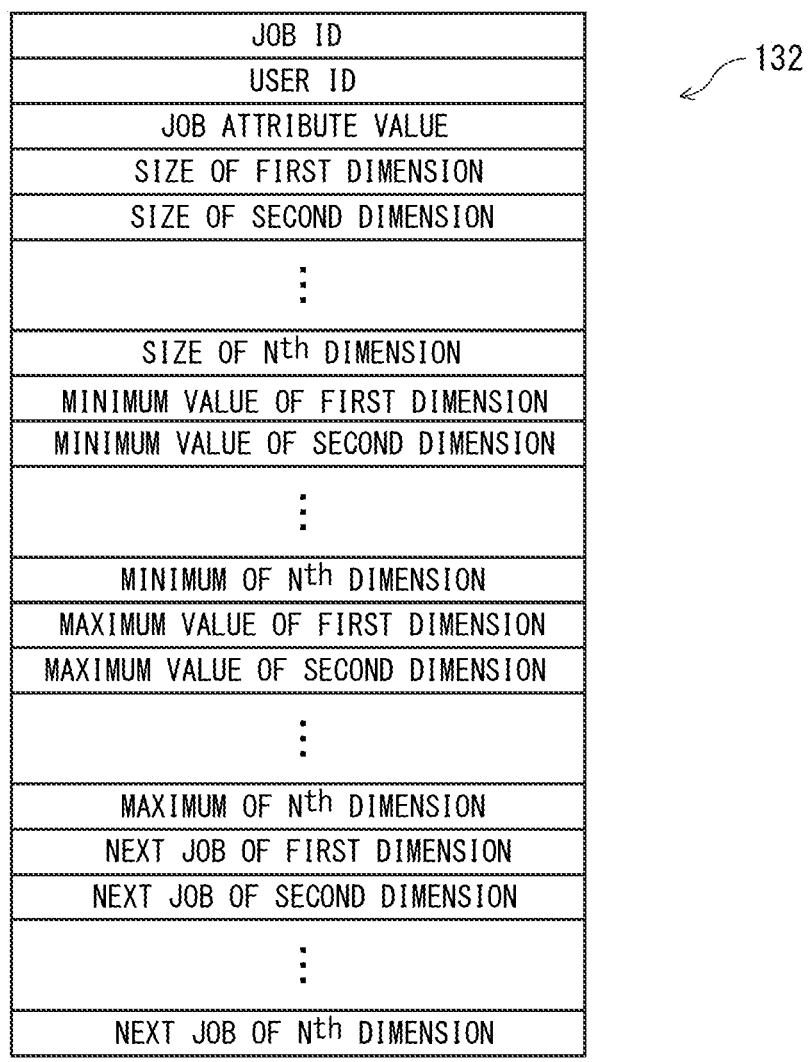
FIG. 13 is a diagram illustrating running job management information in a parallel computer system as an example of the embodiment.

FIG. 13 is a diagram illustrating the running job management information 132 in the parallel computer system 1 as an example of an embodiment.

As illustrated in FIG. 13, the running job management information 132 is configured by associating a user ID, a job attribute value, a size of each dimension, a maximum value of each dimension, a minimum value of each dimension, and a next job of each dimension with respect to a job ID.

In the example illustrated in FIG. 13, the running job management information 132 is shown as a table. In the following, the running job management information 132 may be referred to as a running job management table 132.

The maximum value of each dimension and the minimum value of each dimension are a maximum value and a minimum value of each dimension of node coordinates used by each running job.

The next job of each dimension is a pointer of a next job in a "Hash bucket" of a Hash table 133 (described below with reference to FIGS. 14A to 14C), by using the minimum value or the maximum value of coordinates of each dimension as a key. It becomes a null pointer at a final job.

The allocation candidate node set searching unit 13 calculates a remote degree of each reference point with respect to each job when registered in the table. Then, the allocation candidate node set searching unit 13 performs one of a processing of registering each reference point in a "table obtained by taking only jobs below a specific remote degree" and a processing of including a remote degree for an individual reference point in an entry of the table for each job In addition, in a case where the designation in the attribute of each job is not matched with the designation in the condition that a remote degree from a specific reference point is below a predetermined value, the allocation candidate node set searching unit 13 performs a processing of registering in the running job management table 132 obtained by taking only a job of a specific attribute value.

In each job, at least one pointer of the job of the same attribute may be included and all jobs of the same attribute may be traced when the pointer is sequentially traced. However, the corresponding processing is substantially equal to having a separate table by the attribute.

The Hash information 133 is running job position information managing the position (node coordinate position) of the running job allocated to the node coordinate space. The Hash information 133 is key information of the search processing by the allocation candidate node set searching unit 13 and is managed and held together with the running job management information 132.

The Hash information 133 is information of (N) hashes using the node coordinate value of each dimension of the running job as a key in the node coordinate space. Hereinafter, the Hash information 133 may be referred to as a Hash table 133.

FIGS. 14A, 14B, and 14C are diagrams describing the Hash information 133 in the parallel computer system 1 as an example of an embodiment; FIG. 14A is a diagram illustrating a mesh, FIG. 14B is a diagram illustrating a hash table of running jobs related to a dimension of vertical coordinates of a mesh illustrated in FIG. 14A, and FIG. 14C is a diagram illustrating a Hash table of running jobs related to a dimension of horizontal coordinates of a mesh illustrated in FIG. 14A.

The Hash information 133 manages the position (node coordinate position) of the running job allocated to the node coordinate space in association with each dimension axis constituting the node coordinate space.

For example, the node coordinate space of the mesh illustrated in FIG. 14A has a horizontal coordinate direction (dimension of horizontal coordinates) and a vertical coordinate direction (dimension of vertical coordinates). In such a node coordinate space, the Hash information 133 has the Hash table 133a (see FIG. 14C) related to the dimension of the horizontal coordinates and the Hash table 133b (see FIG. 14B) related to the dimension of the vertical coordinates.

In each job, the pointer of the entry corresponding to the job is stored in the Hash information 133 within the running job management table 132 in the entry corresponding to the minimum value and the maximum value of the node coordinates of each dimension.

As illustrated in FIG. 14A, five jobs indicated by job1 to job5 are allocated to the 9 (horizontal axis)×7 (vertical axis) Hash coordinates. For example, in FIG. 14A, the coordinates (node coordinates) of four corners (vertices) of job4 are (1, 4), (4, 4), (1, 6), and (4, 6). Therefore, the maximum value of the horizontal axis side of the node coordinates of job4 is 4 and the minimum value thereof is 1.

In this case, as illustrated in FIG. 14C, job4 is associated with the entry corresponding to the coordinate value 1 and the entry corresponding to the coordinate value 4 in the Hash table 133a of the dimension of the horizontal coordinates. Similarly, since the maximum value of the vertical axis side of the node coordinates of job4 is 6 and the minimum value thereof is 4, as illustrated in FIG. 14B, job4 is associated with the entry corresponding to the coordinate value 4 and the entry corresponding to the coordinate value 6 in the Hash table 133b of the dimension of the horizontal coordinates.

Specifically, in such association, that is, the registration in the Hash table 133, the pointer is registered in the job management structure 131a of the corresponding job by using the maximum value and the minimum value of the coordinates as a key. In addition, the pointer is registered in the job management structure 131a at the time of starting the execution of the corresponding job.

The collision of the Hash values is processed by a "Hash bucket method". That is, the structure corresponding to the same key is connected by the pointer.

The number of entries of the Hash information 133 corresponding to the $i^{th}$ dimension is $M(i)-L(i)+1$. In principle, the coordinates themselves are not used as keys. A quotient obtained by dividing the coordinate value by d (d is an integer equal to or greater than 2) may be used as a key. In that case, the number of Hash entries is reduced to a minimum integer equal to or greater than $(M(i)-L(i)+1)/d$, but there is a disadvantage that the key collision rate is increased.

The key collision is processed by a Hash bucket method, that is, a method of queuing a pointer storage region.

A method of searching for an empty region by using the Hash table 133 in the parallel computer system 1 as an example of an embodiment will be described below with reference to the flowcharts of FIGS. 15 to 17.

However, before the corresponding description, the terms are defined below.

In the following, since there are many cases where only the position relationships of the coordinates of "node" are issued as problems, "node" is referred to as "point", focusing on only the coordinates, because the geometric image is easy for understanding.

The points of "corners" of an "N-dimensional cuboid" or "vertices" are points at which the coordinates of each dimension become minimum or maximum in the cuboid.

First, note the condition that two (N-dimensional) cuboid regions having the following parameters intersect with each other in the network of the N-dimensional mesh or torus.

Minimum Value Shape Parameter Maximum Value $$((x(1), \ldots, x(N))(s(1), \ldots, s(N))((X(1), \ldots, (X(N)))$$

$$((y(1), \ldots, y(N))(t(1), \ldots, t(N))((Y(1), \ldots, (Y(N)))$$

Here, $\forall i \in \{1, 2, \ldots, N\}$ $X(i)=x(i)+s(i)-1$ and $Y(i)=y(i)+t(i)-1$ The condition that two regions intersect with each other is that $[x(i), X(i)]$ and $[y(i), Y(i)]$ have the common part for at least one $i \in \{1, 2, \ldots, N\}$. That is, the cases are divided according to the magnitude relationship of $x(i)$ and $y(i)$ and are shown as follows.

$(x(i) \leq y(i)$ and $y(i) \leq X(i))$ or $(y(i) < x(i)$ and $x(i) \leq Y(i))$

In a case where it is determined that there is no cuboid region having a necessary shape parameter in the vicinity of a certain point, the search is performed while changing a point being the reference of the search. Hereinafter, the "search reference point" indicates a point changed during the search and it should be noted that it is generally different from a reference point determined corresponding to an attribute value of a job. The reference point corresponding to the attribute value of the job is an initial value of the "search reference point".

The "empty region" having a specific shape parameter shape in the vicinity of the reference point p of the search has a "shape parameter shape" and is none other than a "region not intersecting with a "node region already used by other job" existing in the vicinity of the point p.

Therefore, when one cuboid region is taken and it is determined that the region does not intersect with the cuboid region used by the close job, the search is ended. When $(x(1), \ldots, x(N))$, $(s(1), \ldots, s(N))$, $((X(1), \ldots, (X(N))$ is fixed by the above-described symbol and $(y(1), \ldots, y(N))$, $(t(1), \ldots, t(N))$, $((Y(1), \ldots, (Y(N))$ is moved to a region occupied by the "close job", the condition that $[x(i), X(i)]$ and $[y(i), Y(i)]$ do not intersect with each other for all $i \in \{1, 2, \ldots, N\}$ means that the above condition is not established. Therefore, the cases are divided according to the magnitude relationship of $x(i)$ and $y(i)$ and are shown as follows.

$(x(i) \leq y(i)$ and $X(i) < y(i))$ or $(y(i) < x(i)$ and $Y(i) < x(i))$

When noting $x(i) < X(i)$ and $y(i) < Y(i)$, the following condition is simplified as follows.

$(X(i) < y(i))$ or $(Y(i) < x(i))$

This condition can be rephrased with the shape parameters and the coordinates of vertices. For example, it can be written in the form of the condition using the shape parameter of one region as follows.

$(x(i)+s(i)) < y(i))$ or $(Y(i) < X(i)-s(i))$

Furthermore, when rewritten, it can be expressed as the following form.

$(s(i) < y(i)-(xi))$ or $(s(i) < X(i)-Y(i))$

Consequently, an "absolute value of a difference of coordinates of vertices" may be greater than the shape parameter.

By sequentially selecting "candidates of the empty region" in the search processing of the "empty region", it is checked whether the above condition is established at all coordinate axes with respect to the "region being used by the running job" where the difference of each coordinate exists within the range of the difference of the shape parameters. As the checking result, when the above condition is established, the search is successful.

The "search range" at a certain time is a "cuboid where an absolute value of a difference of coordinates of each dimension from the "search reference point" is below the shape parameter". When there are one or more "regions being used by the running job" in the "search range", the search range is widened by adding the vertices of these regions to the set of "search reference point" candidates of the next step (in a case where the "empty region" having a predetermined shape parameter within the search range of the current point is not found). The "search reference point" uses the case where the "remote degree" for the coordinates of the "reference point defined by the job attribute" from the "unused vertex as the "search reference point" at the search processing so far" is small.

Next, the selection of the "candidates of the empty region" will be described.

The "region having the shape parameter shape existing in the vicinity of the "search reference point"" may be the empty region that does not intersect with the "region used by the running job" existing within the "search range" because it is obvious from the above contents that it is sufficient if found within the "search range". In a case where there is no region used by the running job within the range, the region of the shape parameter shape including the reference point satisfies any search condition. In the following, there is at least one job running within the "search range".

Hereinafter, that two points are "in contact" is used as meaning that one coordinate axis has 1 as an absolute value of a difference of coordinates of two points and the coordinates of the remaining coordinate axes are all equal to one another.

In addition, an "(N−k)-dimensional boundary (of a certain N-dimensional cuboid)" is used as meaning a partial region having a common value in that values in k coordinate axes are different and values in the remaining N−k coordinate axes are all one of the minimum value or the maximum value of all coordinate axes.

For example, the two-dimensional boundary of the case of the three-dimensional cuboid is a point on a side.

That a certain point and "(N−k)-dimensional boundary" are "in contact" is used as meaning that an absolute value of a difference of coordinates from the point belonging to "(N−k)-dimensional boundary" is 1 in k coordinate axes where points belonging to the "(N−k)-dimensional boundary" has a common value. In addition, that two cuboid regions are "in contact" is used as meaning that at least one point in the (N−1)-dimensional boundary "contacts" the other (N−1)-dimensional boundary.

The selection of the candidates of the empty region in the present embodiment is based on the addition of the limitation condition, under the following consideration, in the "relationship of the vertex of the empty region and the (N−1)-dimensional boundary of the region being used by the job within the search range" in a state in which "the empty region of the designated shape parameter is found within the above-described search range in some methods".

The found empty region is parallel-shifted in a direction of one or more coordinate axes to "contact" at least one of the cuboid regions being used by the running job. By repeating the parallel shift, one vertex of the empty region may be moved to the position "contacting" at least one of the vertices of the cuboid regions being used by at least one running job.

The selection of the empty region candidates in the present embodiment is based on the policy of the "search of the "empty region" moved to the position contacted by at least one vertex in the vertices of other region being used"

as described above. In other words, the cuboid region having a certain designated shape parameter and having a vertex at the position "contacting" at least one "vertex of the cuboid region being used by the running job" is set as the candidates of the "empty region".

In the following, when considering that the state in which one vertex of the "empty region (candidates)" is moved to the position "contacting" "at least one of the vertices of the cuboid regions being used by the running job", the vertex of the empty region (candidates) is referred to as a "start point of the search".

Figure 18:
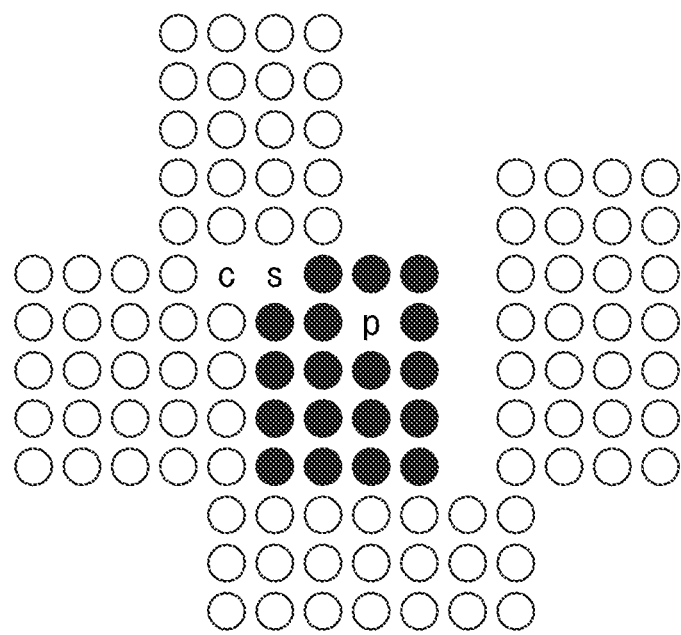
FIG. 18 is a diagram describing a search start point in a parallel computer system as an example of the embodiment.

FIG. 18 is a diagram describing the search start point in the parallel computer system 1 as an example of an embodiment.

The example illustrated in FIG. 18 shows a state in which the "search start point" is set as s by selecting c as the "search reference point" at a certain time and setting the "reference point defined by the job attribute" as p.

In the case of the mesh network of the present embodiment, the coordinates of the vertex of the candidate of the "empty region" and the coordinates of the vertex of the region being used by other job are limited in the range of "above the minimum value and below the maximum value in the coordinates of each dimension".

In the case of the torus network, since there is the wrap around link, the "absolute value of a difference of coordinates" needs to be replaced with "absolute minimum surplus" by using modulo (divisor) for "the size of the network in each dimension (=maximum value of coordinates−minimum value of coordinates+1", instead of being limited at the minimum value and the maximum value of the coordinates of each dimension at the time of searching.

In other words, $\min(|x(i)-y(i)|, d(i)-|x(i)-y(i)|)$ is used by taking the size of the network of the dimension i as $d(i)=M(i)-L(i)+1$ and taking $|x(i)-y(i)|$ in the mesh.

In the flowcharts illustrated in FIGS. 15 to 17, the meaning of the symbols is as follows.

$p=(p(1), \ldots, p(N))$: reference point corresponding to the job attribute value Shape=$(s(1), \ldots, s(N))$: shape parameter CL=$(C(1)=(c(1, 1), c(1, 2), \ldots, c(1, N)), C(2)=(c(2, 1), c(2, 2) \ldots, c(2, N)), \ldots )$: search reference point list CL_NEXT: list of reference points added when the search range is expanded to the outside CL(job): list obtained when "vertices" of each job are arranged in order of "nearness to p"

NL(job): list of points of half of side near to p in CL(job)

NL: list of points of half of side close to p in CL

FL(job): list of points of half of side far from p in CL(job)

FL: list of points of half of side far from p in CL

SL: "search start point" list

It is initialized and used in a "list of points of the outside of a job adjacent to a vertex c of a job".

When the coordinate axes "in contact" to vertices $v=(y(1), y(2), \ldots, y(N))$ of a job j being executed by $s \in SL$, $s=(x(1), x(2), \ldots, x(N))$ are set as $i(1), \ldots, i(k), |x(i(1))-y(i(1))|=|x(i(2))-y(i(2))|=\ldots=|x(i(k))-y(i(k))|=1$.

R: "search range"; cuboid region where an absolute value of a difference of coordinates of each dimension from a certain point q is below the shape parameter RL: "search range list"; list of "search range" defined as below with respect to a point w When the search reference point corresponds to the job attribute value, R is limited by the maximum value and the minimum value of coordinates of each dimension of the network.

When the search reference point contacts the job, R is also limited by the coordinates of the adjacent job.

Figure 15:
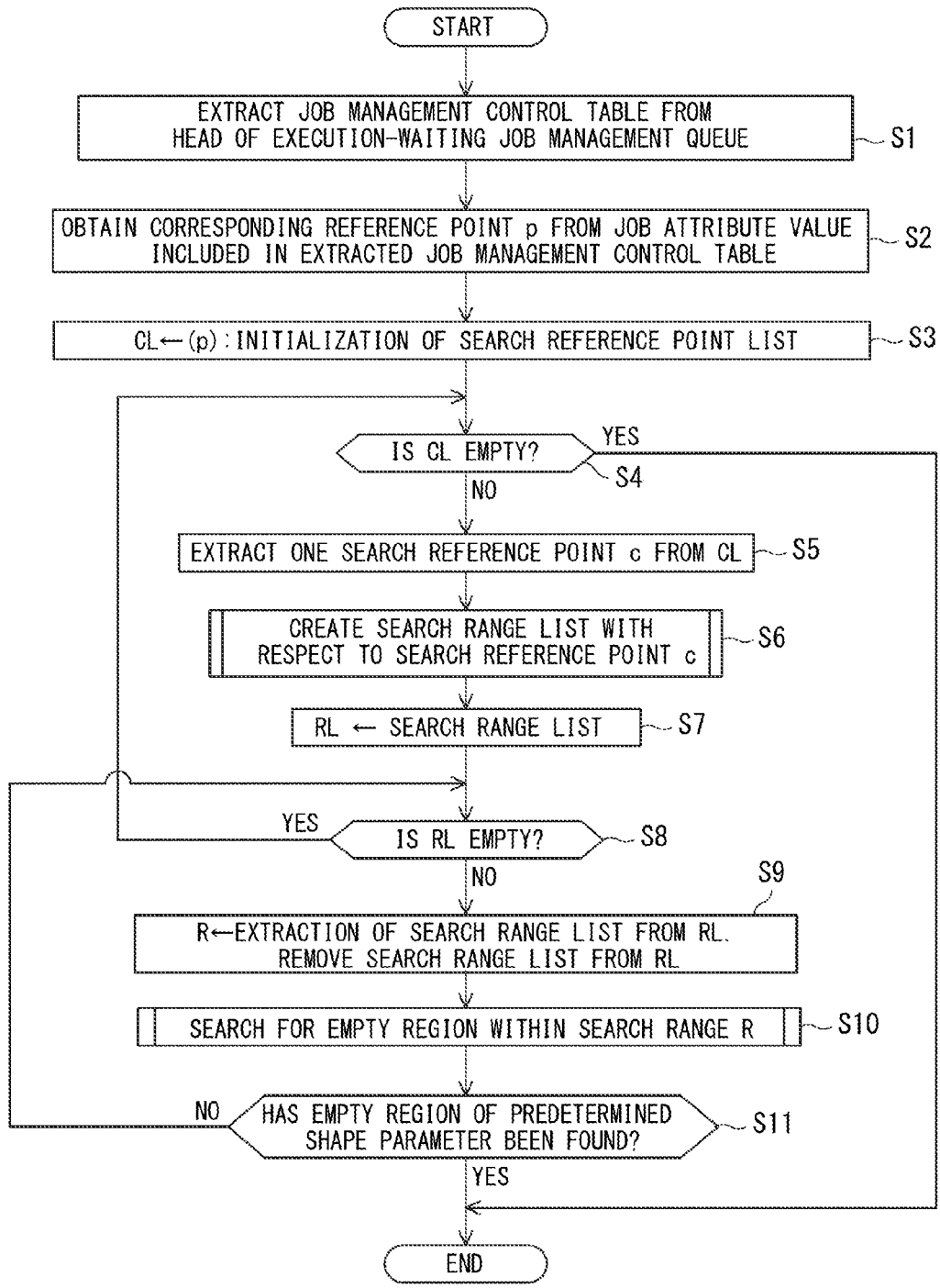
FIG. 15 is a flowchart describing a method of searching for an empty region by using a Hash table in a parallel computer system as an example of an embodiment.

JL_ALL: list of jobs having the "search reference point" being used at the vertex Job: job including the vertex of the search reference point In step S1 of FIG. 15, the allocation candidate node set searching unit 13 extracts a job management control table from a head of the execution-waiting job management queue 131.

In step S2, the allocation candidate node set searching unit 13 obtains a corresponding reference point p from a job attribute value included in the extracted job management control table 131a.

In step S3 of FIG. 15, an initialization of a search reference point list is performed by setting (p) to CL. Then, in step S4 of FIG. 15, it is checked whether CL is empty.

As the checking result, in a case where CL is empty (see YES route of step S4), the processing is ended. On the other hand, in a case where CL is not empty (see NO route of step S4), the processing proceeds to step S5.

In step S5 of FIG. 15, the allocation candidate node set searching unit 13 extracts one search reference point c from CL. In step S6 of FIG. 15, the allocation candidate node set searching unit 13 creates a search range list with respect to the search reference point c. Details of the processing of step S6 will be described below with reference to FIG. 16.

In step S7 of FIG. 15, the allocation candidate node set searching unit 13 sets the search range list to RL.

In step S8 of FIG. 15, it is checked whether RL is empty.

As the checking result, in a case where RL is empty (see YES route of step S8), the processing proceeds to step S4. On the other hand, in a case where RL is not empty (see NO route of step S8), the processing proceeds to step S9.

In step S9 of FIG. 15, the allocation candidate node set searching unit 13 extracts the search range list from RL and sets the search range list to R. The search range extracted from RL is removed.

In step S10 of FIG. 15, the allocation candidate node set searching unit 13 searches for an empty region within the search range R. Details of the processing of step S10 will be described below with reference to FIG. 17.

In step S11 of FIG. 15, the allocation candidate node set searching unit 13 checks whether the empty region of a predetermined shape parameter has been found. In a case where the empty region of the predetermined shape parameter has not been found (see NO route of step S11), the processing returns to step S8. In addition, in a case where the empty region of the predetermined shape parameter has been found (see YES route of step S11), the processing is ended.

Next, the processing of step S6 of the flowchart of FIG. 15 will be described with reference to the flowchart of FIG. 16 (steps T1 to T9).

Figure 16:
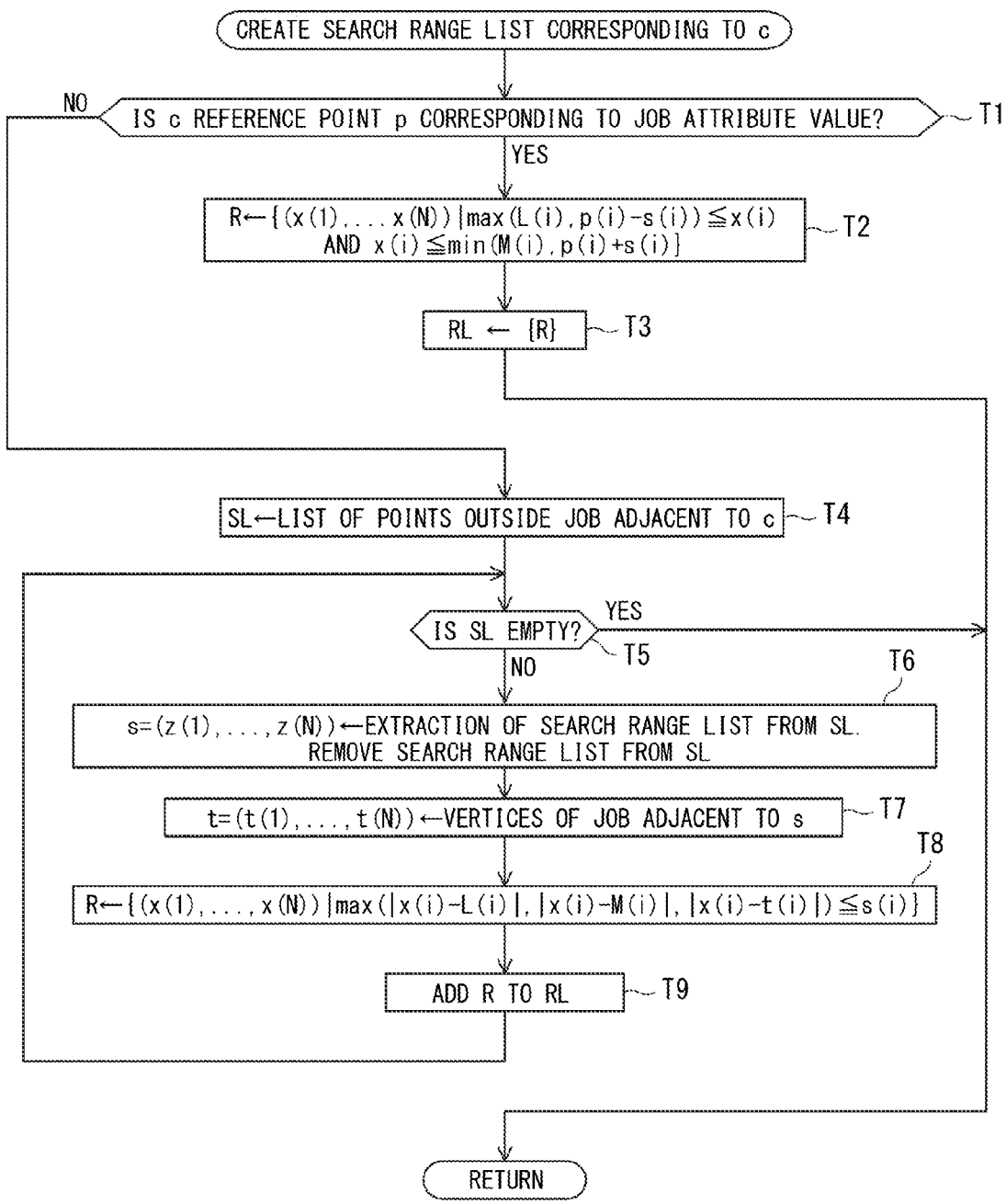
FIG. 16 is a flowchart describing a method of searching for an empty region by using a Hash table in a parallel computer system as an example of an embodiment.

In order to create the search range list corresponding to the search reference point c, in step T1 of FIG. 16, the allocation candidate node set searching unit 13 checks whether c is the reference point p corresponding to the job attribute value.

In a case where c is the reference point p corresponding to the job attribute value (see YES route of step T1), in step T2 of FIG. 16, $\{(x(1), \ldots, x(N)) | \max(L(i), p(i)-s(i)) \le x(i)$ and $x(i) \le \min(M(i), p(i)+s(i))$ are set to R. After that, in step T3 of FIG. 16, the processing is ended by setting {R} to RL.

On the other hand, in a case where c is not the reference point p corresponding to the job attribute value (see NO route of step T1), in step T4 of FIG. 16, the allocation candidate node set searching unit 13 sets a list of points outside the job adjacent to c to SL.

In step T5 of FIG. 16, it is checked whether SL is empty. As the checking result, in a case where SL is empty (see YES route of step T5), the processing is ended. On the other hand, in a case where SL is not empty (see NO route of step T5), in step T6 of FIG. 16, the allocation candidate node set searching unit 13 extracts the search range list from SL and sets the extracted search range list to s=(z(1), ..., z(N)). The search range extracted from SL is removed.

In step T7 of FIG. 16, the allocation candidate node set searching unit 13 sets the vertices of the job adjacent to s to t=(t(1), ..., t(N)).

In step T8 of FIG. 16, $\{(x(1), \ldots, x(N))\} \max(|x(i)-L(i)|, |x(i)-M(i)|, |x(i)-t(i)|) \leq s(i)|$ is set to R. In step T9 of FIG. 16, R is added to RL and the processing returns to step T5.

Next, the processing of step S10 of the flowchart of FIG. 15 will be described with reference to the flowchart of FIG. 17 (steps U1 to U13).

Figure 17:
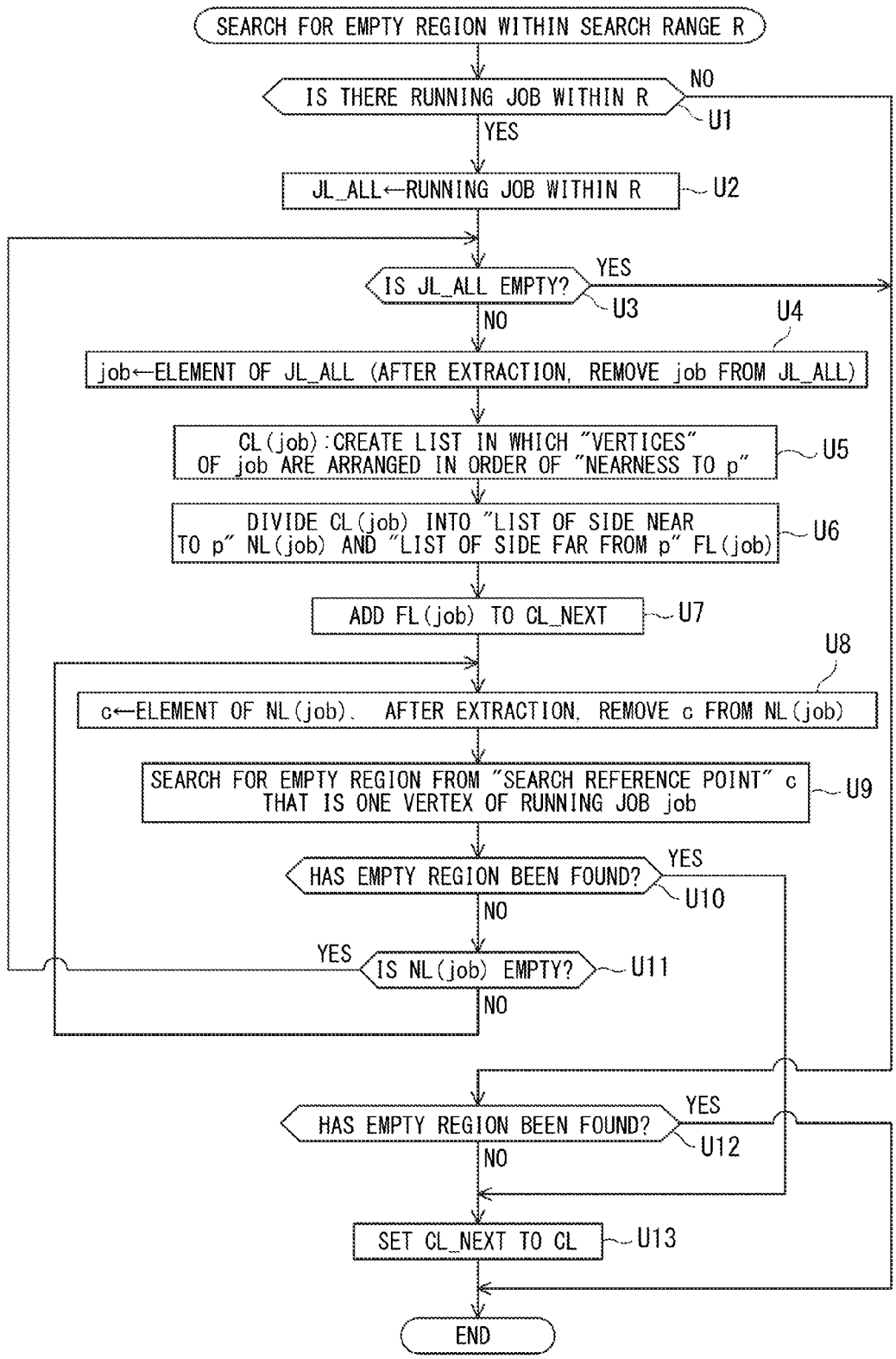
FIG. 17 is a flowchart describing a method of searching for an empty region by using a Hash table in a parallel computer system as an example of an embodiment.

In order to achieve the method of searching for the search range R, in step U1 of FIG. 17, the allocation candidate node set searching unit 13 checks whether there is a running job within R.

In a case where there is no running job within R (see NO route of step U1), the processing proceeds to step U12. In step U12 of FIG. 17, it is checked whether the empty region has been found. In a case where the empty region has been found (see YES route of step U12), the processing is ended and proceeds to step S11 of FIG. 15.

On the other hand, in a case where the empty region has not been found (see NO route of step U12) in step U12, in step U13 of FIG. 17, the processing is ended by setting CL_NEXT to CL and proceeds to step S11 of FIG. 15.

In addition, in a case where there is the running job within R (see YES route of step U1), in step U2 of FIG. 17, the running job within R is set to JL_ALL.

After that, in step U3 of FIG. 17, it is checked whether JL_ALL is empty. In a case where JL_ALL is empty (see YES route of step U3), the processing proceeds to step U12. In addition, in a case where JL_ALL is not empty (see NO route of step U3), the processing proceeds to step U4.

In step U4 of FIG. 17, the allocation candidate node set searching unit 13 sets the element of JL_ALL to job. The extracted job is removed from JL_ALL.

In step U5 of FIG. 17, the allocation candidate node set searching unit 13 creates a list in which CL(job), that is, the "vertices" of the job, is arranged in order of "nearness to p".

In step U6 of FIG. 17, the allocation candidate node set searching unit 13 divides CL(job) into a "list of a side near to p" NL(job) and a "list of a side far from p" FL(job).

In step U7 of FIG. 17, the allocation candidate node set searching unit 13 adds FL(job) to CL_NEXT.

In step U8 of FIG. 17, the allocation candidate node set searching unit 13 sets the element of NL(job) to c. The extracted c is removed from NL(job).

In step U9 of FIG. 17, the allocation candidate node set searching unit 13 searches for the empty region from the "search reference point" c that is one vertex of the running job.

Here, the processing of step U9 of the flowchart of FIG. 17 will be described with reference to the flowchart of FIG. 19 (steps U901 to U906).

Figure 19:
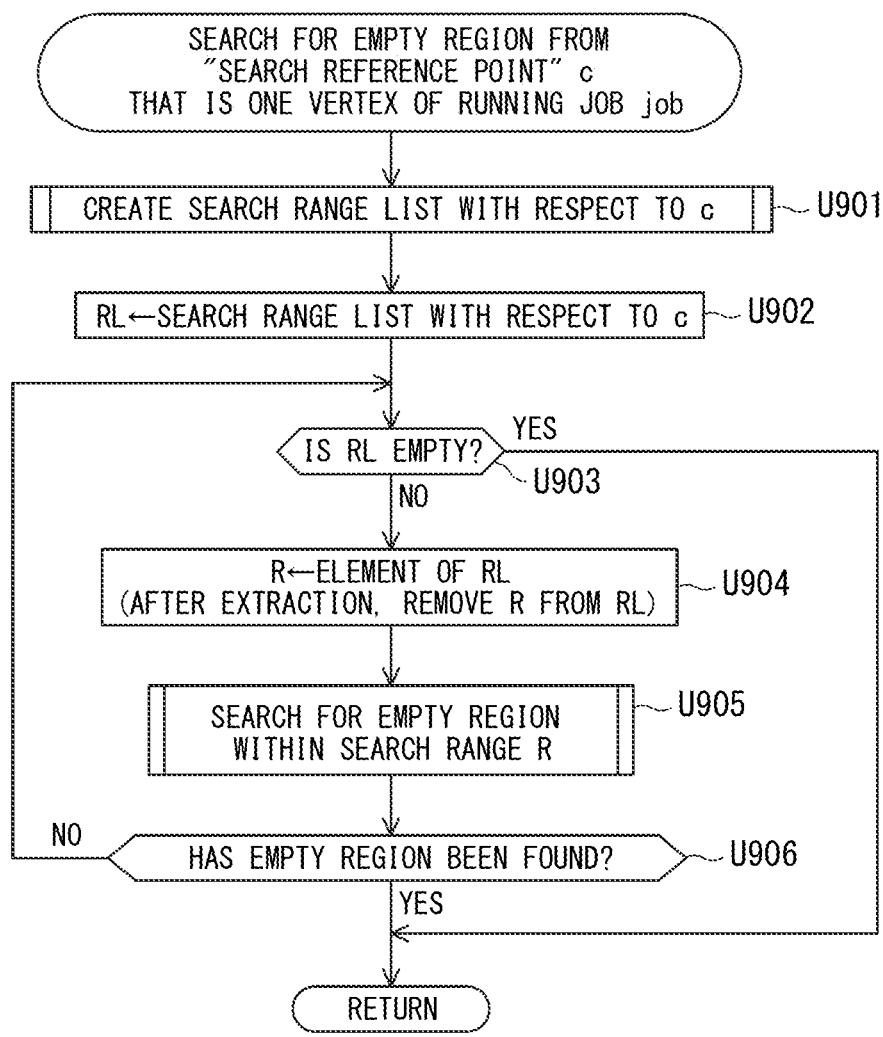
FIG. 19 is a flowchart describing a method of searching for an empty region from a search reference point in a parallel computer system as an example of an embodiment.

In step U901 of FIG. 19, the allocation candidate node set searching unit 13 creates a search range list with respect to c. In step U902 of FIG. 19, the created search range list corresponding to c is set to RL.

In step U903 of FIG. 19, the allocation candidate node set searching unit 13 checks whether RL is empty. As the checking result, in a case where RL is empty (see YES route of step U903), the processing is ended and proceeds to step U10 of FIG. 17. On the other hand, in a case where RL is not empty (see NO route of step U903), the processing proceeds to step U904 of FIG. 19.

In step U904 of FIG. 19, the allocation candidate node set searching unit 13 extracts the element of RL and sets the extracted element to R. The extracted element is removed from RL.

In step U905 of FIG. 19, the allocation candidate node set searching unit 13 searches for an empty region within the search range R. In step U906 of FIG. 19, the allocation candidate node set searching unit 13 checks whether the empty region has been found within the search range R. In a case where the empty region has not been found within the search range R (see NO route of step U906), the processing returns to step U903. In addition, in a case where the empty region has been found within the search range R (see YES route of step U906), the processing is ended and proceeds to step U10 of FIG. 17.

In step U10 of FIG. 17, as the searching result of step U9, it is checked whether the empty region has been found.

In a case where the empty region has been found (see YES route of step U10), the processing proceeds to step U13.

On the other hand, in a case where the empty region has not been found (see NO route of step U10), in step U11 of FIG. 17, it is checked whether NL(job) is empty. In a case where NL(job) is not empty (see NO route of step U11), the processing proceeds to step U8.

In addition, in a case where NL(job) is empty (see YES route of step U11), the processing returns to step U3.

In the first embodiment, the allocation candidate node control unit 14 does not limit an allocation candidate node for each attribute value.

Therefore, when all the jobs input to the system have the specific attribute value, all the nodes may occupy only the jobs of the attribute value. That is, a reserved region for the job of the specific attribute value is not created.

Next, the processing of the reference point allocation processing by the reference point determining unit 12 of the parallel computer system 1 as the first embodiment, which is configured as described above, will be described with reference to the flowcharts of FIGS. 20 to 25.

Figure 20:
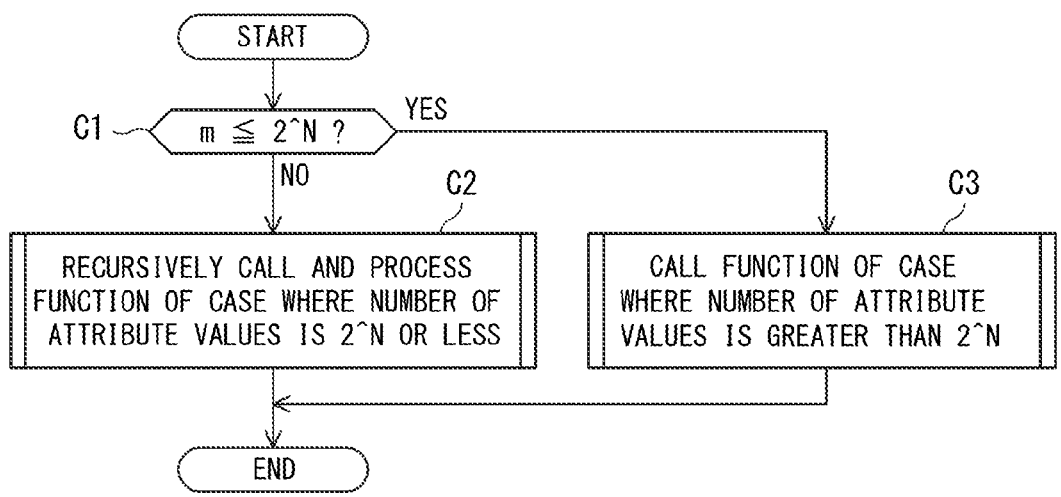
FIG. 20 is a flowchart describing a reference point allocation processing by a reference point determining unit of a parallel computer system of a first embodiment.

In step C1 of FIG. 20, the reference point determining unit 12 checks whether m is less than equal to $2^N$. As the checking result, in a case where m is greater than $2^N$ (see NO route of step C1), the processing proceeds to step C2 of FIG. 20. In step C2, the reference point determining unit 12 recursively calls and processes a function of a case where the number of attribute values is $2^N$ or less. Details of the processing of step C2 will be described below with reference to FIG. 21.

On the other hand, as the checking result of step C1, in a case where m is $2^N$ or less (see YES route of step C1), the processing proceeds to step C3. In step C3 of FIG. 20, the reference point determining unit 12 calls a function of a case where the number of attribute values is $2^N$ or more. Details of the processing of step C3 will be described below with reference to FIG. 25.

Next, the processing of step C2 of the flowchart of FIG. 20 will be described with reference to the flowchart (steps D1 to D12) of FIG. 21.

Figure 21:
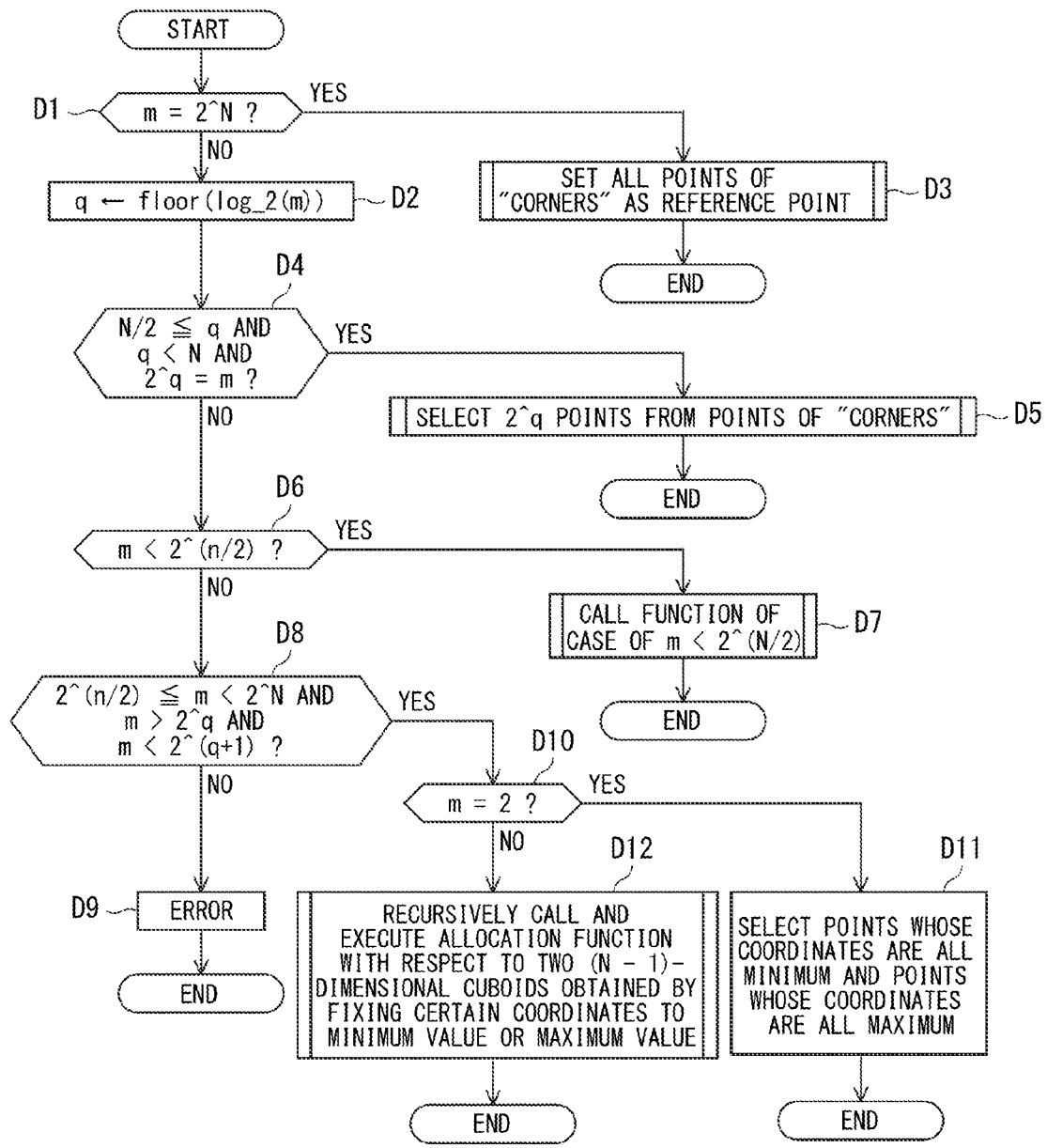
FIG. 21 is a flowchart describing a reference point allocation processing by a reference point determining unit of a parallel computer system of a first embodiment.

In step D1 of FIG. 21, the reference point determining unit 12 checks whether m is equal to $2^N$. As the checking result, in a case where m is equal to $2^N$ (see YES route of step D1), the processing proceeds to step D3. In step D3, the reference point determining unit 12 sets all points of "corners" as reference points and ends the processing.

On the other hand, as the checking result of step D1, in a case where m is not equal to $2^N$ (see NO route of step D1), the processing proceeds to step D2. In step D2 of FIG. 21, floor ($\log\_2(m)$) is set as q.

After that, in step D4 of FIG. 21, the reference point determining unit 12 checks whether $N/2 \leq q$ and $q<N$ and $2^q=m$. As the checking result, in a case where the condition of step D4 is satisfied (see YES route of step D4), in step D5, $2^q$ points are selected from points of "corners" and the processing is ended. Details of the processing of step D5 will be described below with reference to FIG. 22.

In addition, as the checking result, in a case where the condition of step D4 is not satisfied (see NO route of step D4), the processing proceeds to step D6.

In step D6 of FIG. 21, the reference point determining unit 12 checks whether m is less than $2^{(N/2)}$. In a case where m is less than $2^{(N/2)}$ (see YES route of step D6), in step D7 of FIG. 21, the function of $m<2^{(N/2)}$ is read and the processing is ended. Details of the processing of step D7 will be described below with reference to FIG. 23.

As the checking result of step D6, in a case where m is $2^{(N/2)}$ or more (see NO route of step D6), the processing proceeds to step D8.

In step D8 of FIG. 21, it is checked whether $2^{(N/2)} m<2^N$, $m>2^q$, and $m<2^{(q+1)}$. As the checking result, in a case where the condition of step D8 is satisfied (see YES route of step D8), in step D10, the reference point determining unit 12 checks whether m is equal to 2. As the checking result, in a case where m is equal to 2 (see YES route of step D10), in step D11 of FIG. 21, the reference point determining unit 12 selects points whose coordinates are all minimum and points whose coordinates are all maximum and ends the processing.

In addition, as the checking result of step D10, in a case where m is not equal to 2 (see NO route of step D10), in step D12 of FIG. 21, the reference point determining unit 12 recursively calls and executes an allocation function with respect to two (N−1)-dimensional cuboids obtained by fixing certain coordinates to a minimum value or a maximum value and ends the processing. Details of the processing of step D12 will be described below with reference to FIG. 24.

On the other hand, in a case where the condition of step D8 is not satisfied (see NO route of step D8), it is an error (step D9) and ends the processing.

Next, the processing of step D5 of the flowchart of FIG. 21 will be described with reference to the flowchart (steps E1 to E12) of FIG. 22. That is, the case where the number of attribute values is the power of 2 from $2^{(N/2)}$ to $2^N$ is described.

Figure 22:
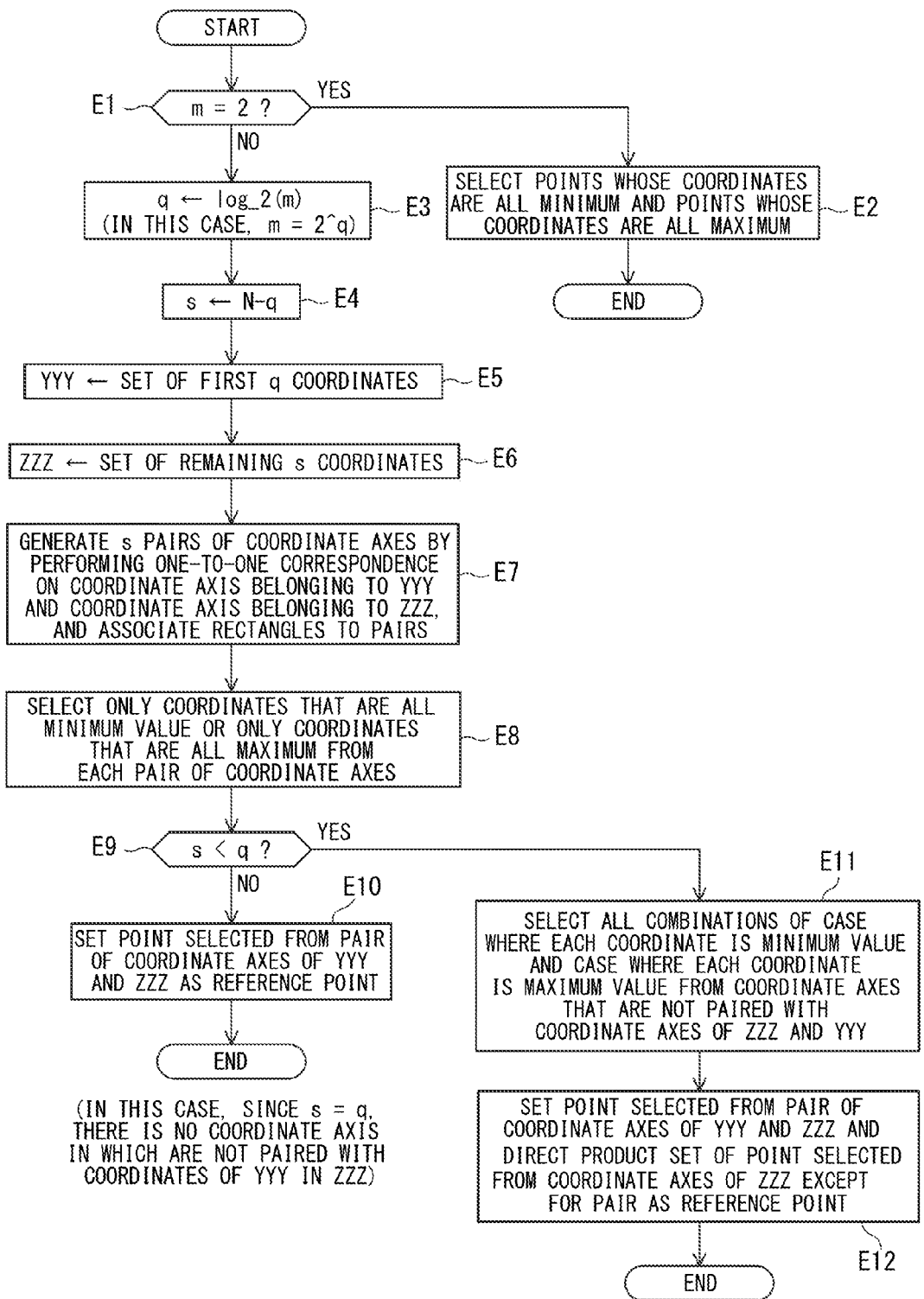
FIG. 22 is a flowchart describing a reference point allocation processing by a reference point determining unit of a parallel computer system of a first embodiment.

In step E1 of FIG. 22, the reference point determining unit 12 checks whether m is equal to 2. In a case where m is equal to 2 (see YES route of step E1), in step E2 of FIG. 22, the reference point determining unit 12 selects points whose coordinates are all minimum and points whose coordinates are all maximum.

In addition, in a case where m is not equal to 2 (see NO route of step E1), in step E3 of FIG. 22, $\log\_2(m)$ is set as q. In this case, $m=2^q$.

The reference point determining unit 12 sets N−q as s in step E4 of FIG. 22 and sets a set of first q coordinates to YYY in step E5 of FIG. 22. In addition, in step E6 of FIG. 22, a set of remaining S coordinates is set as ZZZ.

Then, in step E7 of FIG. 22, the reference point determining unit 12 generates s pairs of coordinate axes by performing one-to-one correspondence on a coordinate axis belonging to YYY and a coordinate axis belonging to ZZZ, and associates rectangles to pairs.

In step E8 of FIG. 22, the reference point determining unit 12 selects only coordinates that are all minimum value or only coordinates that are all maximum from each pair of the coordinate axes.

In step E9 of FIG. 22, the reference point determining unit 12 checks whether s is less than q. As the checking result, in a case where s is q or more (see NO route of step E9), in step E10 of FIG. 22, the reference point determining unit 12 sets a point selected from a pair of coordinate axes of YYY and ZZZ as a reference point and ends the processing.

On the other hand, in a case where s is less than q (see YES route of step E9), in step E11 of FIG. 22, the reference point determining unit 12 selects all combinations of a case where each coordinate is minimum value and a case where each coordinate is maximum value from the coordinate axes that are not paired with the coordinate axes of ZZZ and YYY.

Then, in step E12 of FIG. 22, the reference point determining unit 12 sets a point selected from the pair of coordinate axes of YYY and ZZZ and a direct product set of point selected from the coordinate axes of ZZZ except for the pair as a reference point and ends the processing.

Next, the processing of step D7 of the flowchart of FIG. 21 will be described with reference to the flowchart (steps F1 to F18) of FIG. 23. That is, the case where the number of attribute values is less than $2^{(N/2)}$ is described.

Figure 23:
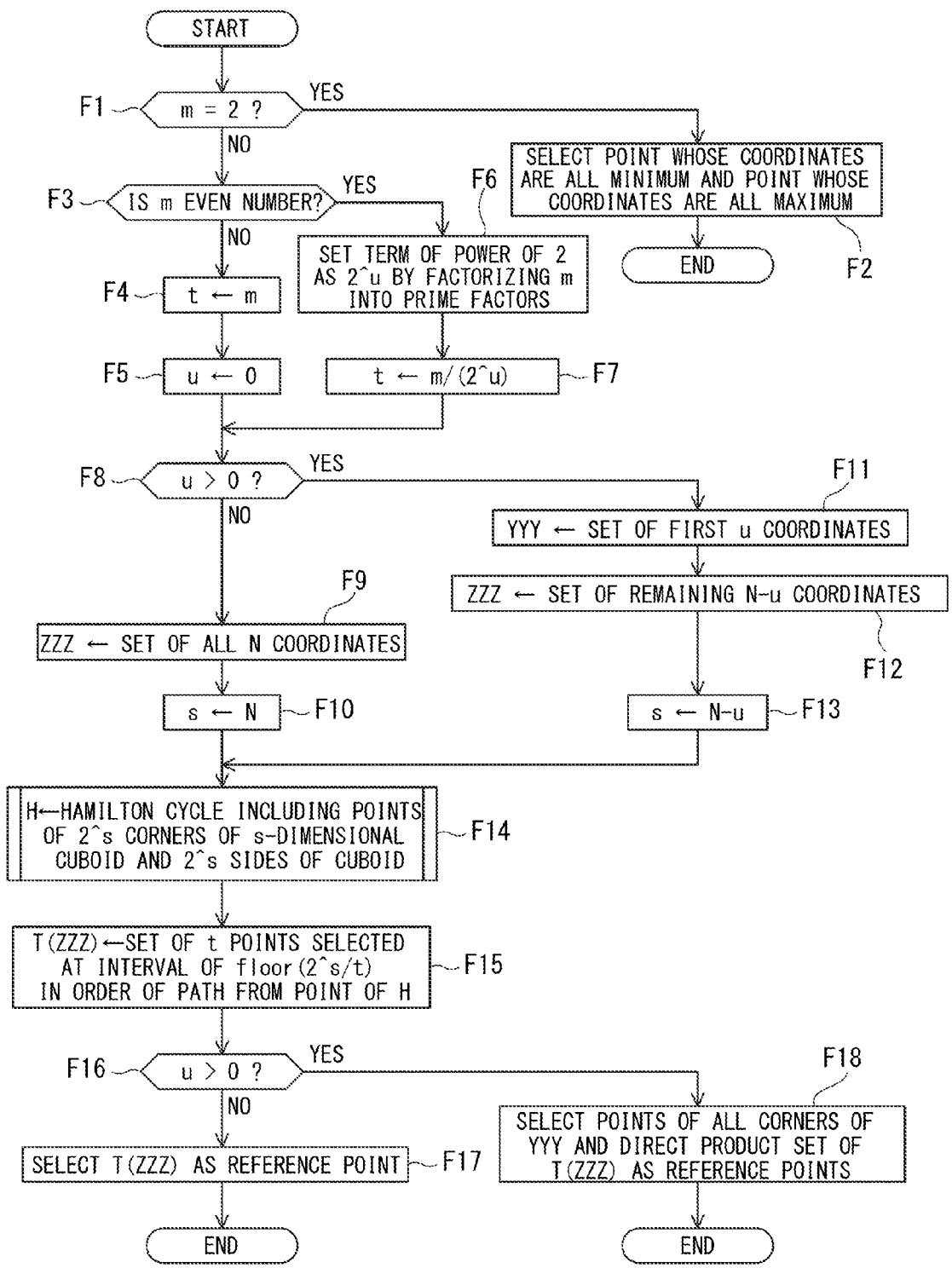
FIG. 23 is a flowchart describing a reference point allocation processing by a reference point determining unit of a parallel computer system of a first embodiment.

In step F1 of FIG. 23, the reference point determining unit 12 checks whether m is equal to 2. In a case where m is equal to 2 (see YES route of step F1), in step F2 of FIG. 23, the reference point determining unit 12 selects points whose coordinates are all minimum and points whose coordinates are all maximum.

On the other hand, in a case where m is not equal to 2 (see NO route of step F1), in step F3 of FIG. 23, the reference point determining unit 12 checks whether m is an even number.

In a case where m is the odd number (see NO route of step F3), in step F4 of FIG. 23, the reference point determining unit 12 sets m to t. In addition, in step F5 of FIG. 23, 0 is set to u.

In a case where m is the even number (see YES route of step F3), in step F6 of FIG. 23, the reference point determining unit 12 sets the term of the power of 2 as $2^u$ by factorizing m into prime factors. In addition, in step F7 of FIG. 23, $m/(2^u)$ is set to t.

In step F8 of FIG. 23, the reference point determining unit 12 checks whether u is greater than 0. In a case where u is 0 or less (see NO route of step F8), in step F9 of FIG. 23, the reference point determining unit 12 sets a set of all N coordinates as ZZZ. In addition, in step F10 of FIG. 23, N is set to s.

On the other hand, in a case where u is greater than 0 (see YES route of step F8), in step F11 of FIG. 23, the reference point determining unit 12 sets a set of first u coordinates as YYY. In addition, in step F12 of FIG. 23, a set of N−u coordinates is set as ZZZ. In step F13 of FIG. 23, N−u is set to s.

In step F14 of FIG. 23, the reference point determining unit 12 sets a Hamilton cycle including points of $2^s$ corners of an s-dimensional cuboid and $2^s$ sides of the cuboid as H.

In step F15 of FIG. 23, the reference point determining unit 12 sets a set of t points selected at an interval of floor($2^s/t$) in order of a path from a point of H as T(ZZZ).

After that, in step F16 of FIG. 23, the reference point determining unit 12 checks again whether u is greater than 0. In a case where u is 0 or less (see NO route of step F16), in step F17 of FIG. 23, the reference point determining unit 12 selects T(ZZZ) as a reference point and ends the processing.

On the other hand, in a case where u is greater than 0 (see YES route of step F16), in step F18 of FIG. 23, the reference point determining unit 12 selects points of all corners of YYY and a direct product set of T(ZZZ) as reference points and ends the processing.

Next, the processing of step D12 of the flowchart of FIG. 21 will be described with reference to the flowchart (steps G1 to G13) of FIG. 24.

That is, the case where the number of attribute values is not the power of 2 from $2^{(N/2)}$ to $2^N$ is described.

In step G1 of FIG. 24, the reference point determining unit 12 checks whether N is equal to 2. In a case where N is not equal to 2 (see NO route of step G1), in step G2 of FIG. 24, the reference point determining unit 12 checks whether m is an even number.

In a case where m is the odd number (see NO route of step G2), the reference point determining unit 12 sets (m−1)/2 to m(1) in step G3 of FIG. 24 and set (m+1)/2 to m(2) in step G4 of FIG. 24.

In a case where m is the even number (see YES route of step G2), in steps G5 and G6 of FIG. 24, the reference point determining unit 12 sets m/2 to m(1) and m(2).

In step G7 of FIG. 24, the reference point determining unit 12 sets an (N−1)-dimensional cuboid in which one arbitrary coordinate is fixed to minimum value as S(1).

In addition, in step G8 of FIG. 24, the reference point determining unit 12 sets a (N−1)-dimensional cuboid in which the same coordinate as the above is fixed to maximum value as S(2) in step G7.

In step G9 of FIG. 24, the reference point determining unit 12 selects m(1) reference points from S(1) and m(2) reference points from S(2) by recursive call of the same function, and sets a combination of two as a total reference point and ends the processing.

In addition, as the checking result of step G1, in a case where N is equal to 2 (see YES route of step G1), in step G10 of FIG. 24, the reference point determining unit 12 checks whether a remote degree is an Euclidean distance or a Chebyshev distance.

In a case where the remote degree is the Euclidean distance or the Chebyshev distance (see YES route of step G10), the processing proceeds to step G11.

In step G11 of FIG. 24, the reference point determining unit 12 selects a total of three points, that is, two points in which one coordinate is the minimum value and the other coordinate is the maximum value or the minimum value, and point in which one coordinate is the maximum value and the other coordinate is an integer part of an average of the minimum value and the maximum value and ends the processing.

In addition, in a case where the remote degree is not the Euclidean distance or the Chebyshev distance (see NO route of step G10), the processing proceeds to step G12.

In step G12 of FIG. 24, the reference point determining unit 12 sets the number of nodes belonging to an entire (rectangular) outer periphery as CC.

Then, in step G13 of FIG. 24, the reference point determining unit 12 selects three points by opening floor(CC/3) at an interval from an arbitrary start point along a Hamilton cycle of a rectangular outer periphery (a path circling an outer periphery in one direction) and ends the processing.

Next, the processing of step C3 of the flowchart of FIG. 20 will be described with reference to the flowchart (steps H1 to H10) of FIG. 25. That is, the case where the number of attribute values is greater than $2^N$ is described.

In step H1 of FIG. 25, the reference point determining unit 12 checks whether N is equal to $2^N+1$. In a case where N is equal to $2^N+1$ (see YES route of step H1), the processing proceeds to step H2. In step H2 of FIG. 25, the reference point determining unit 12 selects a total of ($2^N+1$) points, that is, all of $2^n$ points whose coordinates are the minimum value or the maximum value and point whose coordinates are an integer part of an average of the minimum value and the maximum value and ends the processing.

On the other hand, as the checking result of step H1, in a case where N is not equal to $2^N+1$ (see NO route of step H1), in step H3 of FIG. 25, the reference point determining unit 12 sets floor ($N^{th}$ root of m) as k.

In addition, in step H4 of FIG. 25, the reference point determining unit 12 checks whether m is equal to $k^N$. In a case where m is equal to $k^N$ (see YES route of step H4), the processing proceeds to step H5. In step H5 of FIG. 25, the reference point determining unit 12 sets an integer part of 1/(k−1) of a range of coordinates of each dimension as R(i) and sets entire combinations of k−1 coordinate values with R(i) increments from the minimum value of a coordinate value and k coordinate values of the maximum value of coordinates as reference points.

On the other hand, in a case where m is not equal to $k^N$ (see NO route of step H4), the processing proceeds to step H6.

In step H6 of FIG. 25, the reference point determining unit 12 sets an integer part of 1/k of a range of coordinates of each dimension as R(i) and sets $k^{(N+1)}$ points of entire combinations of k coordinate values with R(i) increments from the minimum value of a coordinate value and k+1 coordinate values of the maximum value of coordinate values as a vertex set V. Then, the reference point determining unit 12 creates graph G(V, E) by setting, a set in which a combination of links connecting nodes included in V by the shortest distance is regarded as one side in V.

Figure 26A:
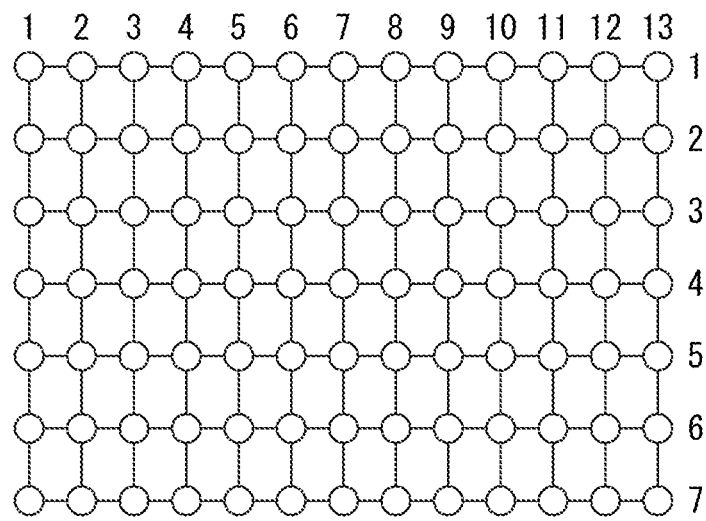
FIGS. 26A, 26B, and 26C are diagrams describing a method of creating a graph G(V, E) in a parallel computer system as an example of an embodiment.
Figure 26B:
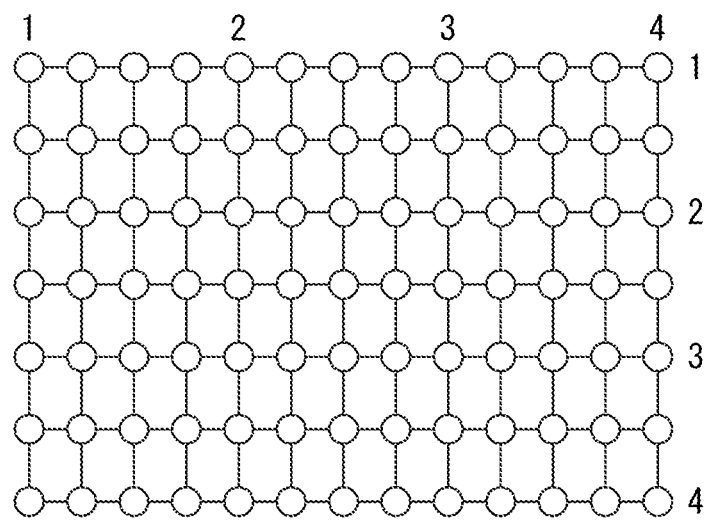
Figure 26C:
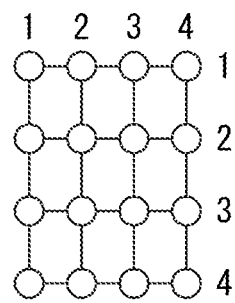

Here, FIGS. 26A, 26B, and 26C are diagrams describing a method of creating the graph G(V, E) in the parallel computer system 1 as an example of an embodiment. FIG. 26A is a diagram illustrating an original network, FIG. 26B is a diagram illustrating a network on which a thinning is being performed from the network illustrated in FIG. 26A, and FIG. 26C is a diagram illustrating a network on which a thinning has been performed from the network illustrated in FIG. 26A.

Here, there is illustrated an example in which N=2 and k=3, and the original network is a two-dimensional mesh of vertical×horizontal=7×13 as illustrated in FIG. 26A.

In the network illustrated in FIG. 26A, the state illustrated in FIG. 26B is provided by placing one node coordinate in the vertical axis and three node coordinates in the horizontal axis, and a state illustrated in FIG. 26C is provided by performing the thinning.

In the example illustrated in FIG. 26C, since the remaining nodes without thinning are spaced apart by 2 hops to 4 hops in the original network, they are not connected by sides in the "graph corresponding to the original network". However, in the processing of step H6, the graph in which "the vertices corresponding to the remaining nodes without thinning are connected by one side in the same direction as the original link" as illustrated in FIG. 26B is considered.

In step H7 of FIG. 25, the reference point determining unit 12 sets $(k+1)^N - m$ as q. Then, in step H8 of FIG. 25, the reference point determining unit 12 obtains integers a and b that are the greatest common divisor d of q and $(k+1)^{\wedge}N$ and $a*q+b*(k+1)^{\wedge}N=d$ by the Euclidean algorithm.

In addition, in step H9, the Hamilton path of the graph G(V, E) is set as H. Then, in step H10 of FIG. 25, the reference point determining unit 12 removes vertices at an interval of |a| from a start point of H and sets points remaining after removing q points from V as a reference point set. However, whenever a multiple of |a| exceeds $(k+1)^{\wedge}N$, a process is resumed at a point distant from the start point by the excess. That is, vertices are removed at an interval of |a| by using $(k+1)^{\wedge}N$ as a module. After that, the processing is ended.

Next, the allocation candidate node search processing by the allocation candidate node set searching unit 13 of the parallel computer system 1 as a first embodiment will be described with reference to the flowcharts illustrated in FIGS. 27 and 28. FIG. 28 is a flowchart illustrating details of the processing of step A11 of FIG. 27 and shows the search of the empty region having the designated shape in a case where a job exists around a reference point.

Figure 27:
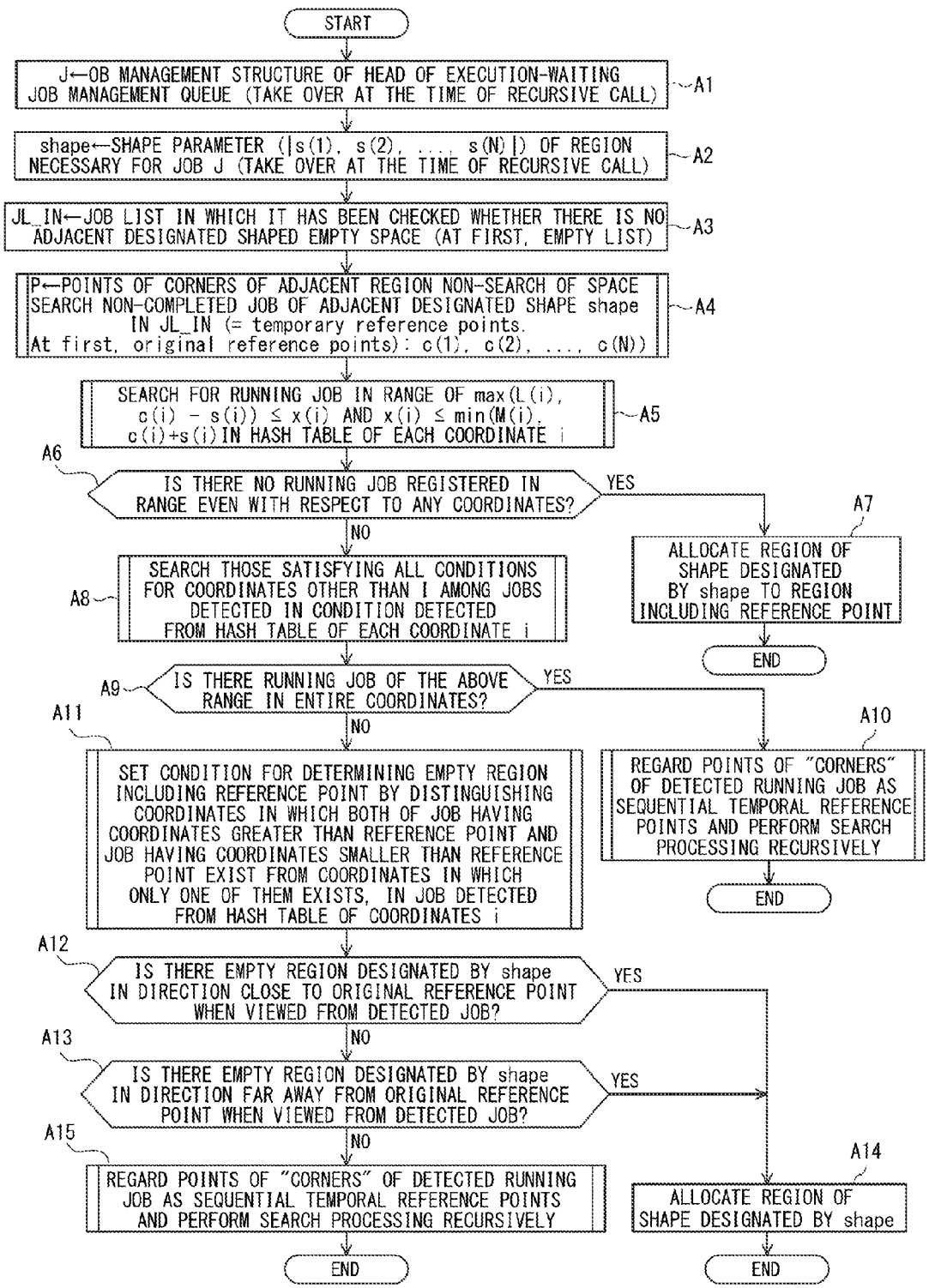
FIG. 27 is a flowchart describing an allocation candidate node search processing by an allocation candidate node set searching unit of a parallel computer system as a first embodiment.
Figure 28:
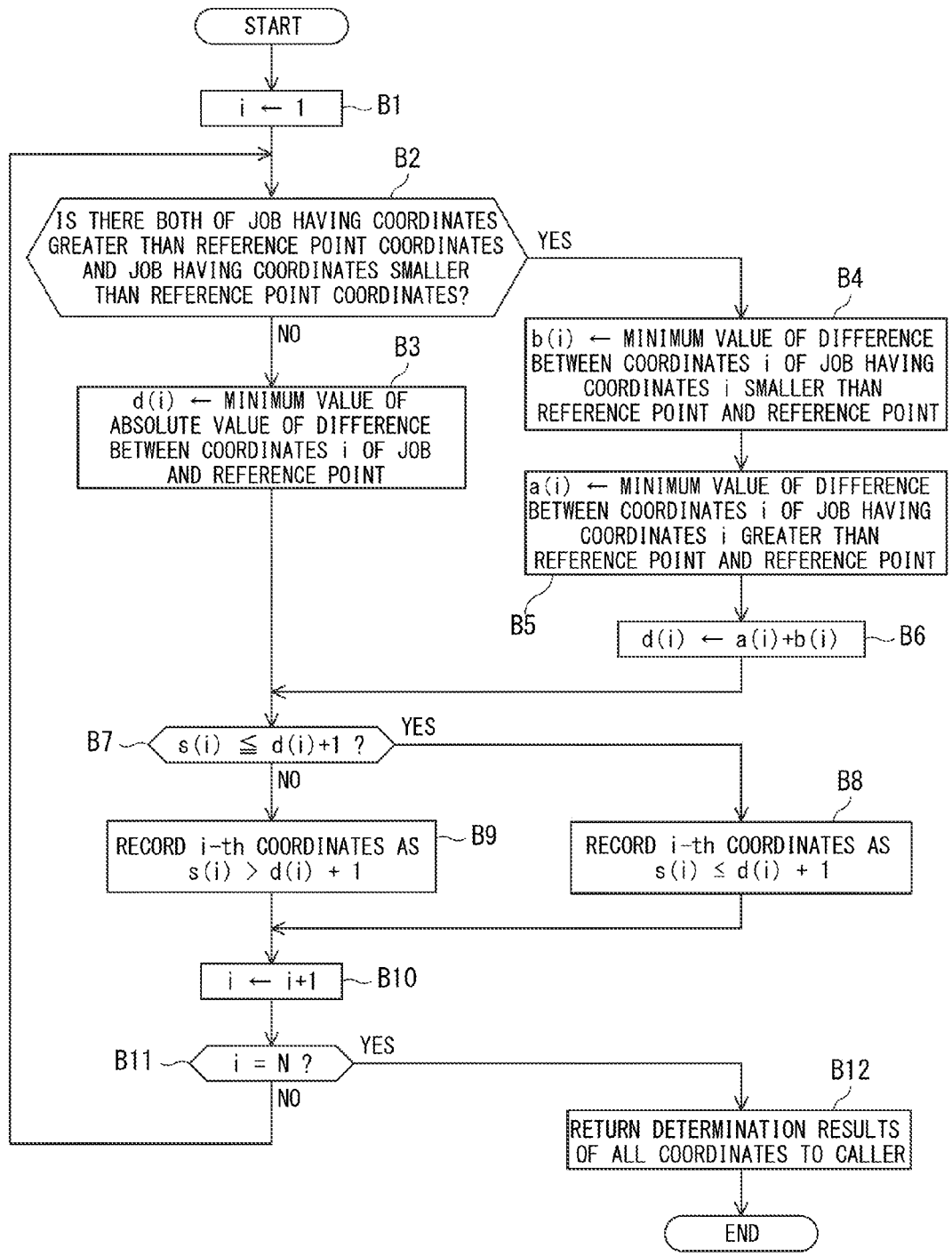
FIG. 28 is a flowchart describing an allocation candidate node search processing by an allocation candidate node set searching unit of a parallel computer system as a first embodiment.

In step A1 of FIG. 27, the allocation candidate node set searching unit 13 extracts a job management structure 131a from a head of an execution-waiting job management queue 131 and sets the extracted job management structure 131a as J. In the case of a recursive call, the job management structure 131a is taken over.

In step A2 of FIG. 27, the allocation candidate node set searching unit 13 sets a shape parameter {s(1), s(2), . . . , s(N)} of a region necessary for the job J as shape. In the case of the recursive call, the shape parameter is taken over.

In step A3 of FIG. 27, the allocation candidate node set searching unit 13 creates a job list JL_IN in which it has been checked whether there is no adjacent designated shaped empty space. At first, the list is empty.

In step A4 of FIG. 27, the allocation candidate node set searching unit 13 sets points c(1), c(2), . . . , c(N)) of corners of an adjacent region non-search of a space search non-completed job of an adjacent designated shape in JL_IN as P. This point is a temporary reference point and is an original reference point at first.

In step A5 of FIG. 27, the allocation candidate node set searching unit 13 searches for a running job in a range of max(L(i), c(i)−s(i))≤x(i) and x(i)≤min(M(i), c(i)+s(i) in a hash table 133 of each coordinate i.

In step A6 of FIG. 27, the allocation candidate node set searching unit 13 checks whether there is no running job registered in the range even with respect to any coordinates. In a case where there is no running job (see YES route of step A6), in step A7 of FIG. 27, the allocation candidate node set searching unit 13 allocates a region of a shape designated by shape to a region including a reference point and ends the processing.

In addition, in a case where there is the running job registered in the range (see NO route of step A6), the processing proceeds to step A8.

In step A8 of FIG. 27, the allocation candidate node set searching unit 13 searches those satisfying all conditions for coordinates other than I among jobs detected in a condition detected from the Hash table of each coordinate i.

In step A9, the allocation candidate node set searching unit 13 checks whether there is a running job of the above range in the entire coordinates.

As the checking result, in a case where there is the corresponding running job (see YES route of step A9), the processing proceeds to step A10.

In step A10 of FIG. 27, the allocation candidate node set searching unit 13 regards points of "corners" of the detected running job as temporal reference points sequentially, performs search processing recursively, and ends the processing.

In addition, as the checking result of step A9, in a case where there is no corresponding running job (see NO route of step A9), the processing proceeds to step A11.

In step A11 of FIG. 27, the allocation candidate node set searching unit 13 sets a condition for determining an empty region including a reference point by distinguishing coordinates in which both of a job having coordinates greater than the reference point and a job having coordinates smaller than reference point exist from coordinates in which only one of them exists, in the job detected from the Hash table of coordinates i. Details of the processing of step A11 will be described below with reference to FIG. 28.

After that, in step A12 of FIG. 27, the allocation candidate node set searching unit 13 checks whether there is an empty region designated by shape in a direction far away from the original reference point when viewed from the detected job. As the checking result, in a case where there is the empty region (see YES route of step A12), the processing proceeds to step A14.

In step A14 of FIG. 27, the allocation candidate node set searching unit 13 allocates a region of a shape designated by shape to a reference point and ends the processing.

In addition, as the checking result of step A12, in a case where there is no empty region (see NO route of step A12), in step A13 of FIG. 27, the allocation candidate node set searching unit 13 checks whether there is an empty region designated by shape in a direction far away from the original reference point when viewed from the detected job.

As the checking result, in a case where there is the empty region (see YES route of step A13), the processing proceeds to step A14. On the other hand, in a case where there is no empty region (see NO route of step A13), the processing proceeds to step A15.

In step A15 of FIG. 27, the allocation candidate node set searching unit 13 regards points of "corners" of the detected running job as temporal reference points sequentially, performs search processing recursively, and ends the processing.

In the above-described flowchart, for example, since the processing of steps A6 and A7 can be omitted because the same processing is redundantly performed.

Next, in step A11 of the flowchart of FIG. 27, the processing of searching for the empty region of the designated shape in a case where there is a job around the reference point will be described with reference to the flowchart (steps B1 to B12) of the flowchart of FIG. 28.

In step B1 of FIG. 28, the allocation candidate node set searching unit 13 sets 1 to a variable i. After that, in step B2 of FIG. 28, the allocation candidate node set searching unit 13 checks whether there are both of a job having $i^{th}$ coordinates greater than the reference point coordinates and a job having $i^{th}$ coordinates smaller than the reference point coordinates. As the checking result, in a case where there is no corresponding job (see NO route of step B2), in step B3 of FIG. 28, the allocation candidate node set searching unit 13 sets a minimum value of an absolute value of a difference between coordinates i of the job and the reference point as d(i) and proceeds to step B7.

On the other hand, as the checking result of step B2, in a case where there is the corresponding job (see YES route of step B2), in step B4 of FIG. 28, the allocation candidate node set searching unit 13 sets the minimum value of the difference between the coordinates i of the job having the coordinates i smaller than the reference point and the reference point as b(i).

In addition, in step B5 of FIG. 28, the allocation candidate node set searching unit 13 sets the minimum value of the difference between the coordinates i of the job having the coordinates i greater than the reference point and the reference point as a(i).

After that, in step B6 of FIG. 28, the allocation candidate node set searching unit 13 sets a(i)+b(i) to d(i) and proceeds to step B7.

In step B7 of FIG. 28, the allocation candidate node set searching unit 13 checks whether s(i) is less than or equal to d(i)+1. As the checking result, in a case where s(i) is d(i)+1 or less (see YES route of step B7), in step B8 of FIG. 28, the $i^{th}$ coordinates are recorded as s(i) d(i)+1.

In addition, as the checking result of step B7, in a case where s(i) is greater than d(i)+1 (see NO route of step B7), in step B9 of FIG. 28, the $i^{th}$ coordinates are recorded as s(i)>d(i)+1.

The allocation candidate node set searching unit 13 increments i (i=i+1) in step B10 of FIG. 28, and checks whether i is equal to N in step B11 of FIG. 28.

In a case where i is not equal to N (see NO route of step B11), the processing proceeds to step B2. In addition, in a case where i is equal to N (see YES route of step B11), in step A12, the allocation candidate node set searching unit 13 returns determination results of all coordinates to the caller and proceeds to step A12 of the flowchart of FIG. 27.

(B) Second Embodiment

In the second embodiment, it is assumed that the network topology is a two-dimensional torus. In the second embodiment, the original distance (one of the Manhattan distance, the Chebyshev distance, and the Euclidean distance) that does not ignore the wrap around link is used as the remote degree function. Therefore, it is assumed that the coordinates are expressed as "coset" of the number of nodes included in each axis (the magnitude of each axis).

That is, since the magnitudes of x-axis direction and y-axis direction are d(1) and d(2), respectively, the coordinates of each axis are as follows.

The range of the x coordinates is 0, 1, 2, . . . , (d(1)−1) (mod d(1)).

The range of the y coordinates is 0, 1, 2, . . . , (d(2)−1) (mod d(2)).

[Processing of Reference Point Determining Unit 12]

In the second embodiment, the cases are divided into (1) to (5) as follows. The case 5 (m>4) is processed by sequentially returning to cases where m is smaller. Details will be described below with reference to FIG. 29.

(1) Case 1: m=1
(2) Case 2: m=2
(3) Case 3: m=3
(4) Case 4: m=4
(5) Case 5: m>4

In the second embodiment, the case of two-dimension is described for convenience, but the case of N-dimension is performed by the same manner as the first embodiment.

(1) Case 1: m=1
A set C of reference points is defined as follows.
That is, in the case of the torus, coordinates (x, y) are substantially equal even when any coordinates are set as a reference point, but for example, C={(0, 0)}.

(2) Case 2: m=2
A set C of reference points is defined as follows.
When d(2)≤d(1), C={(0, 0), ([d(1)/2], 0)}
When d(2)>d(1), C={(0, 0), (0, [d(2)/2])}

(3) Case 3: m=3
A set C of reference points is defined as follows.
When d(2)≤d(1), C={(0, 0), ([d(1)/3], 0), (2*[d(1)/3], 0)}
When d(2)>d(1), C={(0, 0), (0, [d(2)/3])}, (0, 2*[d(2)/3])}

(4) Case 4: m=4
A set C of reference points is defined as follows.
C={(0, 0), ([d(1)/2], 0), (0, [d(2)/2]), ([d(1)/2], [d(2)/2])}
In the case of N=2, the number of reference points is m=3 from the condition.

(4-1) Case 4-1: Case of Using Manhattan Distance as Farness

When M(1)−L(1)=D(1), M(2)−L(2)=D(2), one of nodes on the side of the rectangle is arbitrarily determined, and one-dimensional coordinates circling the rectangle once in one direction are determined by taking a value from 1 to 2*(D(1)+D(2)−1).

When a quotient obtained by dividing CC=2*(D(1)+D(2)−1) by 3 is set as q and a remainder is set as r, CC=3q+r. One-dimensional coordinates of the reference point by q is set as 1, q+1, and 2q+1.

$$q<(D(1)+D(2)-1) \text{ and}(D(1)+D(2)-1)<2q$$

Therefore, when one-dimensional coordinates of L(1) and L(2) are set to 1, the two-dimensional coordinates of the reference point are defined as follows.

In the case of q D(1), {(L(1), L(2)), (L(1)+q, L(2)), (M(1)−(2*q−(D(1)+D(2)−1)), M(2))}

In the case of q>D(1), {(L(1), L(2)), (M(1), L(2)+q−D(1)), (M(1)−(2*q−(D(1)+D(2)−1)), M(2))}

(4-2) Case 4-2: Case of Using Chebyshev Distance and Euclidean Distance as Farness As N=2M(1)−L(1)=D(1), M(2)−L(2)=D(2), with respect to two sides (parallel accordingly) faced to have a length of the not-smaller one (max((D(1), D(2))) of D(1) and D(2), a point closest to point of both ends of one side and the center point of the other side is taken.

For example, when D(2) D(1), three points of {(L(1), L(2)), (M(1), L(2)), ([(L(1)+M(1))/2], M(2))} are set as reference points.

Next, N>2. It sequentially returns to a setting method of a case where the dimension of a cuboid is below 1. According to the condition in the farness to be used, the case of two-dimension finally returned is divided as above, but the procedure returned to the case of dimension under 1 is not dependent on the farness. However, the case is divided into odd number and even number as follows.

When m is an even number, m is divided as follows.

$$m=m/2+m/2$$

$2^{((N-1)/2)}$ m/2<$2^{(N-1)}$ and m/2 is not the power of 2. (since m is not the power of 2). In this case, m/2 reference points are determined with respect to each of two cuboids of two (N−1)-dimensions where the value of one coordinate axis is fixed to a minimum value or a maximum value, and the sum set thereof is taken to determine m reference points.

When m is an odd number, m is divided as follows, while noting m>1 from the condition.

$$m=(m-1)/2+(m+1)/2$$

The following both are established. One of (m−1)/2 and (m+1)/2 may be the power of 2. However, in a case where one of (m−1)/2 and (m+1)/2 is the power of 2, the method of determining the reference point is already described above (see the case 2 above).

$$2^{\wedge}((N-1)/2)(m-1)/2 < 2^{\wedge}(N-1)$$

$$2^{\wedge}((N-1)/2)(m+1)/2 < 2^{\wedge}(N-1)$$

Therefore, even in this case, with respect to each of two cuboids of two (N−1)-dimensions where the value of one coordinate axis is fixed to a minimum value or a maximum value, (m−1)/2 reference points are determined in one cuboid, (m+1)/2 reference points are determined in the other cuboid, and the sum set thereof is taken to determine m reference points.

(5) Case 5: m>4

(5-1) Case 5-1: m is not a prime number

Since m has a plurality of prime factors, there are two integers p and q that make m=p*q (p>1, q>1).

When g(1)=[d(1)/p], h(1)=[d(2)/q], p and q are selected to make |g(1)−h(1)| become minimum.

Furthermore, g(2)=[d(1)/m], h(2)=[d(2)/m]

The processing is divided according to which one of |d(1)−g(2)|, |d(2)−g(1)|, and |g(1)−h(1)| is minimum.

In a case where |d(1)−g(2)| is minimum, a set C of reference points is defined as follows.

$$C=\{(j*g(2),0)|0 \leq j \leq g(2)-1, \text{ where } j \text{ is an integer}\}$$

In a case where |d(2)−g(1)| is minimum, a set C of reference points is defined as follows.

$$C=\{(0,k*h(2))|0 \leq k \leq h(2)-1, \text{ where } k \text{ is an integer}\}$$

In a case where |g(1)−h(1)| is minimum, a set C of reference points is defined as follows.

$$C=\{(j*g(1),k*h(1))|0 \leq j \leq (p-1), 0 \leq k \leq (q-1), \text{ where both } j \text{ and } k \text{ are integers}\}$$

(5-2) Case 5-2: m is a Prime Number

Since m+1 is not a prime number, there are two integers p and q that make m+1=p*q (p>1, q>1).

When g(1)=[d(1)/p], h(1)=[d(2)/q], p and q are selected to make |g(1)−h(1)| become minimum.

Furthermore, g(2)=[d(1)/m], h(2)=[d(2)/m]

The processing is divided according to which one of |d(1)−g(2)|, |d(2)−g(1)|, and |g(1)−h(1)| is minimum.

In a case where |d(1)−g(2)| is minimum, a set C of reference points is defined as follows.

$$C=\{(j*g(2),0)|0 \leq j \leq g(2)-1, \text{ where } j \text{ is an integer}\}$$

In a case where |d(2)−h(2)| is minimum, a set C of reference points is defined as follows.

$$C=\{(0,k*h(2))|0 \leq k \leq h(2)-1, \text{ where } k \text{ is an integer}\}$$

In a case where |g(1)−h(1)| is minimum, a set C of reference points is defined as follows.

$$C=\{(j*g(1),k*h(1))|0 \leq j \leq (p-1), 0 \leq k \leq (q-1), \text{ where both } j \text{ and } k \text{ are integers and are not 0 at the same time}\}$$

In the second embodiment, with respect to each job, the allocation candidate node set searching unit 13 searches for a region having a shape designated not to include nodes being used by other jobs from the side where a remote degree from a reference point corresponding to a certain specific attribute value is small.

One of the Manhattan distance, the Chebyshev distance, and the Euclidean distance is used as the remote degree.

However, the distance herein is an original distance as a torus.

The others are the same as the first embodiments, but the search range of the allocable range is limited by the inequality condition in the following allocation candidate node limiting mechanism.

In the second embodiment, the allocation candidate node control unit 14 limits the allocation candidate by the combination of the inequality condition related to the values of each coordinate axis from the corresponding reference point with respect to each attribute value.

The combination of the inequality can be arbitrarily defined unless overlapped.

When the coordinates of the reference point is (a(0), b(0)), (a(1), b(1)) . . . , (a(m), b(m)), a plurality of combinations of inequalities (however, one equality is possible) in any one of the following forms is defined with respect to each reference point for 1 j m.

$$x(j)-a(j)=A(j) \text{ and } B(j) \leq y(j)-b(j) \leq C(j)$$

$$A(j) \leq x(j)-a(j) \leq B(j) \text{ and } C(j) \leq y(j)-b(j) D(j)$$

$$A(j) \leq x(j)-a(j) \leq B(j) \text{ and } C(j)=y(j)-b(j)$$

The allocation candidate node control unit 14 may perform the same processing to the first embodiment or the third embodiment to be described below.

Figure 29:
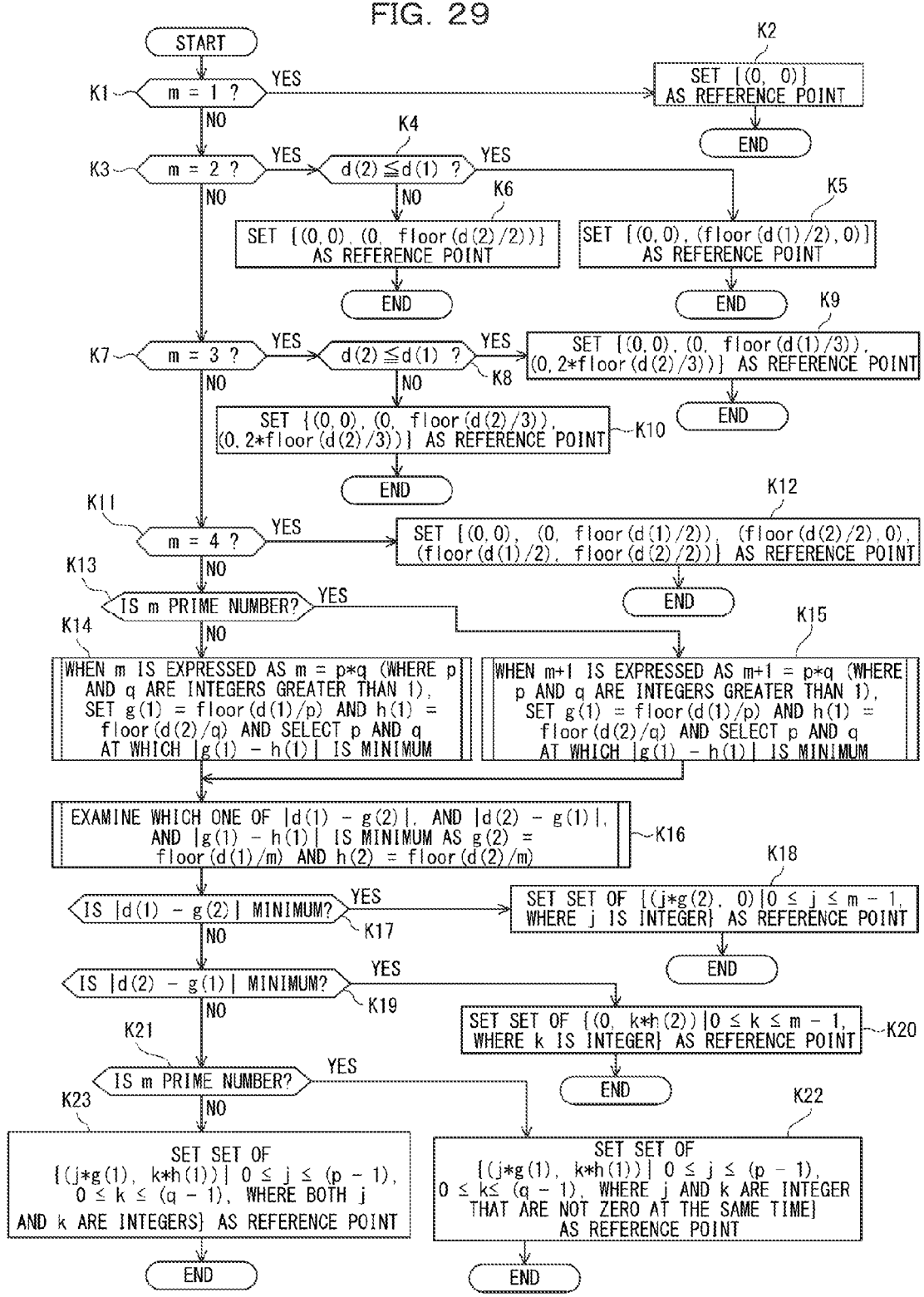
FIG. 29 is a flowchart describing a processing of a reference point determining unit of a parallel computer system of a second embodiment.

The processing of the reference point determining unit 12 of the parallel computer system 1 as the second embodiment, which is configured as described above, will be described with reference to the flowchart (steps K1 to K23) illustrated in FIG. 29.

In step K1, the reference point determining unit 12 checks whether m is equal to 1. As the checking result, in a case where m is equal to 1 (see YES route of step K1), in step K2, the reference point determining unit 12 sets {(0, 0)} as the reference point and ends the processing.

In addition, in a case where m is not equal to 1 (see NO route of step K1), in step K3, it is checked whether m is equal to 2. As the checking result, in a case where m is equal to 2 (see YES route of step K3), in step K4, the reference point determining unit 12 checks whether d(2) is less than or equal to d(1). In a case where d(2) is d(1) or less (see YES route of step K4), in step K5, the reference point determining unit 12 sets {(0, 0), (floor(d(1)/2),0)} as the reference point and ends the processing.

In addition, in a case where d(2) is greater than d(1) (see NO route of step K4), in step K6, the reference point determining unit 12 sets {(0, 0), (0, floor(d(2)/2))} as the reference point and ends the processing.

In addition, as the checking result of step K3, in a case where m is not equal to 2 (see NO route of step K3), in step K7, it is checked whether m is equal to 3.

In a case where m is equal to 3 (see YES route of step K7), in step K8, it is checked whether d(2) is less than or equal to d(1). In a case where d(2) is d(1) or less (see YES route of step K8), in step K9, the reference point determining unit 12 sets {(0, 0), (0, floor(d(1)/3)), (0, 2*floor(d(2)/3))} as the reference point and ends the processing.

In addition, in a case where d(2) is greater than d(1) (see NO route of step K8), in step K10, the reference point determining unit 12 sets {(0, 0), (0, floor(d(2)/3), (0, 2*floor (d(2)/3)} as the reference point and ends the processing.

In addition, as the checking result of step K7, in a case where m is not equal to 3 (see NO route of step K7), in step K11, it is checked whether m is equal to 4. In a case where m is equal to 4 (see YES route of step K11), in step K12, the reference point determining unit 12 sets {(0, 0), (0, floor(d (1)/2)), (floor(d(2)/2),0), (floor(d(1)/2), floor(d(2)/2))} as the reference point and ends the processing.

In addition, as the checking result of step K11, in a case where m is not equal to 4 (see NO route of step K11), in step K13, it is checked whether m is a prime number. In a case where m is the prime number (see YES route of step K13), in step K15, when m+1 is expressed as m+1=p*q (where p and q are integers greater than 1), the reference point determining unit 12 sets g(1)=floor(d(1)/p) and h(1)=floor(d(2)/q) and selects p and q at which |g(1)−h(1)| is minimum.

In addition, in a case where m is not the prime number (see NO route of step K13), in step K14, when m is expressed as m=p*q (where p and q are integers greater than 1), the reference point determining unit 12 g(1)=floor(d(1)/p), h(1)=floor(d(2)/q) and selects p and q at which |g(1)−h(1)| is minimum.

After that, in step K16, the reference point determining unit 12 examines which one of |d(1)−g(2)|, |d(2)−g(1)|, and |g(1)−h(1)| is minimum as g(2)=floor(d(1)/m) and h(2)=floor(d(2)/m).

In step K17, it is checked whether |d(1)−g(2)| is minimum. In a case where |d(1)−g(2)| is minimum (see YES route of step K17), the processing proceeds to step K18. In step K18, the reference point determining unit 12 sets a set of {(j*g(2), 0)|0≤j≤m−1, where j is integer} as the reference point and ends the processing.

In addition, as the checking result of step K17, in a case where |d(1)−g(2)| is not minimum (see NO route of step K17), in step K19, it is checked whether |d(2)−g(1)| is minimum.

In a case where |d(2)−g(1)| is minimum (see YES route of step K19), the processing proceeds to step K20. In step K20, the reference point determining unit 12 sets a set of {(0, k*h(2))|0≤k≤m−1, where k is integer} as the reference point and ends the processing.

In a case where |d(2)−g(1)| is not minimum (see NO route of step K19), that is, in a case where |g(1)−h(1)| is minimum, the processing proceeds to step K21. In step K21, it is checked whether m is a prime number. In a case where m is the prime number (see YES route of step K21), in step K22, the reference point determining unit 12 sets a set of {(j*g(1), k*h(1))|0≤j≤(p−1), 0≤k≤(q−1), where j and k are integer that are not zero at the same time} as the reference point and ends the processing.

In addition, as the checking result of step K21, in a case where m is not the prime number (see NO route of step K21), in step K23, the reference point determining unit 12 sets a set of {(j*g(1), k*h(1))|0≤j≤(p−1), 0≤k≤(q−1), where both j and k are integers} and ends the processing.

Figure 30:
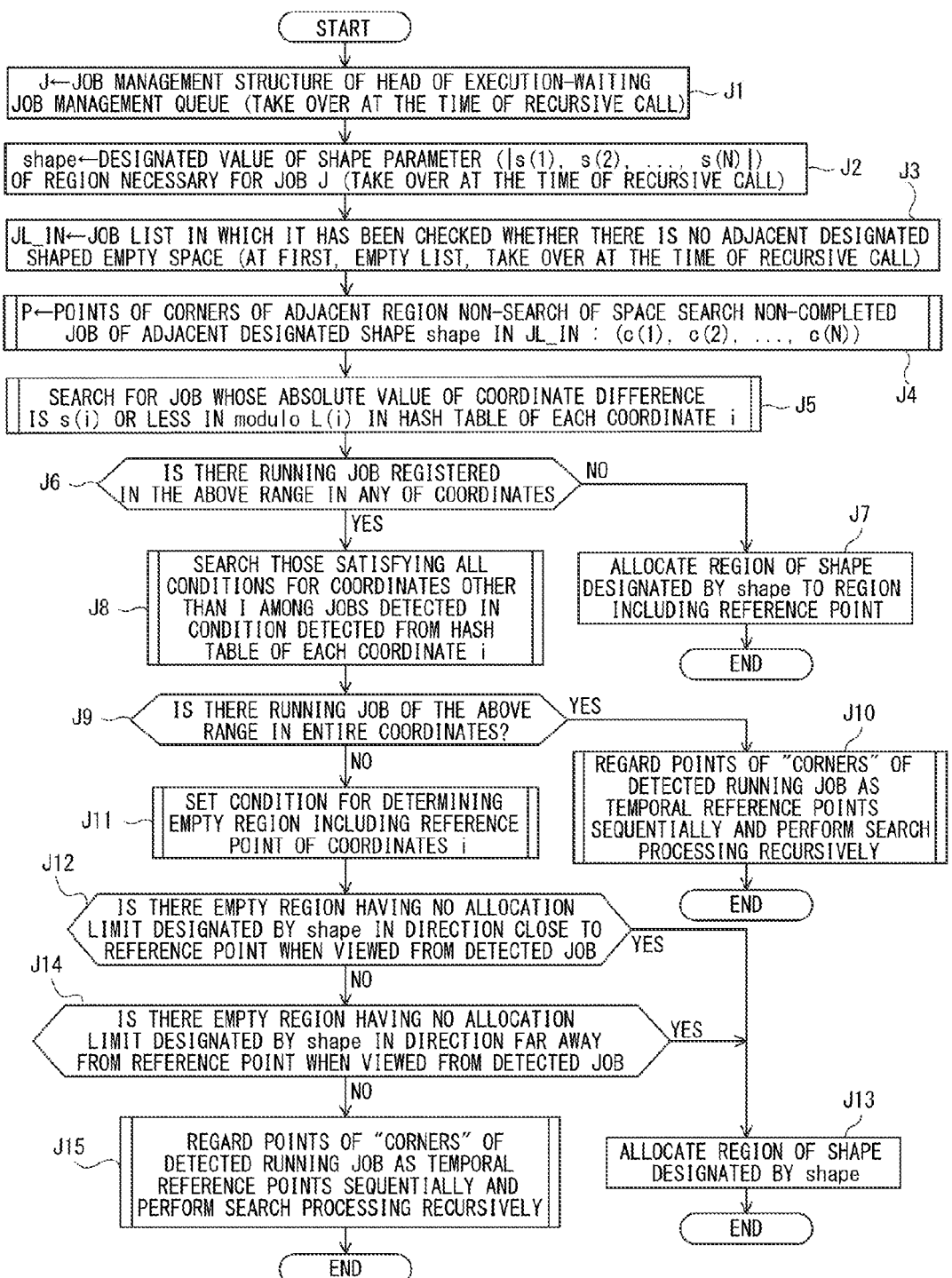
FIG. 30 is a flowchart describing an allocation candidate node search processing by an allocation candidate node set searching unit of a parallel computer system as a second embodiment.

Next, the allocation candidate node search processing by the allocation candidate node set searching unit 13 of the parallel computer system 1 as the second embodiment will be described with reference to the flowcharts (steps J1 to J15) illustrated in FIG. 30.

In step J1, the allocation candidate node set searching unit 13 extracts a job management structure 131a from a head of an execution-waiting job management queue 131 and sets the extracted job management structure 131a as J. In the case of a recursive call, the job management structure 131a is taken over.

In step J2, the allocation candidate node set searching unit 13 sets a designated value of a shape parameter (Is(1), s(2), . . . , s(N)|) of a region necessary for the job J as shape. Since the initial value is empty, the shape parameter is taken over in the case of the recursive call.

In step J3, the allocation candidate node set searching unit 13 sets a job list, in which it has been checked whether there is no adjacent designated shaped empty space, as JL_IN. Since the initial value is empty, the shape parameter is taken over in the case of the recursive call.

In step J4, the allocation candidate node set searching unit 13 sets points c(1), c(2), . . . , c(N) of corners of an adjacent region non-search of a space search non-completed job of an adjacent designated shape in JL_IN as P.

In step J5, the allocation candidate node set searching unit 13 searches for a job whose absolute value of coordinate difference is s(i) or less in a modulo L(i) in a Hash table of each coordinate i.

In step J6, the allocation candidate node set searching unit 13 checks whether there is a running job registered in the above range in any of coordinates. As the checking result, in a case where it is not limited (see NO route of step J6), the processing proceeds to step J7.

In step J7, the allocation candidate node set searching unit 13 allocates a region of a shape designated by shape to a region including the reference point and ends the processing.

In addition, as the checking result of step J6, in a case where it is limited (see YES route of step J6), the processing proceeds to step J8.

In step J8, the allocation candidate node set searching unit 13 searches those satisfying all conditions for coordinates other than I among jobs detected in a condition detected from the Hash table 133 of each coordinate i.

In step J9, the allocation candidate node set searching unit 13 checks whether there is the running job of the above range in the entire coordinates. As the checking result, in a case where there is the running job (see YES route of step J9), the processing proceeds to step J10.

In step J10, the allocation candidate node set searching unit 13 regards points of "corners" of the detected running job as temporal reference points sequentially, performs search processing recursively, and ends the processing.

In addition, as the checking result of step J9, in a case where there is no running job (see NO route of step J9), the processing proceeds to step J11.

In step J11, the allocation candidate node set searching unit 13 sets a condition for determining an empty region including the reference point of coordinates i.

In step J12, the allocation candidate node set searching unit 13 checks whether there is an empty region having no allocation limit designated by shape in a direction close to the reference point when viewed from the detected job. As the checking result, in a case where there is the corresponding empty region (see YES route of step J12), the processing proceeds to step J13.

In step j13, the allocation candidate node set searching unit 13 allocates a region of a shape designated by shape and ends the processing.

In addition, as the checking result of step J12, in a case where there is no corresponding empty region (see NO route of step J12), the processing proceeds to step J14.

In step J14, the allocation candidate node set searching unit 13 checks whether there is an empty region having no allocation limit designated by shape in a direction far from the reference point when viewed from the detected job. As the checking result, in a case where there is the corresponding empty region (see YES route of step J14), the processing proceeds to step J13.

On the other hand, as the checking result of step J14, in a case where there is no corresponding empty region (see NO route of step J14), the processing proceeds to step J15.

In step J15, the allocation candidate node set searching unit 13 regards points of "corners" of the detected running job as temporal reference points sequentially, performs search processing recursively, and ends the processing.

(C) Third Embodiment

In the third embodiment, a network topology in which a plurality of meshes or torus networks is connected through a plurality of gateway nodes is handled. At least one node, which becomes a gateway to each other, exists in two meshes or torus networks.

The third embodiment corresponds to a caser where a cluster of a plurality of computer systems having a mesh or torus network is operated as a single system.

Hereinafter, it is assumed that M mesh or torus networks are connected to one another. At this time, each mesh or torus is a partial network of a network of an entire system.

Figure 31:
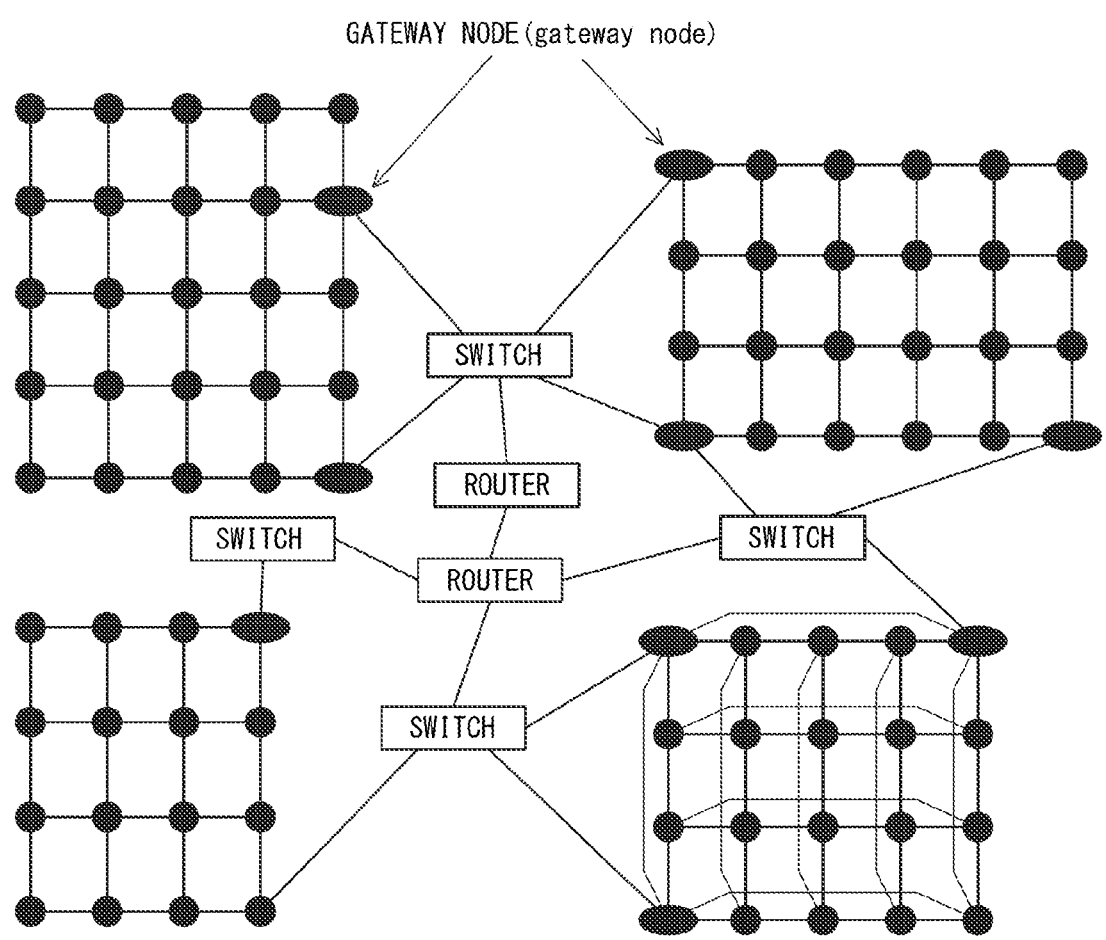
FIG. 31 is a diagram illustrating a network topology of a parallel computer system of a third embodiment.

FIG. 31 is a diagram illustrating a network topology of a parallel computer system 1 of a third embodiment and shows a network that is connected to the torus and a plurality of meshes through a gateway node.

In the third embodiment, a remote degree is defined as follows.

A remote degree between two nodes belonging to the same mesh or torus network is a distance function within the mesh or torus.

A remote degree between two nodes belonging to different mesh or torus networks is defined as the sum of a remote degree from each mesh or torus to the gateway and a remote degree between gateway nodes. However, when there is a combination of a plurality of gateway nodes, the remote degree is defined as a minimum value thereof.

Furthermore, the remote degree between the gateway nodes is defined as a value obtained by dividing a communication latency between the gateway nodes at a reference time by an average latency of one link in each mesh or torus.

In general, since the communication delay is great when passing through the gateway node, it is desirable that one job is kept within one partial network as much as possible. However, since this increases the number of nodes required by the job, those possible cases are also considered.

Next, the reference point determining unit 12 according to the third embodiment will be described.

In the third embodiment, the reference point determining unit 12 represents m as the sum of M positive integers (M≤m) and arranges reference points to each mesh or torus.

$$m = m(1) + m(2) + \ldots + m(M)$$

Even when m is indivisible by M, the processing is performed such that the number of partial networks becomes equal with respect to each partial network as much as possible.

In addition, in a case where a variation occurs in the number of reference points, more reference points are arranged to a partial network where the number of nodes is larger.

M is represented as the sum of m positive integers (M m) and reference points are arranged to each group of the gateway nodes of a plurality of meshes or toruses.

When represented as below, a reference point corresponding to a kth attribute is selected from one of gateway nodes between M(k) meshes or toruses.

$$M = M(1) + M(2) + \ldots + M(m)$$

In the third embodiment, in a case where the number M of the meshes or toruses being the partial networks is large, the grouping of the partial networks is performed to equalize the number of nodes as much as possible by the combination of two types of approximation using two threshold values Threshold1 and Threshold2.

That is, regarding the problem that an amount of exact computation becomes very large by the "dispersion" to measure the degree at which a plurality of amounts is away from an average in spastics, two types of approximation processing is combined by using two threshold values Threshold1 and Threshold2.

Also, the relationship of the two threshold values is Threshold1>Threshold2.

Here, in a case where M is larger than Threshold1, "the number of partial networks belonging to each group" is equal as much as possible, focusing on the total sum of the number of nodes of the partial networks belonging to each group.

That is, a difference in the number of nodes of each partial network is considered as being relatively small, and the equalization of the sum of the number of the nodes is approximated to equalize the number of the partial networks.

In addition, in a case where M is larger than Threshold2, M partial networks are arranged in descending order of the number of nodes and the approximation is performed by adding sub-networks to each group in order from the beginning so as not to exceed the average of the sum of the number of nodes for each group as far as possible. All nodes remaining at the positions determining (m−1) groups are assumed as one group.

In the third embodiment, in a case where it is necessary to allocate the nodes over a plurality of meshes or toruses, the allocation candidate node set searching unit 13 distributes the number nn of nodes required for executing jobs to each mesh or torus. Then, the allocation candidate node set searching unit 13 performs searching on the gateway node where the remote degree value from the gateway node where the distributed number of empty nodes are set as reference points within each mesh or torus, or the gate node connected to the reference point nodes is smaller. This searching is the same as the method of the first embodiment described above.

However, in the third embodiment, the searching that divides the region as above is limited to a case where the reference point exists on the gateway node. In addition, it is assumed that the allowable division pattern is previously assigned to a list for each job.

In a case where the job is executable at only the nodes within the single mesh or torus, the allocation candidate node set searching unit 13 uses the allocating method described in the first embodiment.

The processing of the reference point determining unit 12 of the parallel computer system 1 of the third embodiment will be described with reference to the flowcharts of FIGS. 32 to 35.

Figure 32:
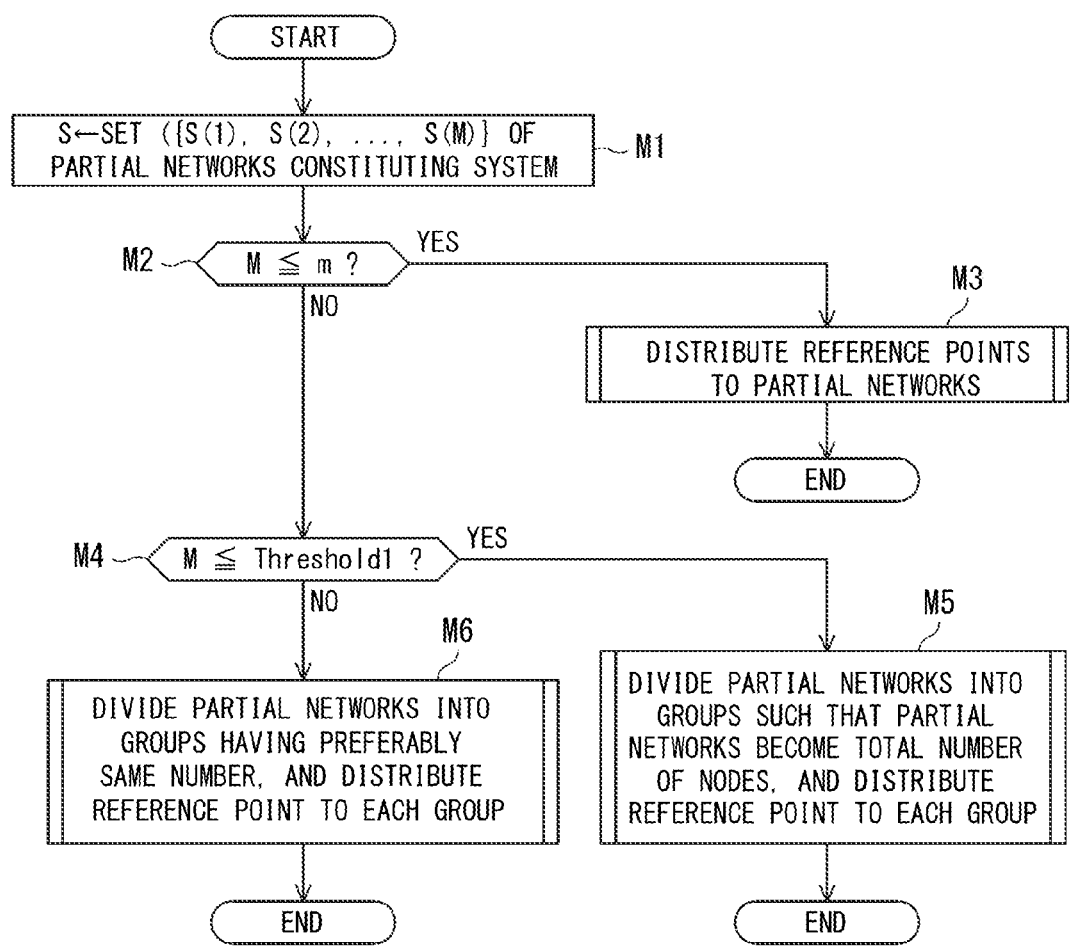
FIG. 32 is a flowchart describing a processing of a reference point determining unit of a parallel computer system of a third embodiment.

In step M1 of FIG. 32, the reference point determining unit 12 sets a set ({S(1), S(2), . . . , S(m)} of partial networks constituting the system as S.

In step M2 of FIG. 32, the reference point determining unit 12 checks whether M is less than or equal to m. In a case where M is m or less (see YES route of step M2), the processing proceeds to step M3. In step M3 of FIG. 32, the reference point determining unit 12 distributes reference points to the partial networks. Details of the processing of step M3 will be described below with reference to FIG. 33.

In addition, as the checking result of step M2 of FIG. 32, in a case where M is greater than m (see NO route of step M2), in step M4, it is checked whether M is less than or equal to Threshold1. As the checking result, in a case where M is Threshold1 or less (see YES route of step M4), the processing proceeds to step M5. In step M5 of FIG. 32, the reference point determining unit 12 divides the partial networks into groups to have the total number of nodes equal to or near to one another as possible and distributes the reference point to each group. Details of the processing of step M5 will be described below with reference to FIG. 35.

On the other hand, as the checking result of step M4, in a case where M is greater than Threshold1 (see NO route of step M4), the processing proceeds to step M6. In step M6 of FIG. 32, the reference point determining unit 12 divides the partial networks into groups having preferably same number, and distributed the reference point to each group. Details of the processing of step M6 will be described below with reference to FIG. 34.

Next, the processing of step M3 of the flowchart of FIG. 32 will be described with reference to the flowchart (steps N1 to N5) of FIG. 33.

Figure 33:
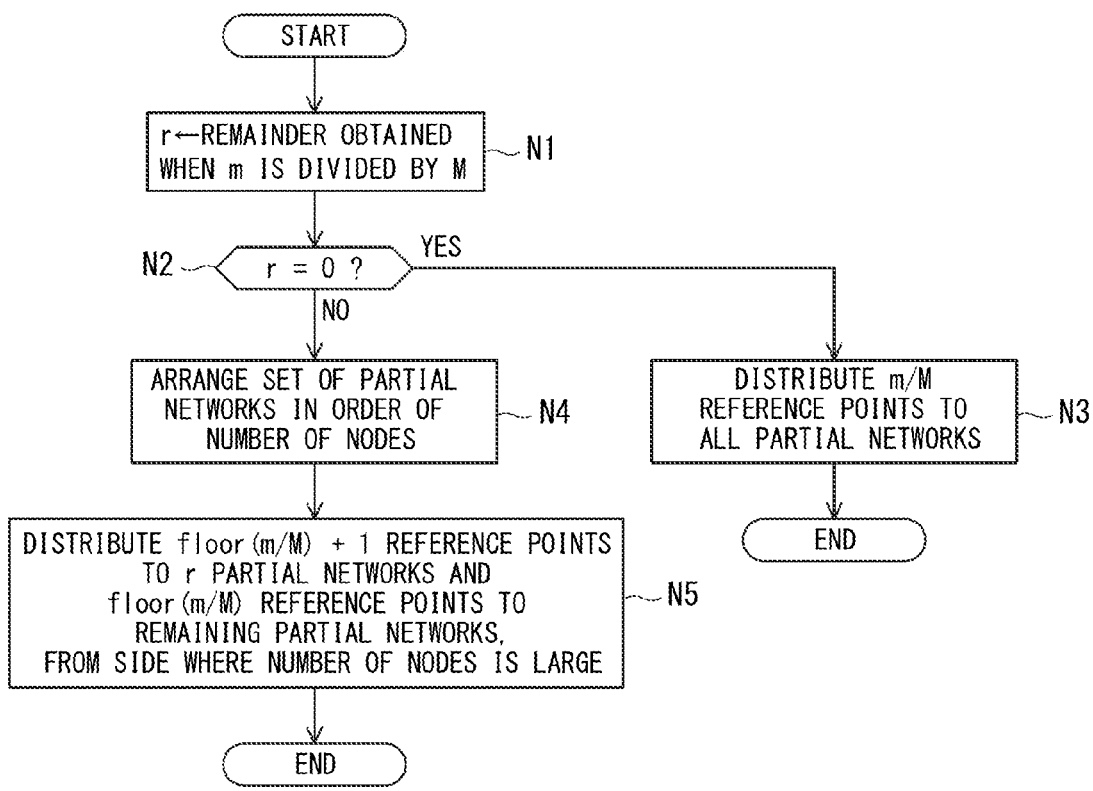
FIG. 33 is a flowchart describing a processing of a reference point determining unit of a parallel computer system of a third embodiment.

In step N1 of FIG. 33, the reference point determining unit 12 sets a remainder obtained when m is divided by M as r. In step N2 of FIG. 33, the reference point determining unit 12 checks whether r is equal to 0. In a case where r is equal to 0 (see YES route of step N2), the processing proceeds to step N3. In step N3, the reference point determining unit 12 distributes m/M reference points to all partial networks.

In addition, in a case where r is not equal to 0 (see NO route of step N2), the processing proceeds to step N4. In step N4 of FIG. 33, the reference point determining unit 12 arranges a set of partial networks in order of the number of nodes.

Then, in step N5 of FIG. 33, the reference point determining unit 12 distributes floor(m/M)+1 reference points to r partial networks and floor(m/M) reference points to remaining partial networks, from side where the number of nodes is large.

Next, the processing of step M6 of the flowchart of FIG. 32 will be described with reference to the flowchart (steps P1 to P10) of FIG. 34.

Figure 34:
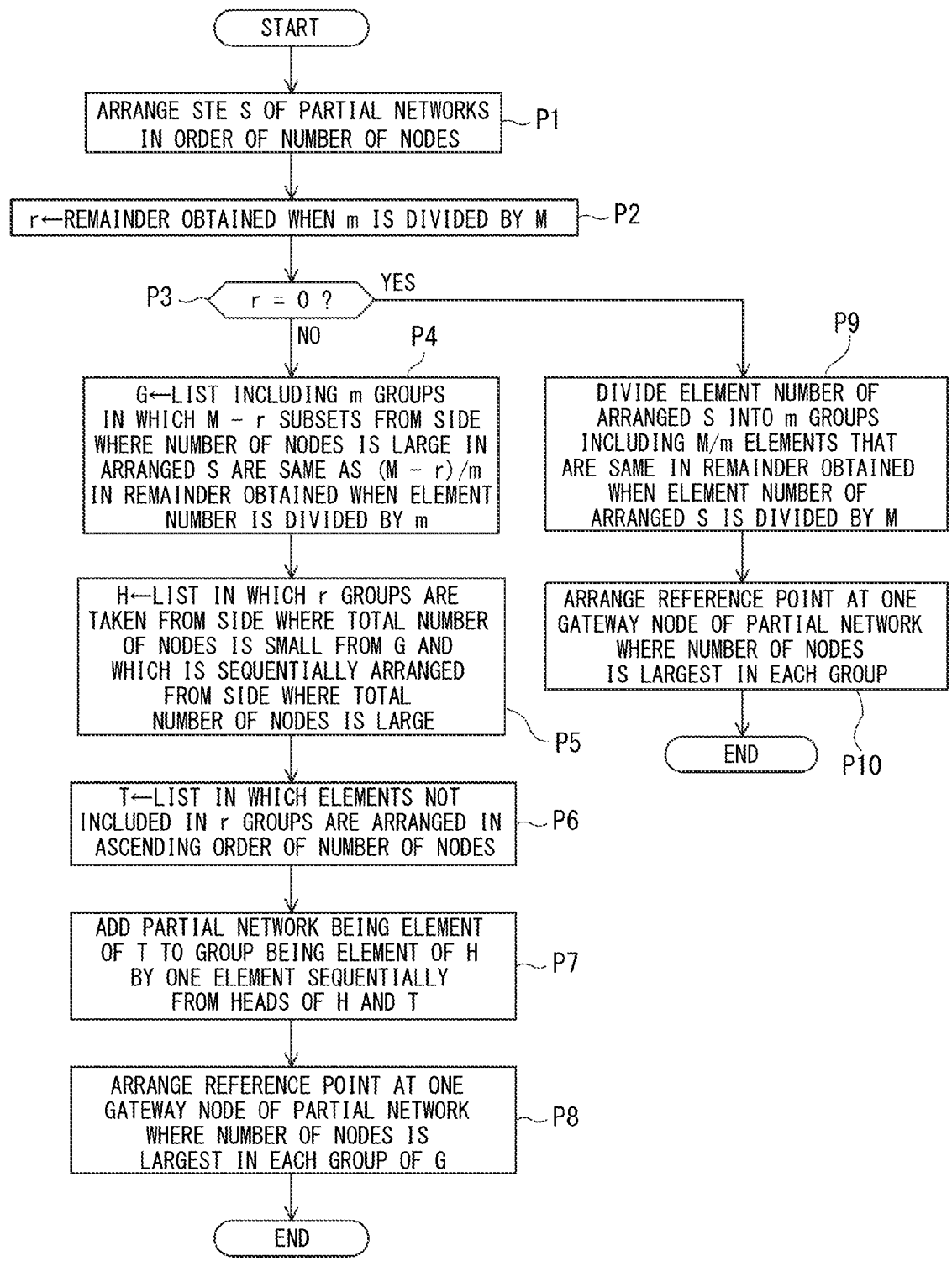
FIG. 34 is a flowchart describing a processing of a reference point determining unit of a parallel computer system of a third embodiment.

In step P1 of FIG. 34, the reference point determining unit 12 arranges a set S of partial networks in order of the number of nodes. In step P2, the reference point determining unit 12 sets a remainder obtained when m is divided by M as r.

In step P3 of FIG. 34, it is checked whether r is equal to 0. In a case where r is equal to 0 (see YES route of step P3), the processing proceeds to step P9. In step P9, the reference point determining unit 12 divides the element number of the arranged S into m groups including M/m elements that are the same in a remainder obtained when the element number of the arranged s is divided by M.

Then, in step P10 of FIG. 34, the reference point determining unit 12 arranges the reference point at one gateway node of the partial network where the number of nodes is largest in each group.

On the other hand, as the checking result of step P3, in a case where r is not equal to 0 (see NO route of step P3), the processing proceeds to step P4. In step P4 of FIG. 34, the reference point determining unit 12 sets, as G, a list including m groups in which M−r subsets from the side where the number of nodes is large in the arranged s are the same as (M−r)/m in a remainder obtained when the element number is divided by m.

In step P5 of FIG. 34, the reference point determining unit 12 sets, as H, a list in which r groups are taken from the side where the total number of nodes is small from G and which is sequentially arranged from the side where the total number of nodes is large. In addition, in step P6 of FIG. 34, the reference point determining unit 12 sets, as T, a list in which the elements not included in r groups are arranged in ascending order of the number of nodes.

In step P7 of FIG. 34, the reference point determining unit 12 adds the partial network being the element of T to the group being the element of H by one element sequentially from heads of H and T.

Then, in step P8 of FIG. 34, the reference point determining unit 12 arranges the reference point at one gateway node of the partial network where the number of nodes is largest in each group of G.

Next, the processing of step M5 of the flowchart of FIG. 32 will be described with reference to the flowchart (steps Q1 to Q17) of FIG. 35.

Figure 35:
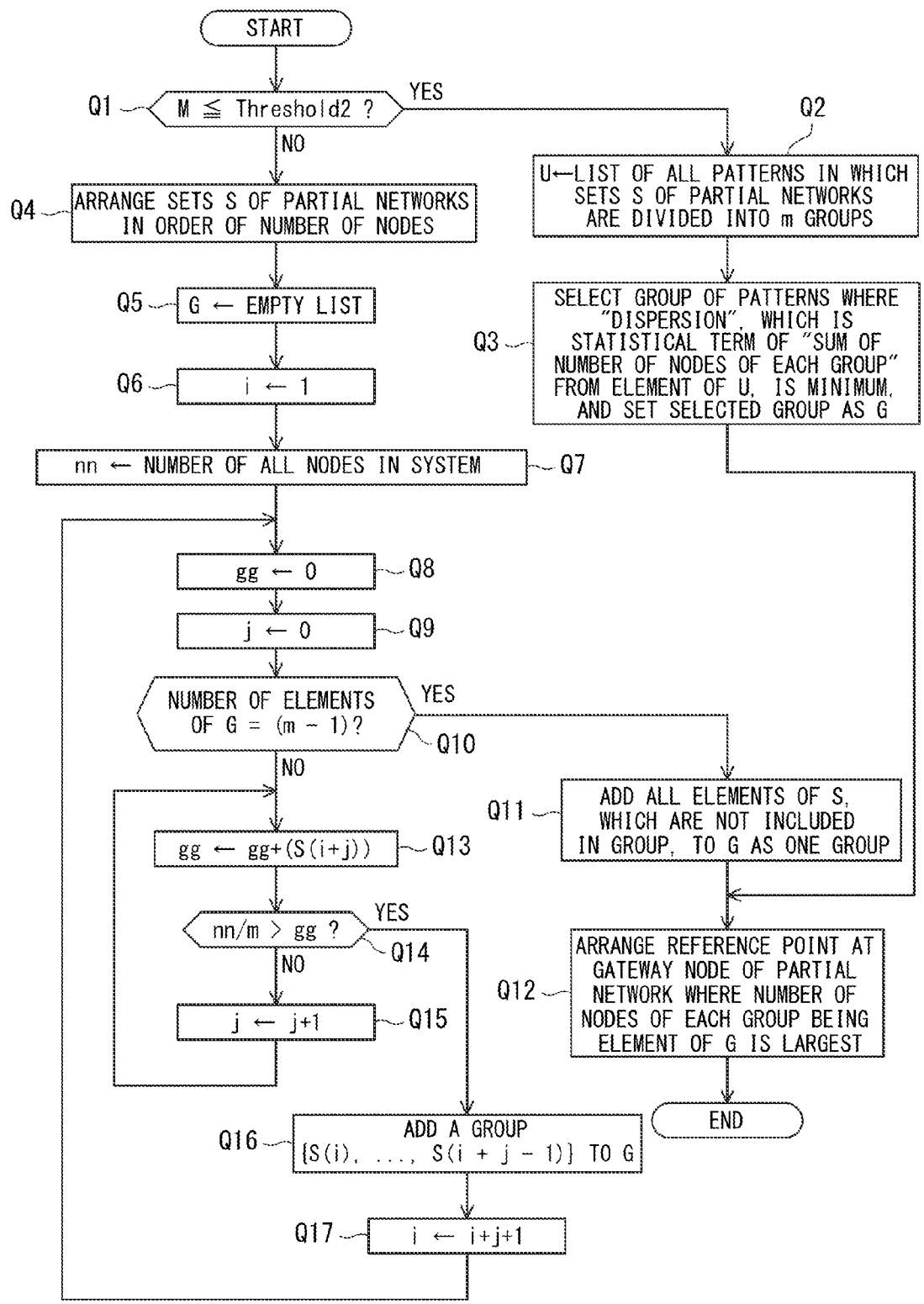
FIG. 35 is a flowchart describing a processing of a reference point determining unit of a parallel computer system of a third embodiment.

In step Q1 of FIG. 35, the reference point determining unit 12 checks whether M is less than equal to Threshold2. As the checking result, in a case where M is Threshold2 or less (see YES route of step Q1), the processing proceeds to step Q2. In step Q2, the reference point determining unit 12 sets, as U, a list of all patterns in which sets S of partial networks are divided into m groups.

In step Q3 of FIG. 35, the reference point determining unit 12 selects the group of patterns where the "dispersion", which is statistical term of the "sum of the number of nodes of each group" from the element of U, is minimum, and sets the selected group as G.

After that, in step Q12 of FIG. 35, the reference point determining unit 12 arranges the reference point at the gateway node of the partial network where the number of nodes of each group being the element of G is largest.

On the other hand, as the checking result of step Q1, in a case where M is greater than Threshold2 (see NO route of step Q1), the processing proceeds to step Q4.

In step Q4 of FIG. 35, the reference point determining unit 12 arranges sets S of the partial networks in order of the number of nodes. In step Q5 of FIG. 35, the reference point determining unit 12 sets the empty list as G.

The reference point determining unit 12 sets 1 to i in step Q6 of FIG. 35 and sets the number of all nodes in the system as nn in step Q7 of FIG. 35. In addition, in steps Q8 and Q9 of FIG. 35, 0 is set to gg and j.

In step Q10 of FIG. 35, the reference point determining unit 12 checks whether the number of elements of G is m−1. In a case where the number of elements of G is equal to m−1 (see YES route of step Q10), the processing proceeds to step Q11.

In step Q11 of FIG. 35, the reference point determining unit 12 adds all elements of S, which are not included in the group, to G as one group.

Then, in step Q12 of FIG. 35, the reference point determining unit 12 arranges the reference point at the gateway node of the partial network where the number of nodes of each group being the element of G is largest.

On the other hand, as the checking result of step Q10, in a case where the number of elements of G is not equal to m−1 (see NO route of step Q10), in step Q13 of FIG. 35, the reference point determining unit 12 sets gg+(S(i+j)) to gg.

In step Q14 of FIG. 35, the reference point determining unit 12 checks whether nn/m is greater than >gg.

In a case where nn/m is gg or less (see NO route of step Q14), in step Q15 of FIG. 35, the reference point determining unit 12 increments j (j+1) and returns to step Q13.

In addition, in a case where nn/m is greater than gg (see YES route of step Q14), the processing proceeds to step Q16.

In step Q16 of FIG. 35, the reference point determining unit 12 adds a group {S(i), . . . , S(i+j−1)} to G.

After that, i+j+1 is set to i in step Q17 of FIG. 35, and the processing proceeds to step Q8.

Next, the processing by the allocation candidate node set searching unit 13 of the parallel computer system 1 as an example of the third embodiment will be described with reference to the flowcharts (steps L1 to L11) illustrated in FIG. 36.

Figure 36:
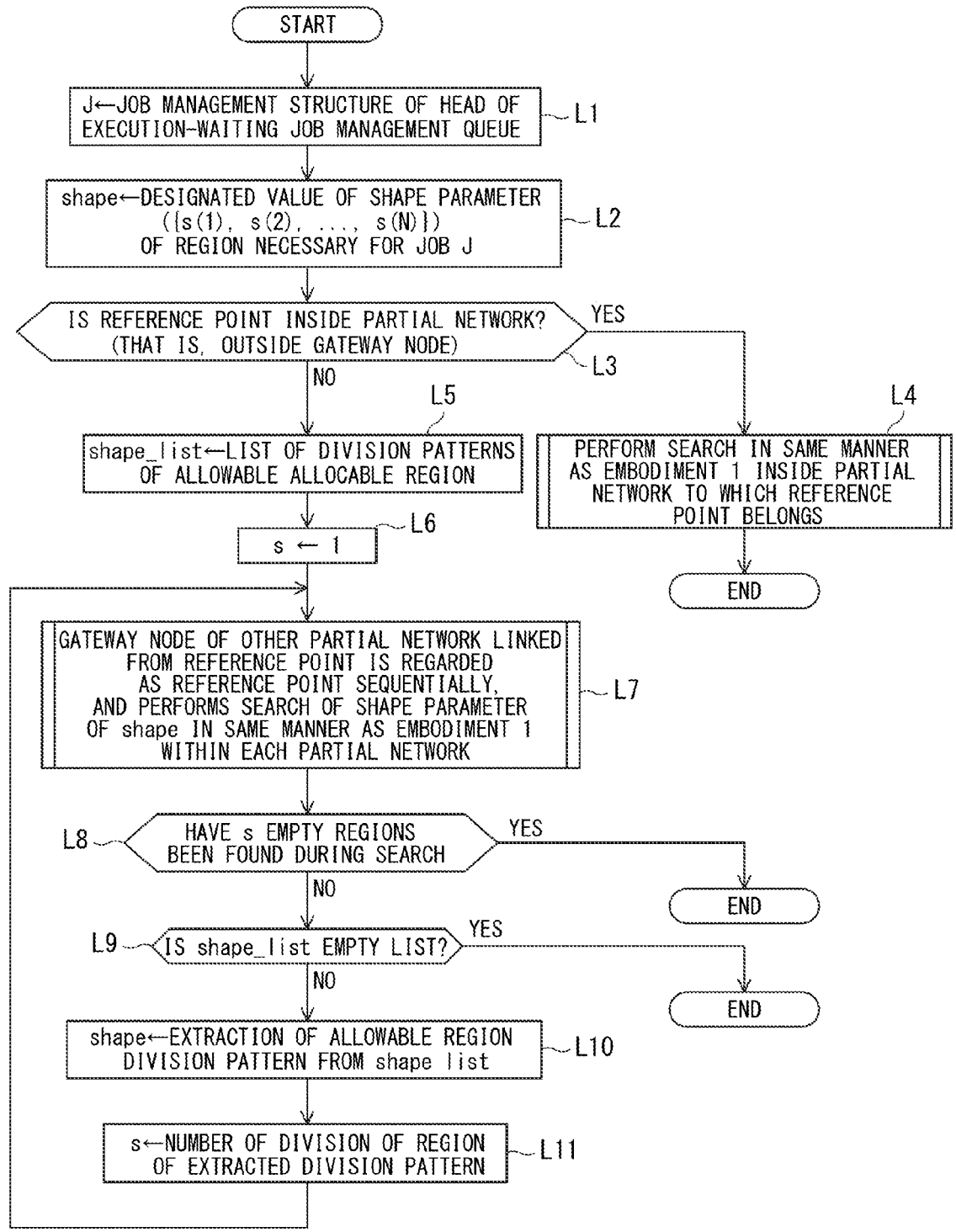
FIG. 36 is a flowchart describing a processing by an allocation candidate node set searching unit of a parallel computer system of a third embodiment.

In step L1 of FIG. 36, the allocation candidate node set searching unit 13 sets, as J, a job management structure of a head of an execution-waiting job management queue.

In addition, in step L2 of FIG. 36, the allocation candidate node set searching unit 13 sets a designated value of a shape parameter ({s(1), s(2), . . . , s(N)}) of a region necessary for a job J.

In step L3 of FIG. 36, the allocation candidate node set searching unit 13 checks whether the reference point is inside the partial network, that is, outside the gateway node. In a case where the reference point is inside the partial network (see YES route of step L3), in step L4 of FIG. 36, the allocation candidate node set searching unit 13 performs search in same manner as the first embodiment inside the partial network to which the reference point belongs.

In addition, as the checking result of step L3, in a case where the reference point is not inside the partial network (see NO route of step L3), the processing proceeds to step L5.

In step L5 of FIG. 36, the allocation candidate node set searching unit 13 sets, as shape_list, a list of division patterns of an allowable allocable region.

In step L6 of FIG. 36, the allocation candidate node set searching unit 13 sets 1 to s. In addition, in step L7 of FIG. 36, the allocation candidate node set searching unit 13 regards a gateway node of other partial network linked from the reference point as a reference point sequentially, and performs search of a shape parameter of a shape in the same manner as the first embodiment within each partial network.

In step L8 of FIG. 36, the allocation candidate node set searching unit 13 checks whether s empty regions have been found during search.

In a case where the s empty regions have not been found (see NO route of step L8), in step L9 of FIG. 36, it is checked whether shape_list is an empty list.

As the checking result of step L9, in a case where shape_list is not the empty list (see NO route of step L9), the processing proceeds to step L10.

In step L10 of FIG. 36, the allocation candidate node set searching unit 13 extracts an allowable region division pattern from shape_list and sets the extracted allowable region division pattern to shape.

In addition, in step L11, the number of the divisions of the region of the extracted division pattern is set to s. After that, the processing returns to step L7.

In addition, in a case where the s empty regions have been found (see YES route of step L8) as the checking result of step L8 of FIG. 36 and in a case where shape_list is the empty list (see YES route of step L9) as the checking result of step L9, the processing is ended.

[III] Effects

As described above, according to the parallel computer system 1 as the example of the embodiment, the reference point determining unit 12 sets the node allocation reference points in the network topology for each attribute value representing the job attribute. Then, the allocation candidate node set searching unit 13 searches for a region having a shape designated not to include nodes being used by other jobs from the side where a remote degree from the reference point is small, and selects a computation node set to allocate the job.

In this way, the job of the same attribute can be concentrated near the reference point. That is, the job having a common attribute can be processed in the set of computation nodes 200 arranged physically close thereto.

In addition, the computation necessary for the search can be reduced by excluding the nodes being used by other jobs from the search target.

Furthermore, the allocation candidate node set searching unit 13 performs the empty region search so as to be adjacent to the job close to the reference point, thereby suppressing the fragmentation of the empty region. That is, the allocation candidate node set searching unit 13 preferentially searches for the region adjacent to the running job. Therefore, due to the gap between the jobs, it is possible to alleviate the progress of the fragmentation of the node region.

In addition, it is possible to manage the position of the running job allocated to the node coordinate space by the Hash information 133. The allocation candidate node set searching unit 13 uses the Hash information 133. In this manner, the computation node set allocating the jobs can be searched promptly and at a low load.

Furthermore, the allocation candidate node set searching unit 13 preferentially searches for the adjacent point of the vertex of the side close to the reference point corresponding to the job attribute value. Therefore, the job can be allocated to the region far from the reference point corresponding to other attribute value as much as possible.

The allocation candidate node control unit 14 limits the allocation node set corresponding to the job of a specific attribute value, thereby increasing the convenience that can allocate the node set corresponding to the job of the specific attribute value as a reserved region.

The technology of the disclosure is not limited to the above-described embodiments, and various modifications can be made without departing from the scope of the present embodiments. Each configuration and each process of the present embodiment can be selected to be used or not as is necessary, or the configurations and the processes may be combined as is appropriate.

For example, in the above-described embodiments, the example in which the network topology is the rectangular mesh has been described, but the present invention is not limited thereto. The shape of the network topology can be variously changed according to the shape of the mesh, such as a triangular mesh.

In addition, in the above-described embodiments, the example in which the distance functions of the Manhattan distance, the Euclidean distance, and the Chebyshev distance are used as the remote degree function has been described, but the present invention is not limited thereto. Other distance functions may be used and various modifications can be made thereto.

The present embodiments disclosed above can be carried out and manufactured by those skilled in the art.

According to one embodiment, the jobs of different attributes can be efficiently allocated to the regions on the network.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A computer system, which has a plurality of computation nodes and performs an arithmetic processing with respect to a job, the computer system comprising:
   a reference point determining unit that, when the number of pieces of job attribute information is larger than the number of partial networks constituting a network that connects the plurality of computation nodes, allocates a reference point to the partial network, and that, when the number of the pieces of job attribute information is equal to or smaller than the number of partial networks, arranges a plurality of networks to groups as many as the number of the pieces of job attribute information and allocates a common reference point to each of the groups; and
   a node set searching unit that searches for a computation node set that is a set of computation nodes satisfying a predetermined condition related to a remote degree that is an estimate index of a communication time from a node allocation reference point in node coordinate spaces and including the computation node that runs no job, based on running job position information that manages a position of a running job allocated to the node coordinate spaces,
   the running job position information includes an entry corresponding to a maximum value and a minimum value of a node coordinates of each dimension of the node coordinate spaces, the entry having a pointer of the entry of a management information that manages a running job.

2. The computer system according to claim 1, wherein the node set searching unit is configured to preferentially selects, as the computation node set, a computation node having a low remote degree from the node allocation reference point among computation nodes to which the job is not allocated in the node coordinate space.

3. The computer system according to claim 1, wherein the remote degree is represented by a remote degree function among a plurality of node coordinates in the node coordinate space.

4. A processing method for processing a job in a computer system, which has a plurality of computation nodes and performs an arithmetic processing with respect to the job, the processing method comprising:
   when the number of pieces of job attribute information is lamer than the number of partial networks constituting a network that connects the plurality of computation nodes, allocating a reference point to the partial network, and, when the number of the pieces of job attribute information is equal to or smaller than the number of partial networks, arranging a plurality of networks to groups as many as the number of the pieces of job attribute information and allocating a common reference point to each of the groups; and
   searching for a computation node set that is a set of computation nodes satisfying a predetermined condition related to a remote degree that is an estimate index of a communication time from a node allocation reference point in node coordinate spaces and including the computation node that runs no job, based on running job position information that manages a position of a running job allocated to the node coordinate spaces,
   the running job position information includes an entry corresponding to a maximum value and a minimum value of a node coordinates of each dimension of the node coordinate spaces, the entry having a pointer of the entry of a management information that manages a running job.

5. The processing method according to claim 4, wherein a computation node having a low remote degree from the node allocation reference point is preferentially selected.

6. The processing method according to claim 4, wherein the remote degree is represented by a remote degree function among a plurality of node coordinates in the node coordinate space.

7. A non-transitory computer-readable recording medium having stored therein a job processing program for causing a computer to execute a process for processing a job in a computer system, which has a plurality of computation nodes and performs an arithmetic processing with respect to the job, the process comprising:
   when the number of pieces of job attribute information is lamer than the number of partial networks constituting a network that connects the plurality of computation nodes, allocating a reference point to the partial network, and, when the number of the pieces of job attribute information is equal to or smaller than the number of partial networks, arranging a plurality of networks to groups as many as the number of the pieces of job attribute information and allocating a common reference point to each of the groups; and
   searching for a computation node set that is a set of computation nodes satisfying a predetermined condition related to a remote degree that is an estimate index of a communication time from a node allocation reference point in node coordinate spaces and including the computation node that runs no job, based on running job position information that manages a position of a running job allocated to the node coordinate spaces,
   the running job position information stores an entry corresponding to a maximum value and a minimum value of a node coordinates of each dimension of the node coordinate spaces, the entry having a pointer of the entry of a management information that manages a running job.

8. The non-transitory computer-readable recording medium according to claim 7, wherein a computation node having a low remote degree from the node allocation reference point is preferentially selected.

9. The non-transitory computer-readable recording medium according to claim 7, wherein the remote degree is represented by a remote degree function among a plurality of node coordinates in the node coordinate space.

* * * * *